US011775115B2

(12) United States Patent
Edwards et al.

(10) Patent No.: US 11,775,115 B2
(45) Date of Patent: Oct. 3, 2023

(54) METHODS, SYSTEMS AND DEVICES FOR DYNAMICALLY ASSIGNING BUTTON FUNCTIONALITY BASED ON ORIENTATION

(71) Applicant: Apple Inc., Cupertino, CA (US)

(72) Inventors: Dylan R. Edwards, San Jose, CA (US); Morgan A. Price, San Francisco, CA (US); Bryant A. Jow, San Mateo, CA (US); Nathan De Vries, Alameda, CA (US); Nahir A. Khan, San Francisco, CA (US); Simon J. Parsons, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/930,930

(22) Filed: Sep. 9, 2022

(65) Prior Publication Data

US 2023/0078934 A1    Mar. 16, 2023

Related U.S. Application Data

(60) Provisional application No. 63/243,685, filed on Sep. 13, 2021.

(51) Int. Cl.
*G06F 3/041* (2006.01)
*G06F 3/04842* (2022.01)
*G06F 3/0488* (2022.01)

(52) U.S. Cl.
CPC .......... *G06F 3/0418* (2013.01); *G06F 3/0488* (2013.01); *G06F 3/04842* (2013.01)

(58) Field of Classification Search
None
See application file for complete search history.

(56) References Cited

U.S. PATENT DOCUMENTS

| 2010/0053218 | A1* | 3/2010 | Risher-Kelly | G06F 1/1662 |
| | | | | 345/619 |
| 2012/0081845 | A1* | 4/2012 | Yato | G06F 1/1626 |
| | | | | 361/679.01 |
| 2015/0033163 | A1* | 1/2015 | Hinkel | G06F 3/04847 |
| | | | | 715/765 |
| 2017/0139576 | A1* | 5/2017 | Jeong | G06F 3/04845 |

* cited by examiner

*Primary Examiner* — Nicholas J Lee
(74) *Attorney, Agent, or Firm* — Kubota & Basol LLP

(57) ABSTRACT

In some embodiments, an electronic device dynamically assigns functionalities to one or more buttons depending on an orientation associated with the device.

69 Claims, 40 Drawing Sheets

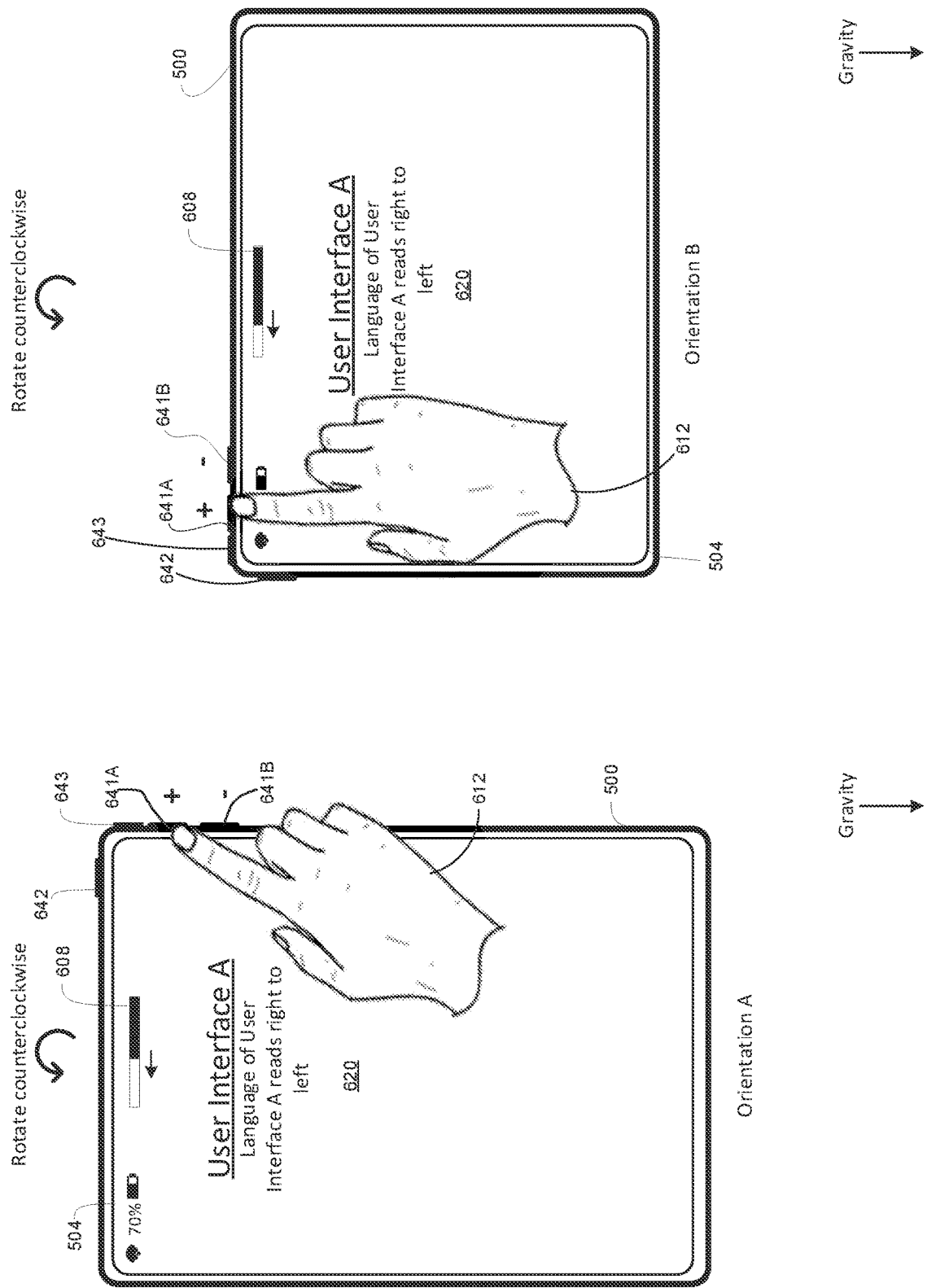

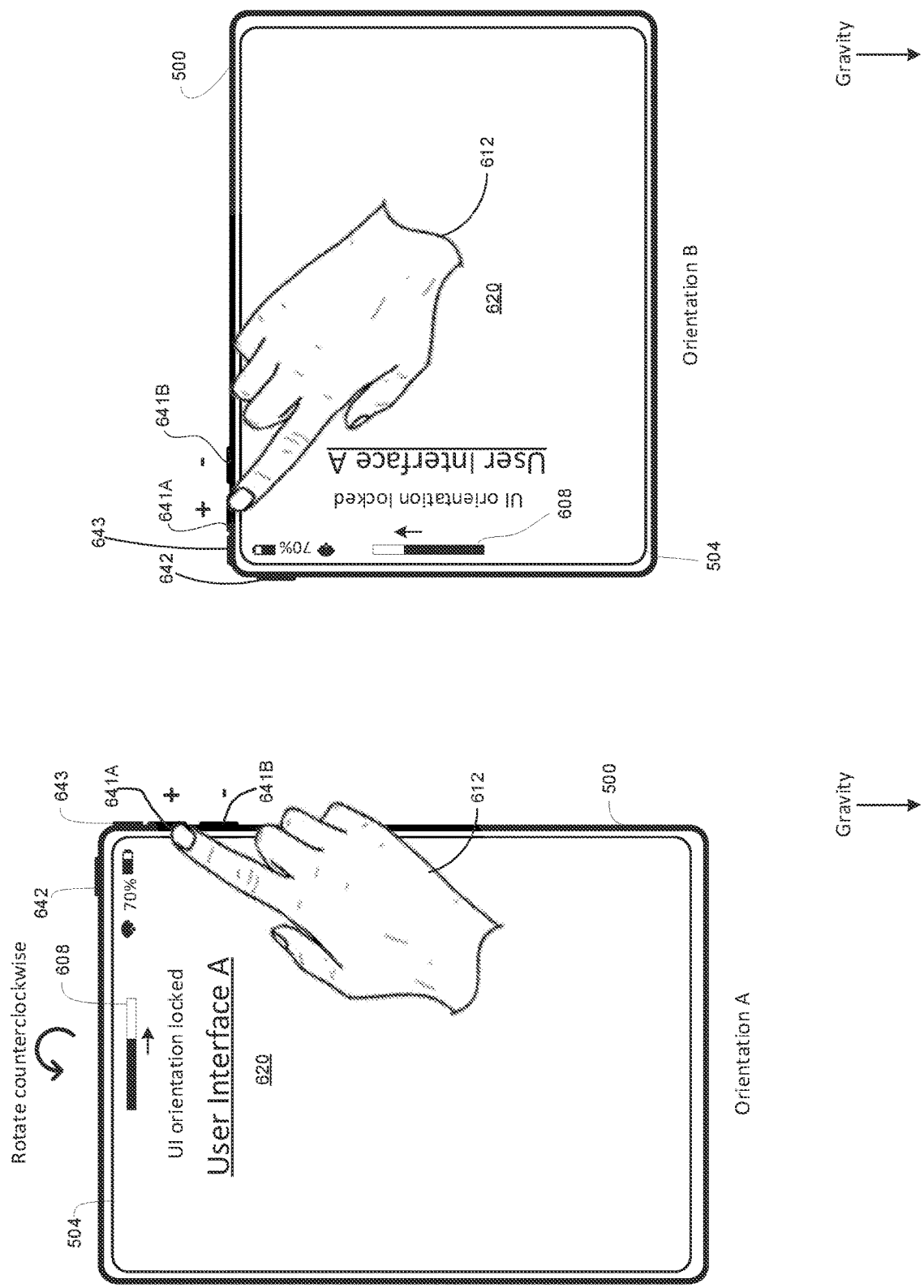

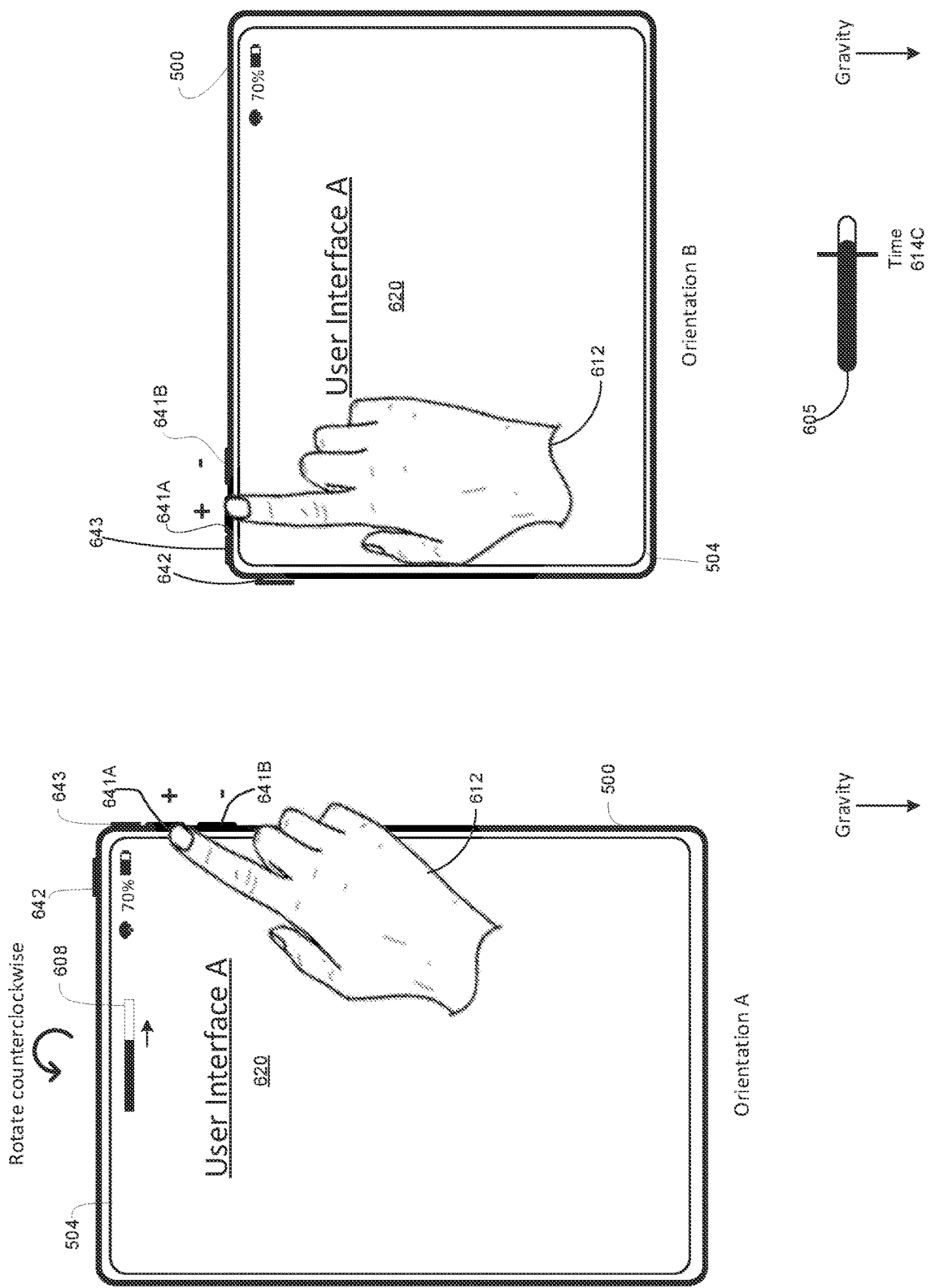

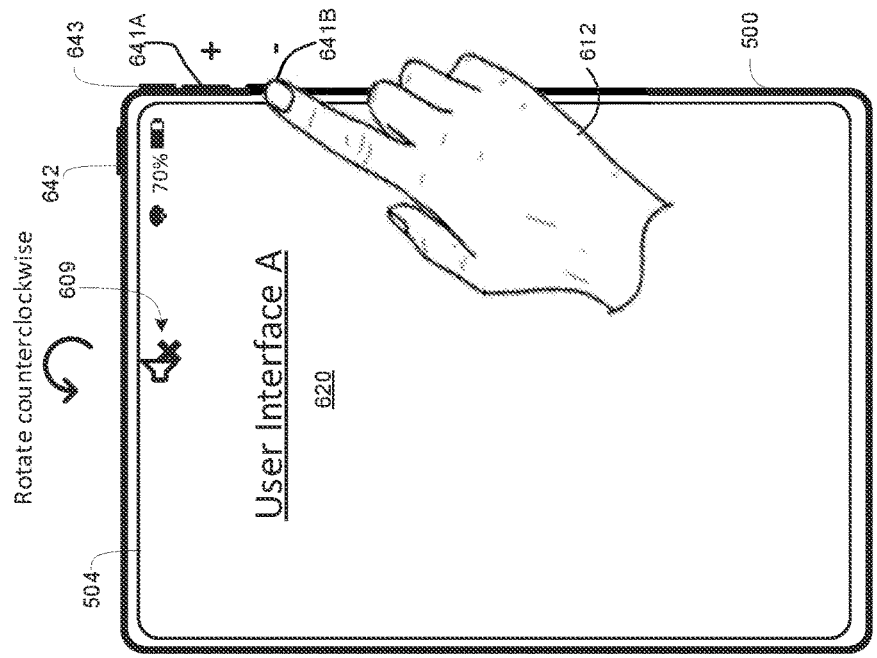
FIG. 6R
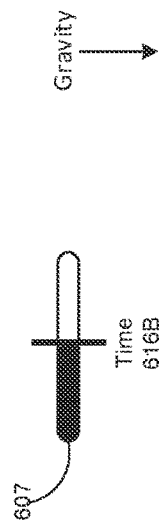
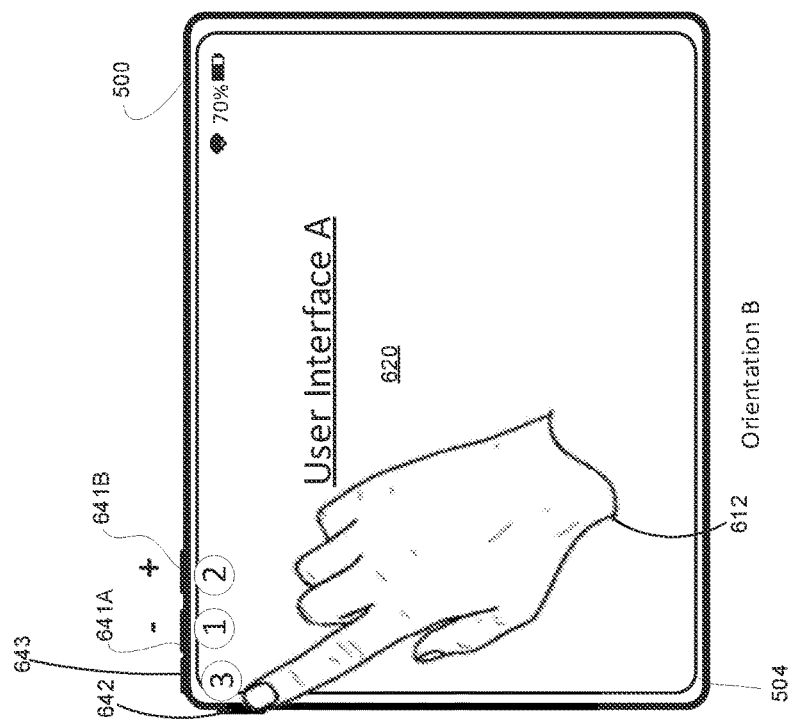
FIG. 6Q
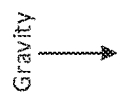

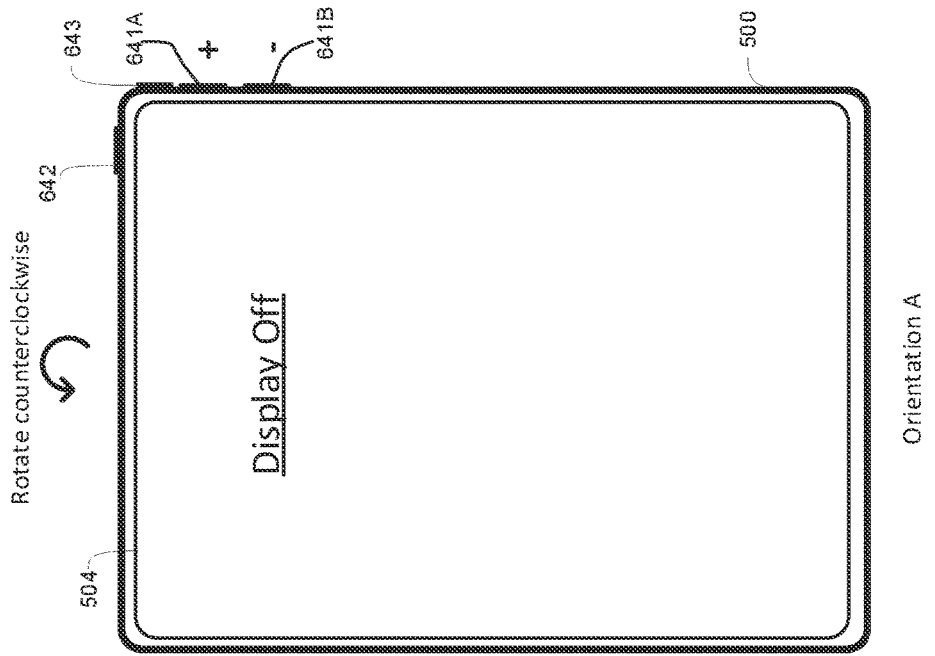
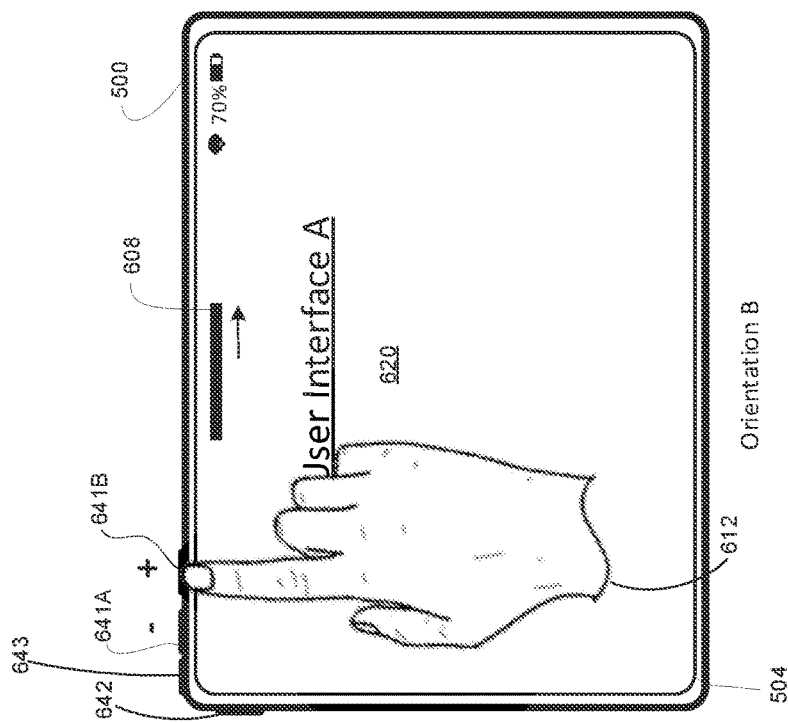
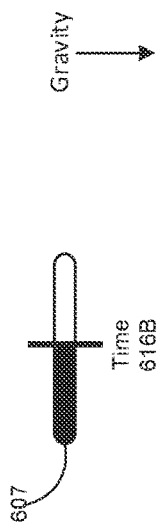
FIG. 6T
FIG. 6S

METHODS, SYSTEMS AND DEVICES FOR DYNAMICALLY ASSIGNING BUTTON FUNCTIONALITY BASED ON ORIENTATION

CROSS-REFERENCE TO RELATED APPLICATIONS

This application claims the benefit of U.S. Provisional Application No. 63/243,685, filed Sep. 13, 2021, the content of which is incorporated herein by reference in its entirety for all purposes.

FIELD OF THE DISCLOSURE

This specification relates generally to electronic devices that dynamically assign button functionalities based on orientations associated with the devices.

BACKGROUND

User interaction with electronic devices has increased significantly in recent years. These devices can be devices such as computers, tablet computers, televisions, multimedia devices, mobile devices, and the like.

In some circumstances, an electronic device that has one or more buttons is usable in different orientations and/or displays user interfaces in different orientations.

SUMMARY

Some embodiments described in this disclosure are directed to manners in which an electronic device dynamically assigns button functionalities based on an orientation associated with the device. Enhancing interactions with the buttons of the device improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
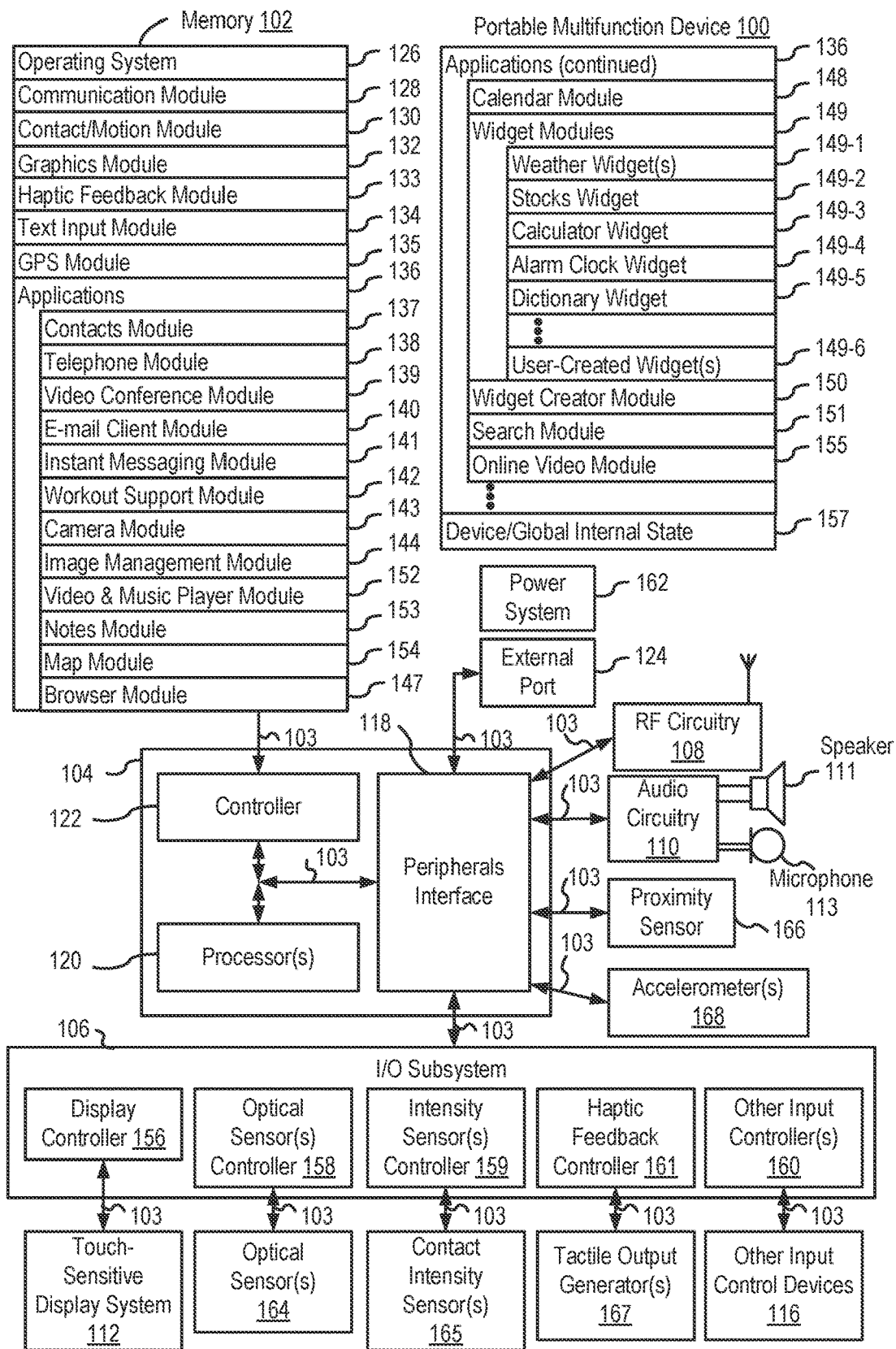
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient mechanisms for user interaction with buttons included in the electronic devices, especially for devices that are usable in multiple different orientations. Dynamically assigning button functionalities based on the orientation associated with an electronic device enhances the efficiency of such interactions. Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
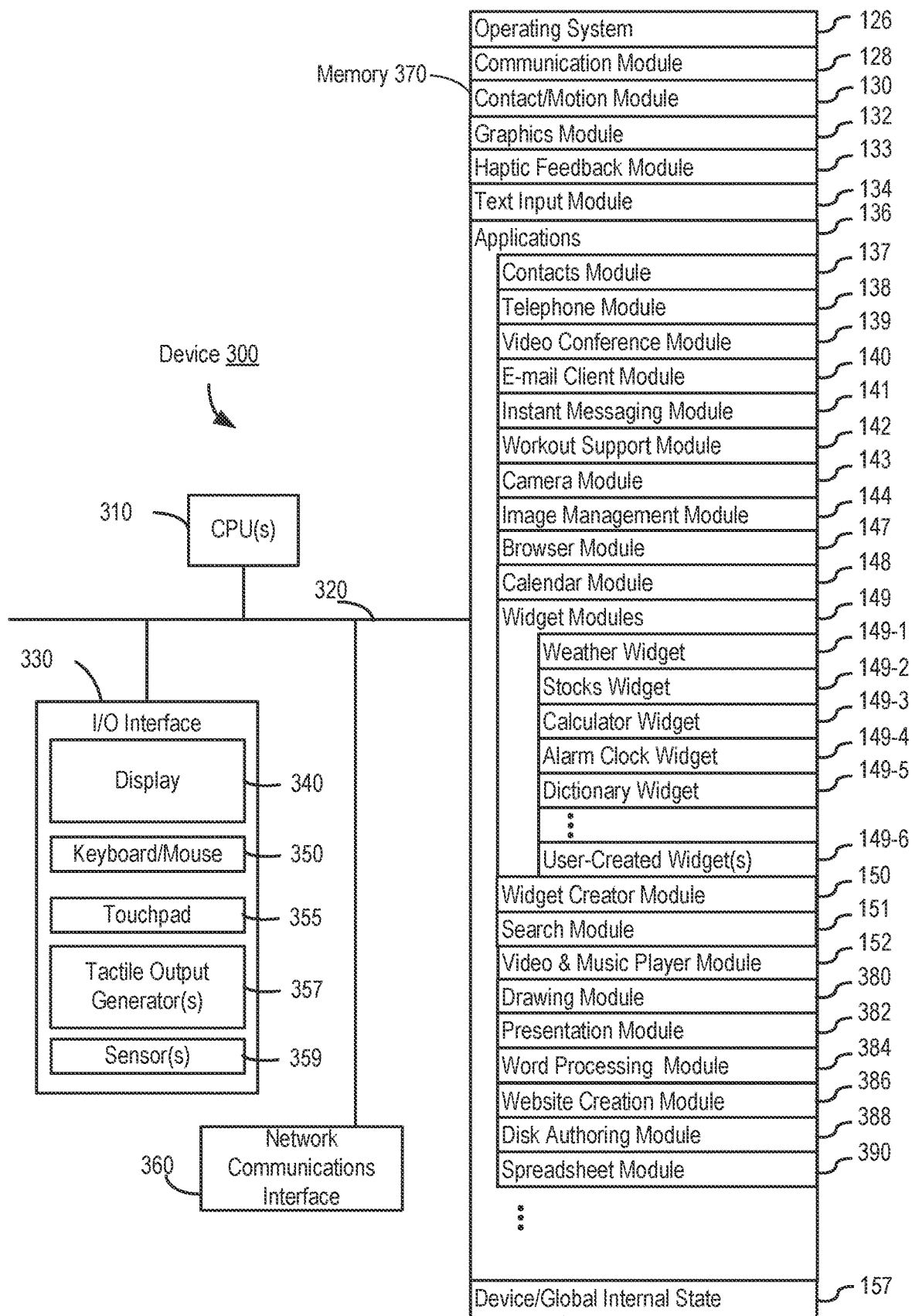
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
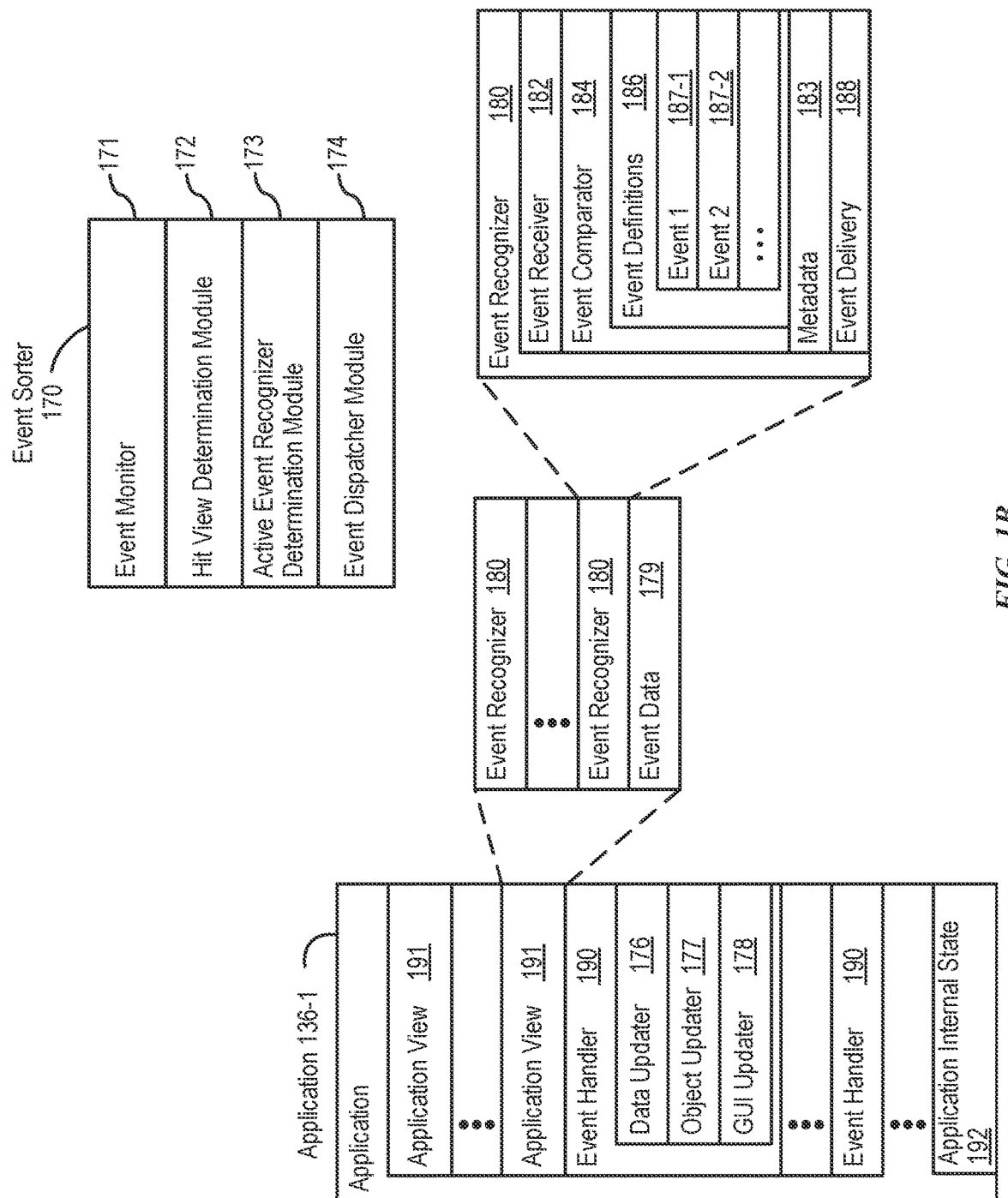
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
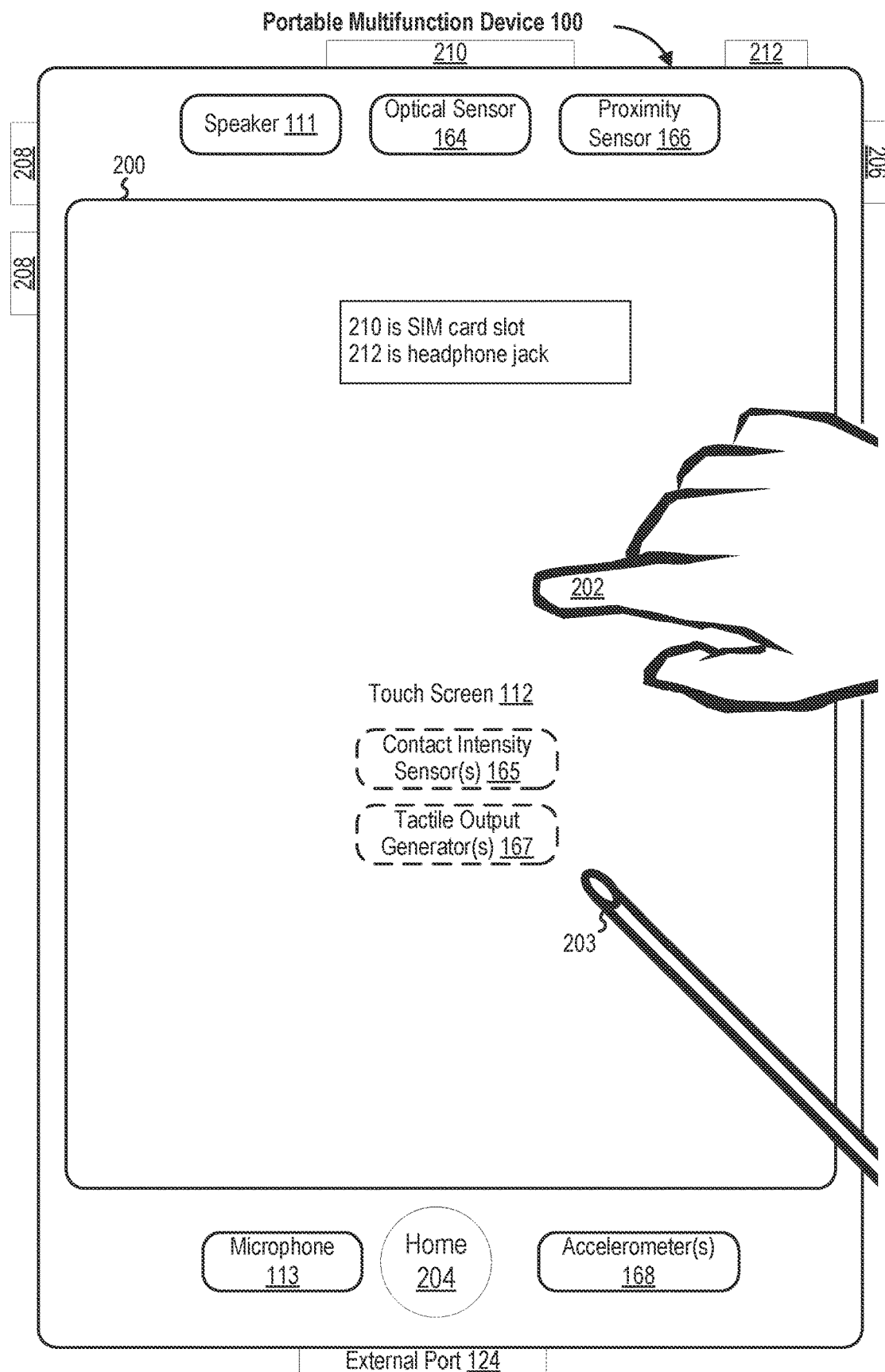
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, stylus 203 is an active device and includes one or more electronic circuitry. For example, stylus 203 includes one or more sensors, and one or more communication circuitry (such as communication module 128 and/or RF circuitry 108). In some embodiments, stylus 203 includes one or more processors and power systems (e.g., similar to power system 162). In some embodiments, stylus 203 includes an accelerometer (such as accelerometer 168), magnetometer, and/or gyroscope that is able to determine the position, angle, location, and/or other physical characteristics of stylus 203 (e.g., such as whether the stylus is placed down, angled toward or away from a device, and/or near or far from a device). In some embodiments, stylus 203 is in communication with an electronic device (e.g., via communication circuitry, over a wireless communication protocol such as Bluetooth) and transmits sensor data to the electronic device. In some embodiments, stylus 203 is able to determine (e.g., via the accelerometer or other sensors) whether the user is holding the device. In some embodiments, stylus 203 can accept tap inputs (e.g., single tap or double tap) on stylus 203 (e.g., received by the accelerometer or other sensors) from the user and interpret the input as a command or request to perform a function or change to a different input mode.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed;

and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
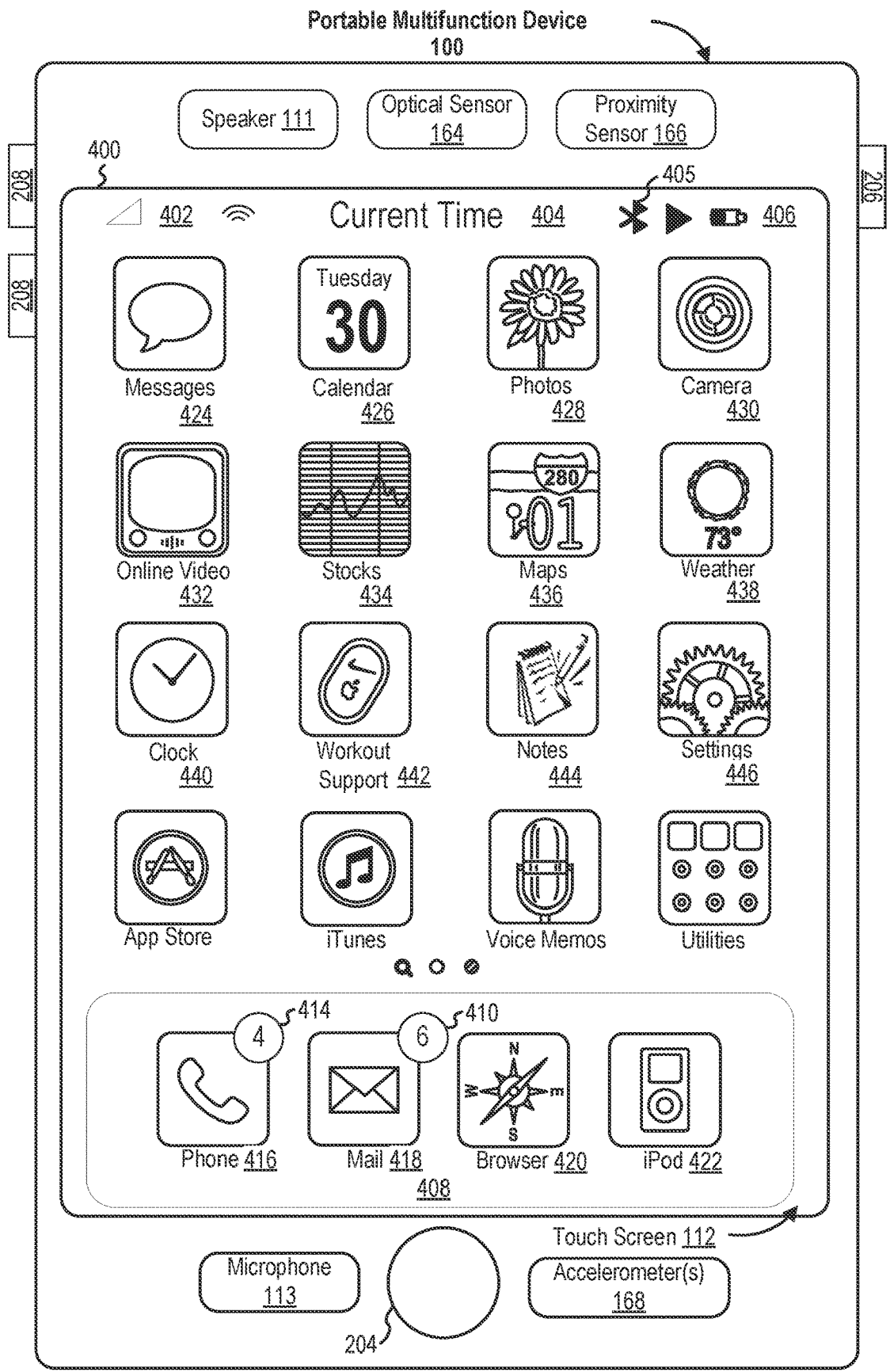
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
   Icon 416 for telephone module 138, labeled "Phone," which optionally includes an indicator 414 of the number of missed calls or voicemail messages;
   Icon 418 for e-mail client module 140, labeled "Mail," which optionally includes an indicator 410 of the number of unread e-mails;
   Icon 420 for browser module 147, labeled "Browser;" and
   Icon 422 for video and music player module 152, also referred to as iPod (trademark of Apple Inc.) module 152, labeled "iPod;" and
Icons for other applications, such as:
   Icon 424 for IM module 141, labeled "Messages;"
   Icon 426 for calendar module 148, labeled "Calendar;"
   Icon 428 for image management module 144, labeled "Photos;"
   Icon 430 for camera module 143, labeled "Camera;"
   Icon 432 for online video module 155, labeled "Online Video;"
   Icon 434 for stocks widget 149-2, labeled "Stocks;"
   Icon 436 for map module 154, labeled "Maps;"
   Icon 438 for weather widget 149-1, labeled "Weather;"
   Icon 440 for alarm clock widget 149-4, labeled "Clock;"
   Icon 442 for workout support module 142, labeled "Workout Support;"
   Icon 444 for notes module 153, labeled "Notes;" and
   Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
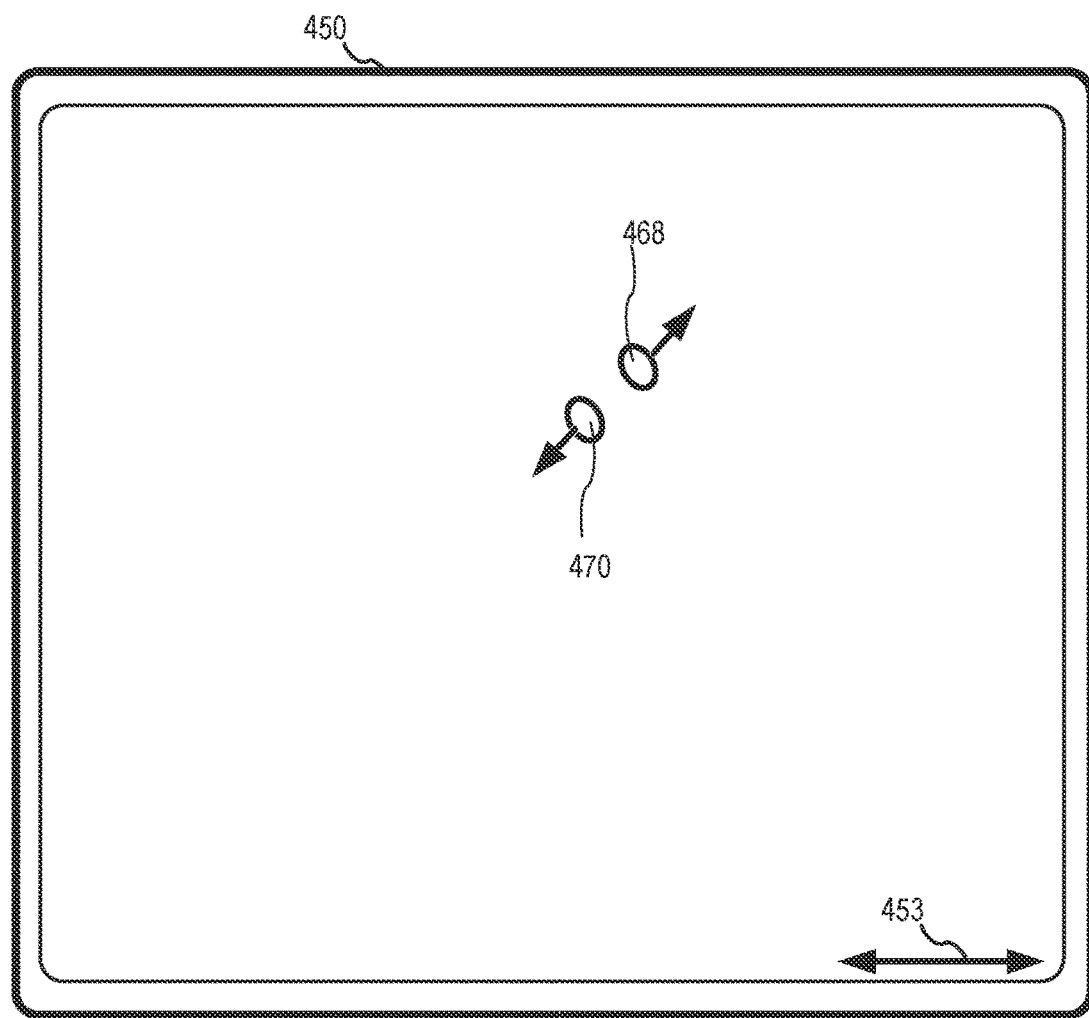
FIG. 4B illustrates an exemplary user interface for a multifunction device with a touch-sensitive surface that is separate from the display in accordance with some embodiments.
Figure 4B:
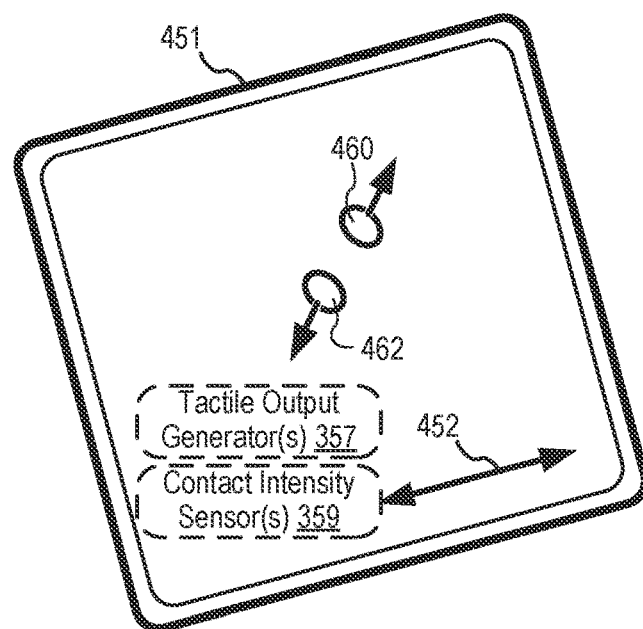

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
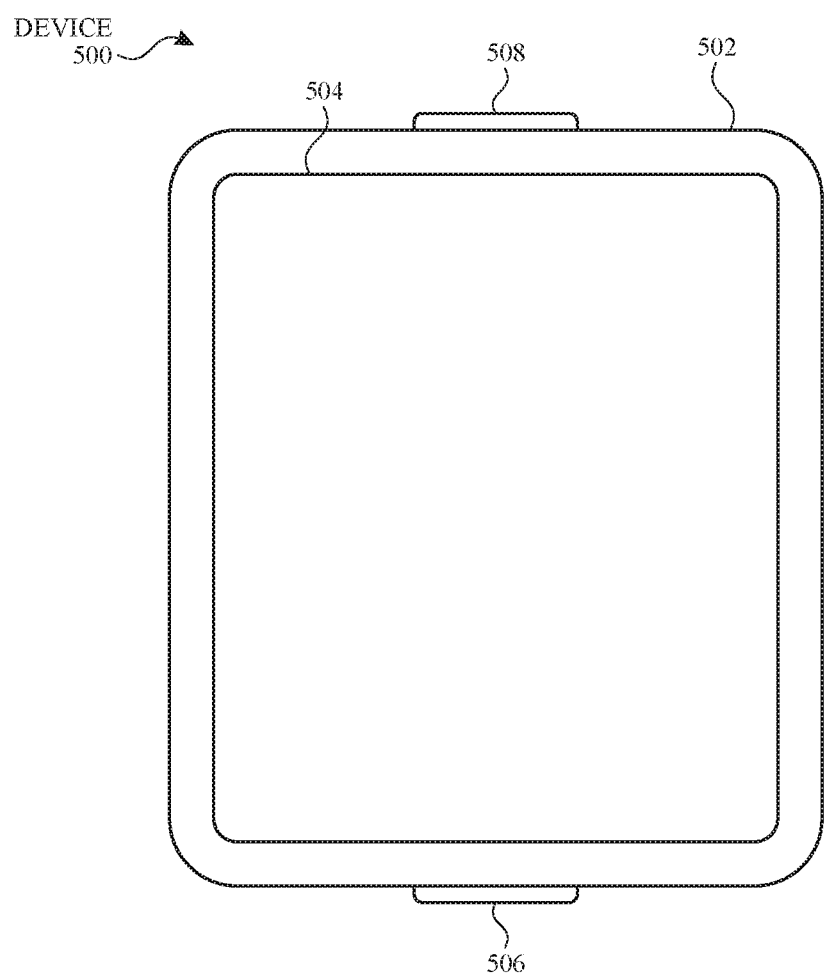
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
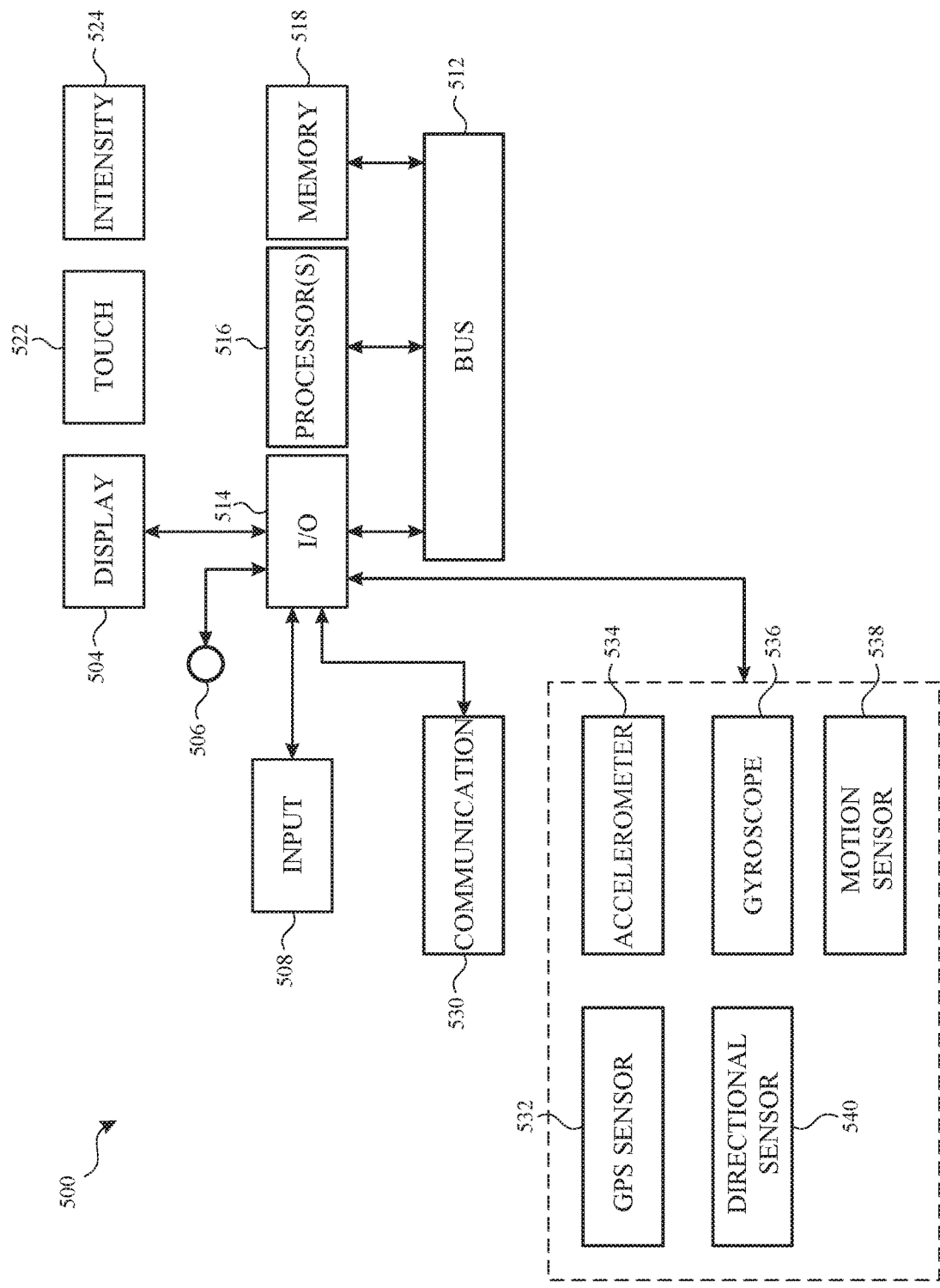
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIGS. 7A-7M). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
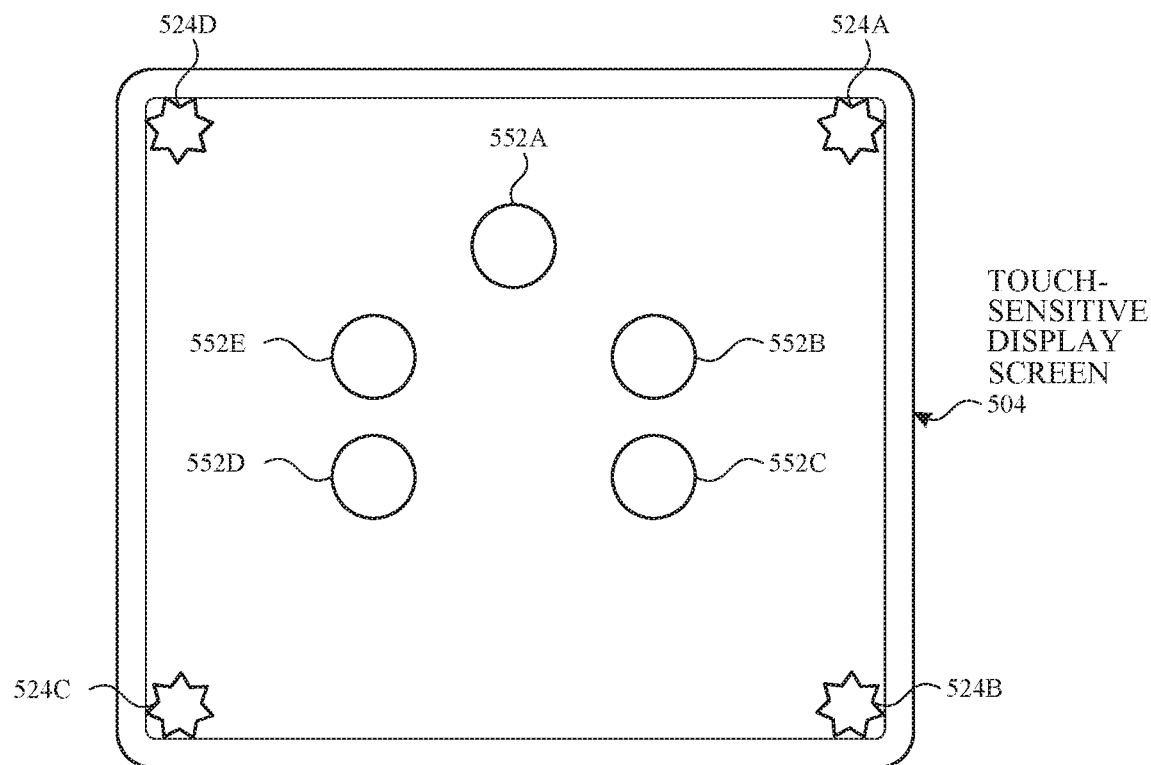
FIGS. 5C-5D illustrate exemplary components of a personal electronic device having a touch-sensitive display and intensity sensors in accordance with some embodiments.
Figure 5C:
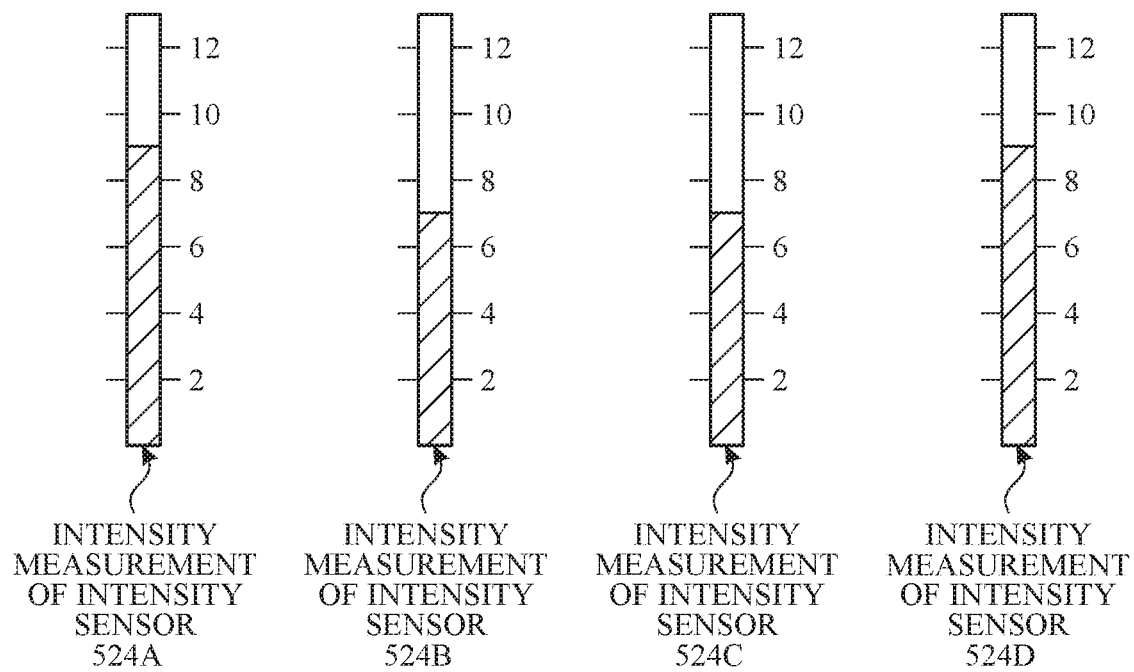
Figure 5D:
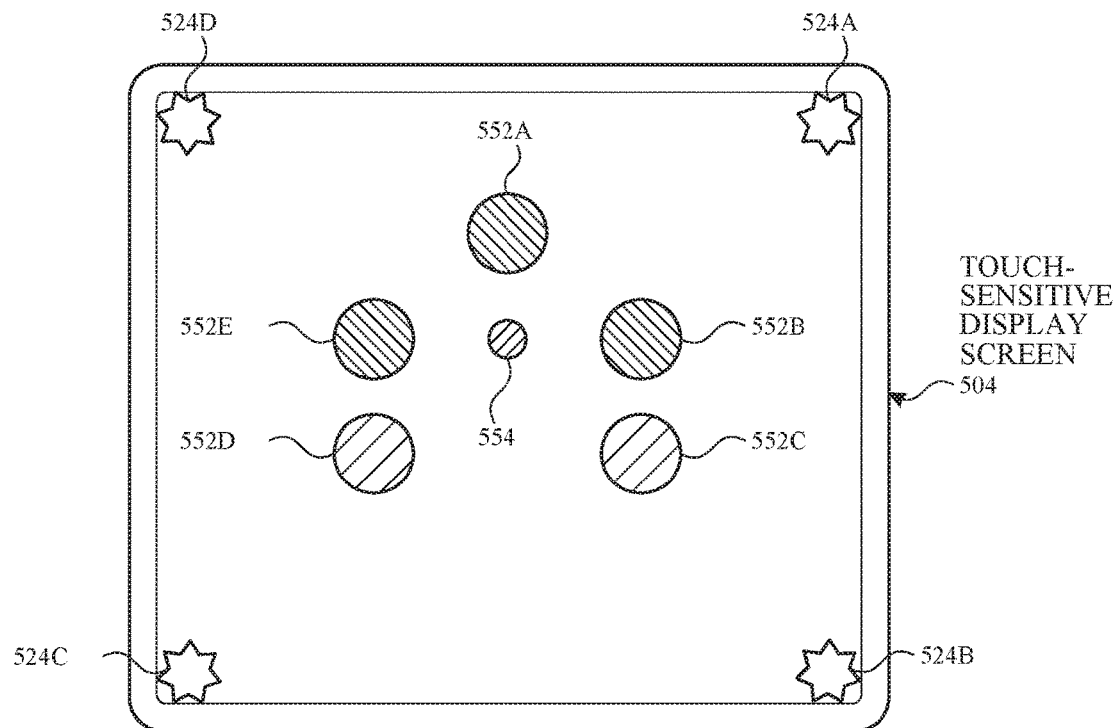
Figure 5D:
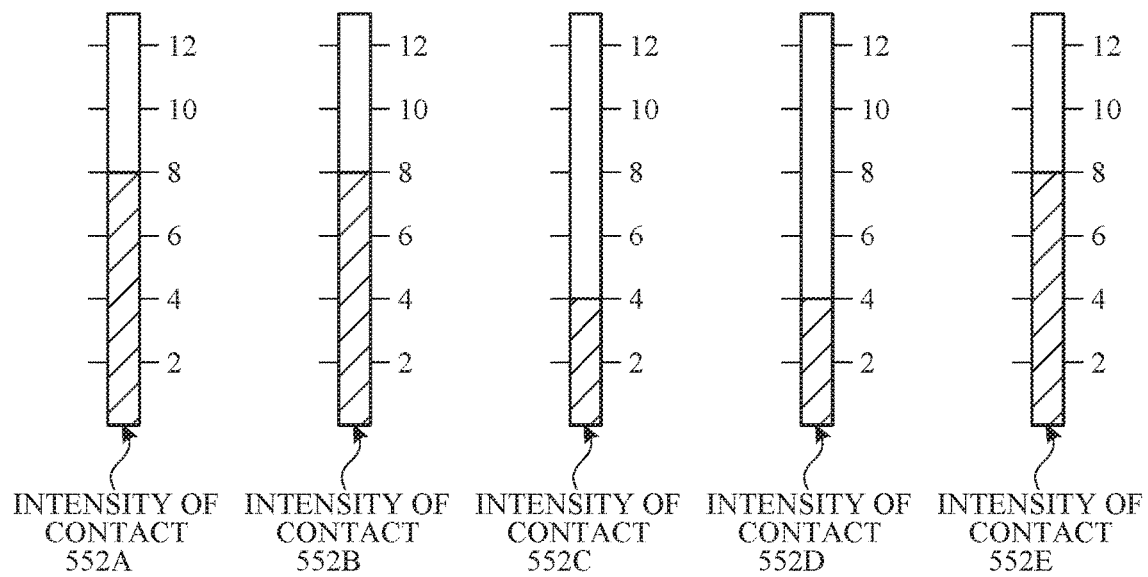

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
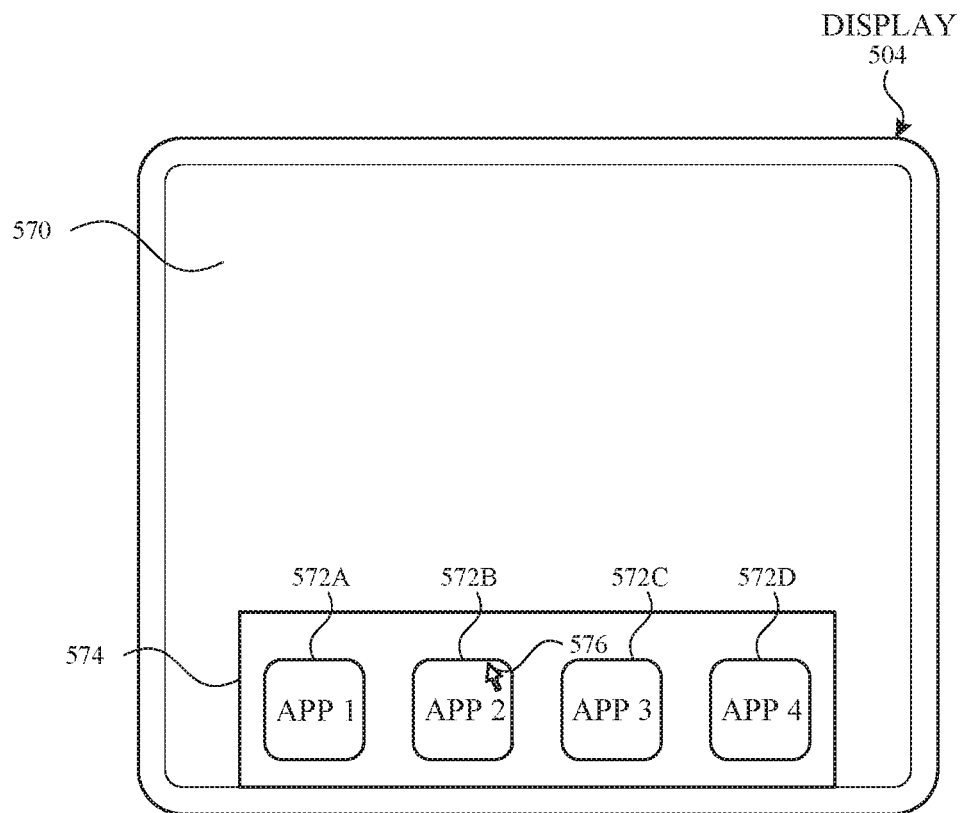
FIGS. 5E-5H illustrate exemplary components and user interfaces of a personal electronic device in accordance with some embodiments.
Figure 5E:
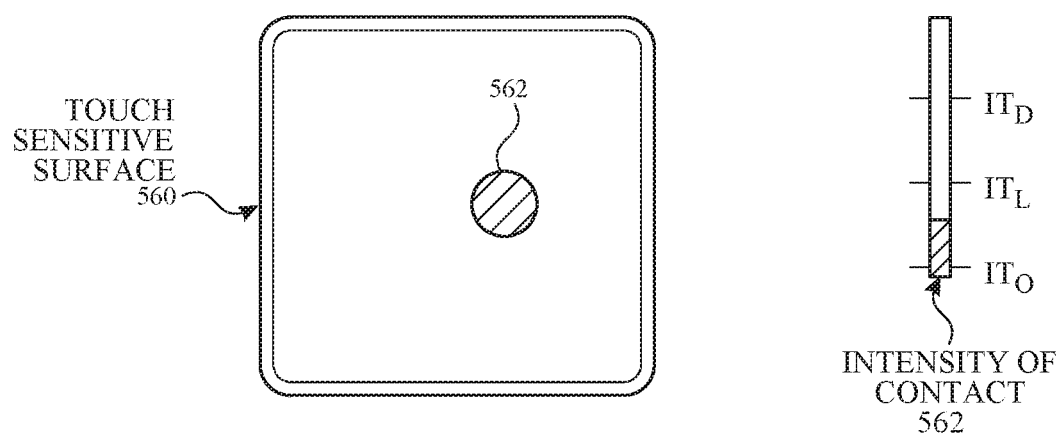
Figure 5F:
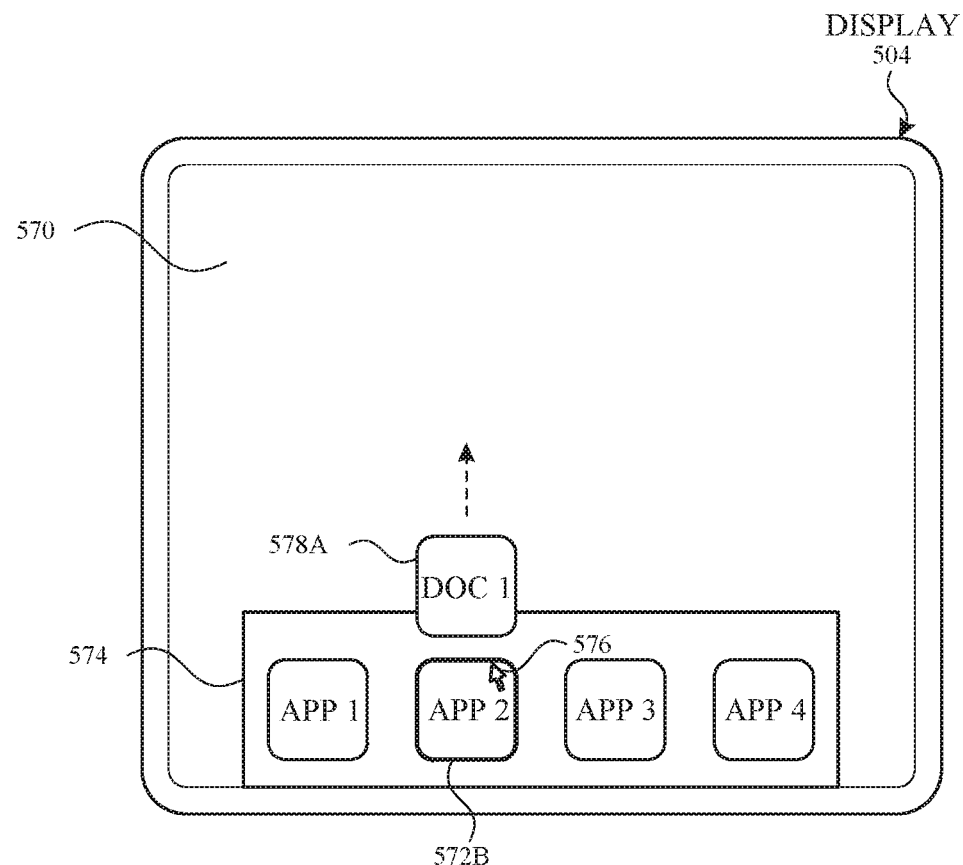
Figure 5F:
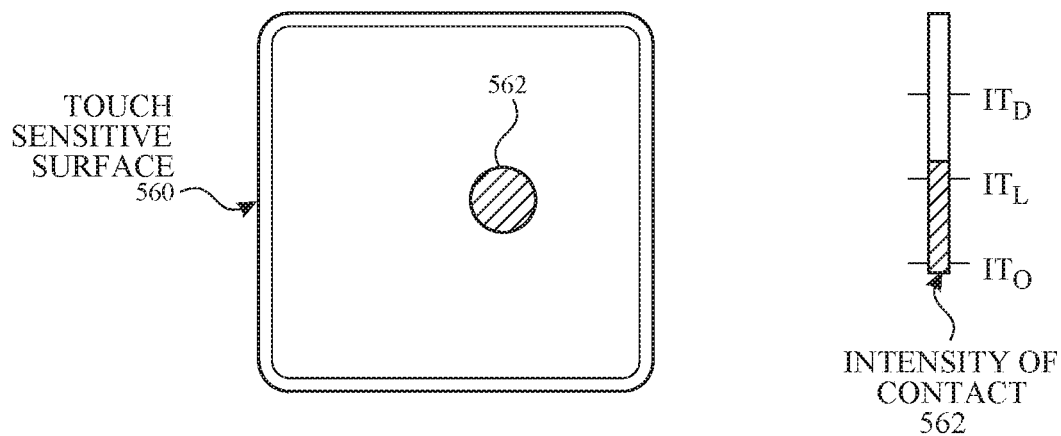
Figure 5G:
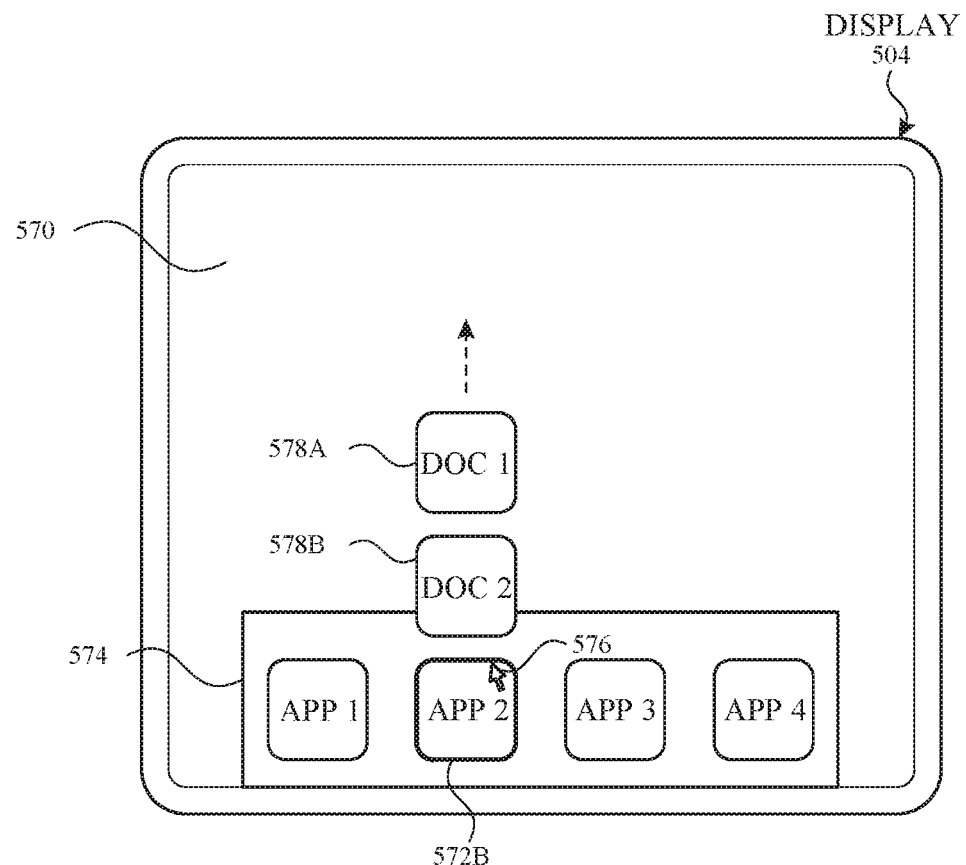
Figure 5G:
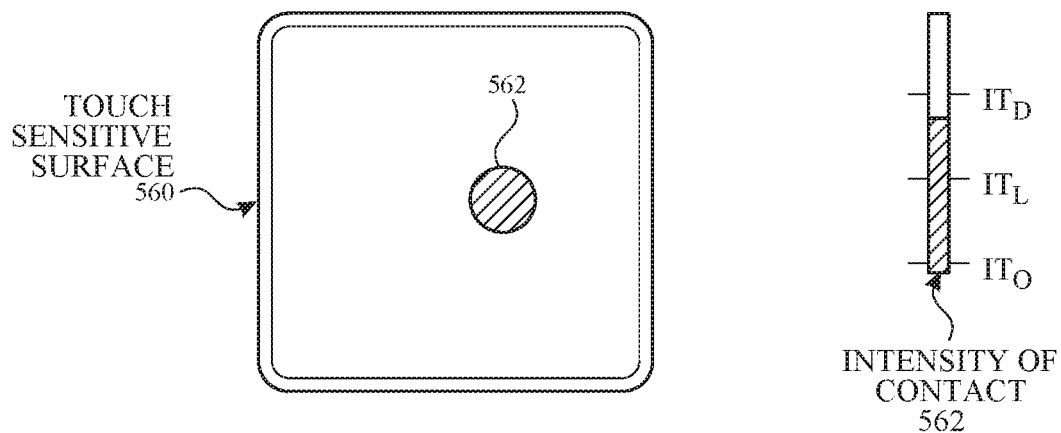
Figure 5H:
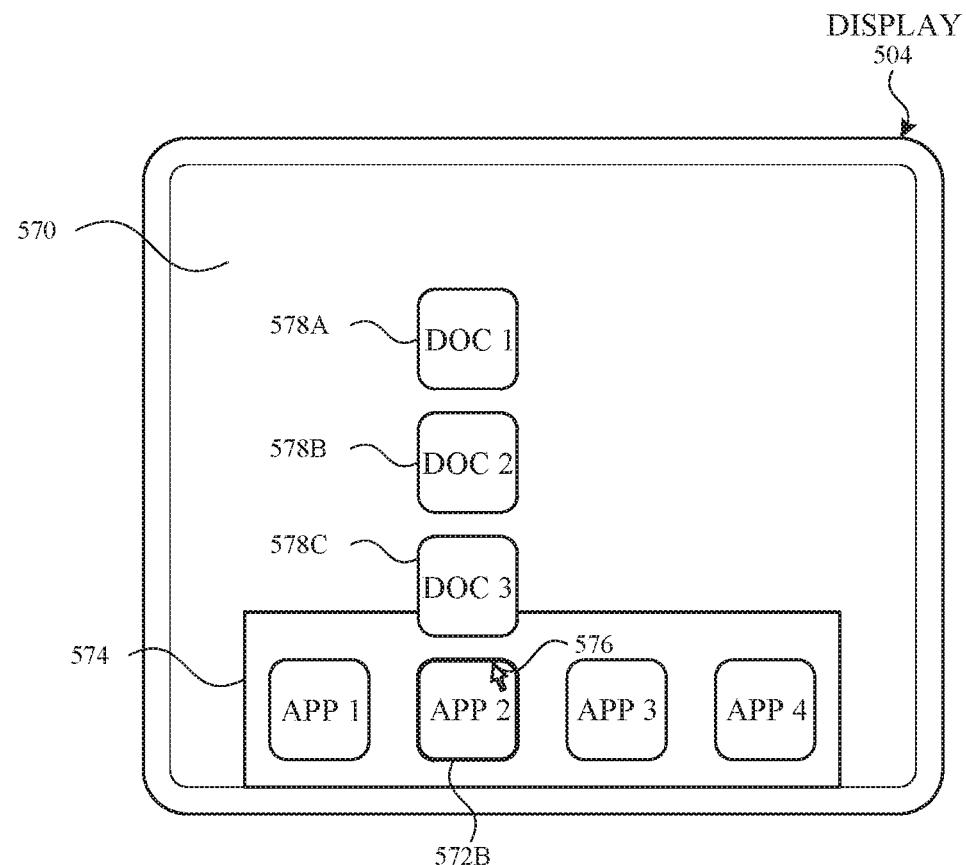
Figure 5H:
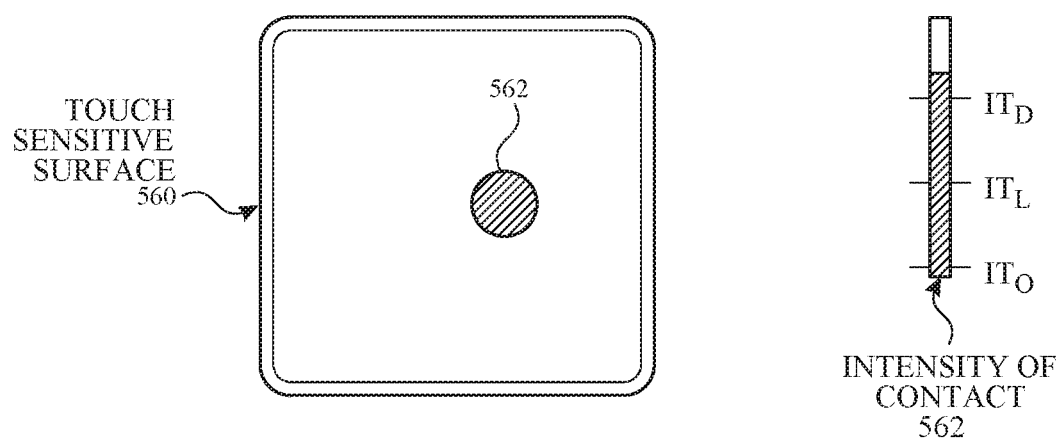

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
  an active application, which is currently displayed on a display screen of the device that the application is being used on;
  a background application (or background processes), which is not currently displayed, but one or more processes for the application are being processed by one or more processors; and
  a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UP") and associated processes that are implemented on an electronic device, such as device 100, device 300, or device 500.

User Interfaces and Associated Processes

Interacting with an Electronic Device Having One or More Buttons

Users interact with electronic devices in many different manners, including interacting with one or more buttons and adjusting orientations associated with electronic devices (e.g., for altering orientations of user interfaces displayed via the electronic devices). In some circumstances, after adjusting an orientation associated with an electronic device (e.g., a portrait orientation or a landscape orientation), a user may wish to interact with one or more buttons of the electronic device, which are optionally buttons controlling a parameter associated with the electronic device (e.g., a volume of audio emitted by the electronic device). In some embodiments, the orientation associated with the electronic device corresponds to the orientation of a user interface displayed by the electronic device and/or the orientation of the electronic device with respect to an external reference, such as gravity (e.g., as described in more detail with reference to method 700). The embodiments described below provide ways in which an electronic device provides for dynamic assignment of functionality to one or more buttons of the electronic device based on an orientation associated with the electronic device, thus enhancing the user's interaction with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6B:
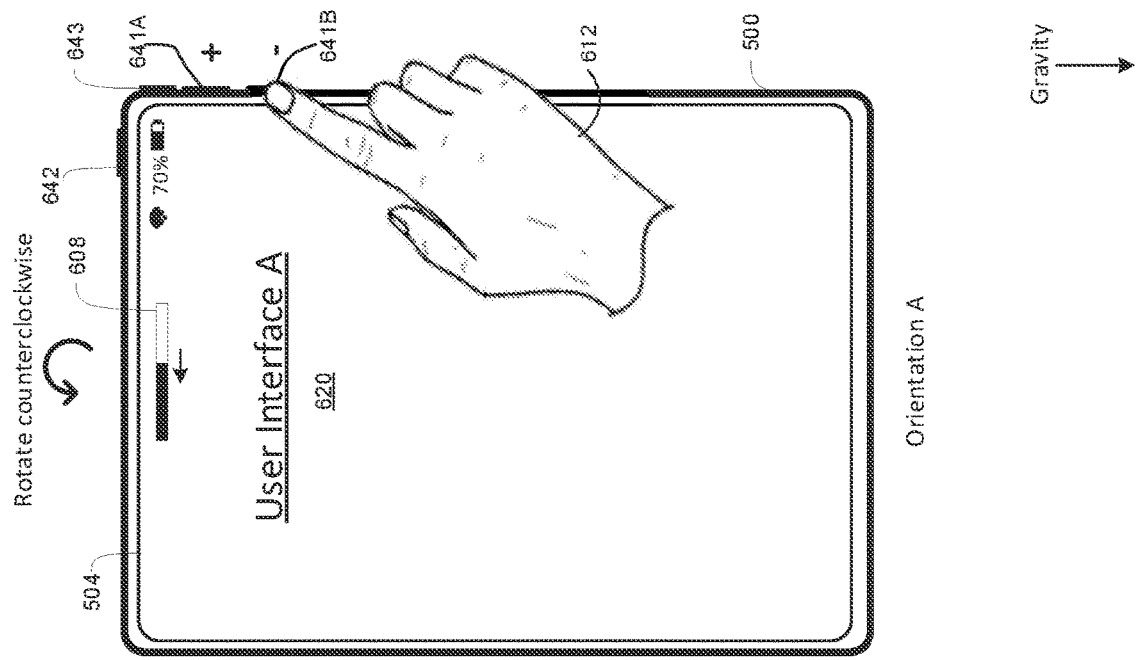
FIGS. 6A-6Z illustrate exemplary ways in which an electronic device dynamically assigns buttons functionalities based on an orientation associated with the device in accordance with some embodiments.
Figure 6A:
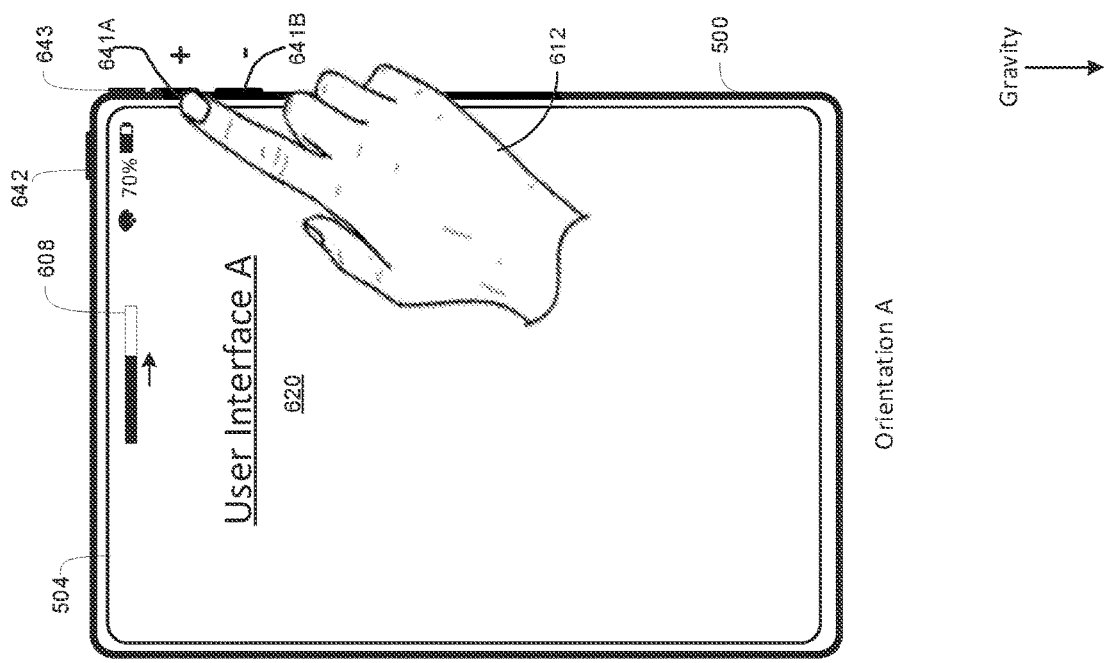
Figure 6D:
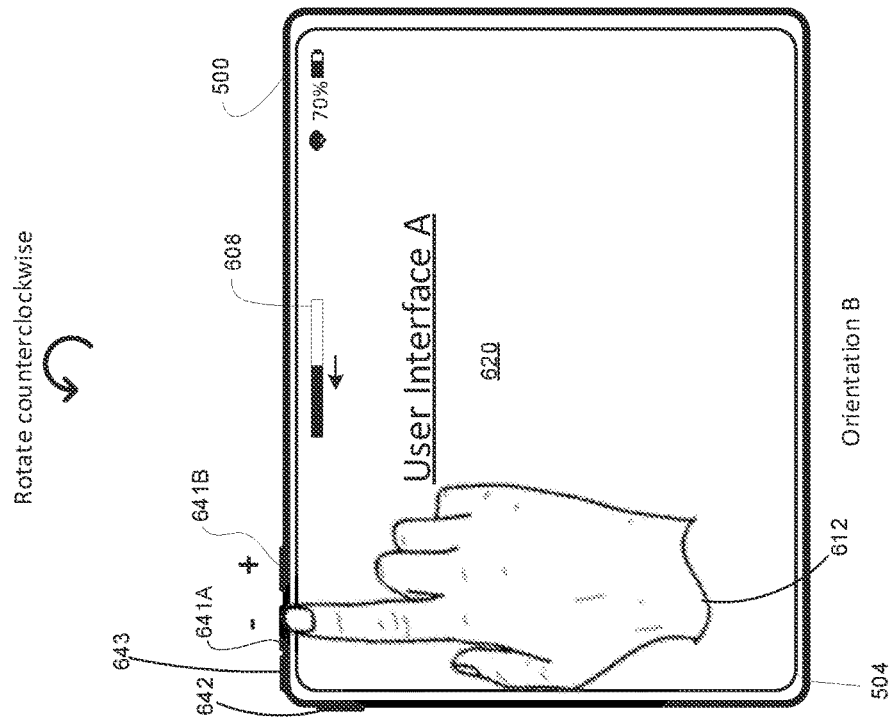
Figure 6D:
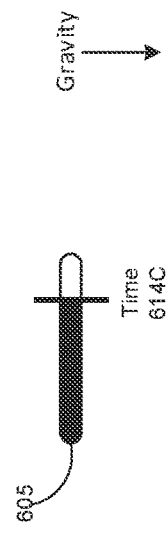
Figure 6C:
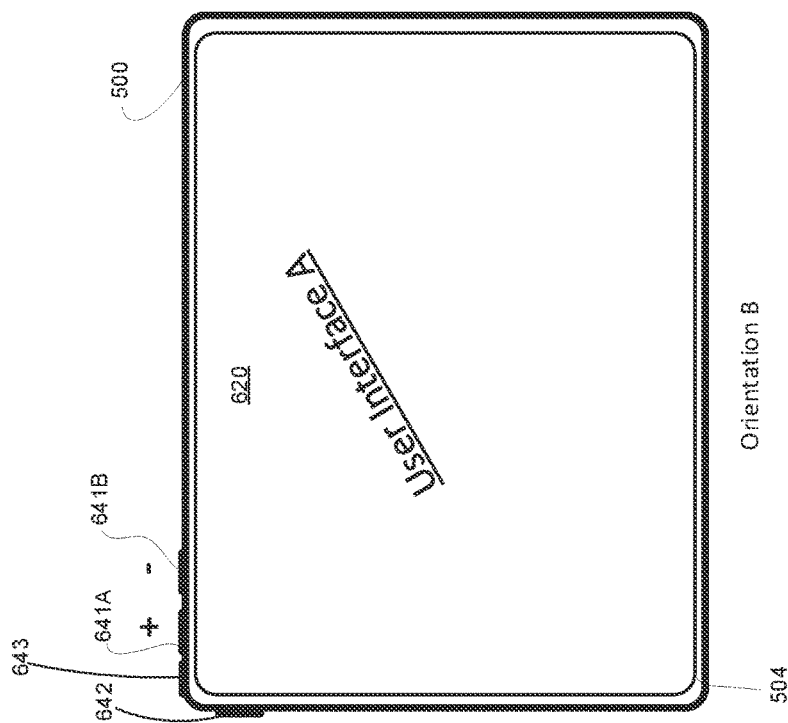
Figure 6C:
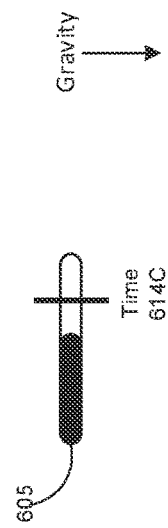
Figure 6F:
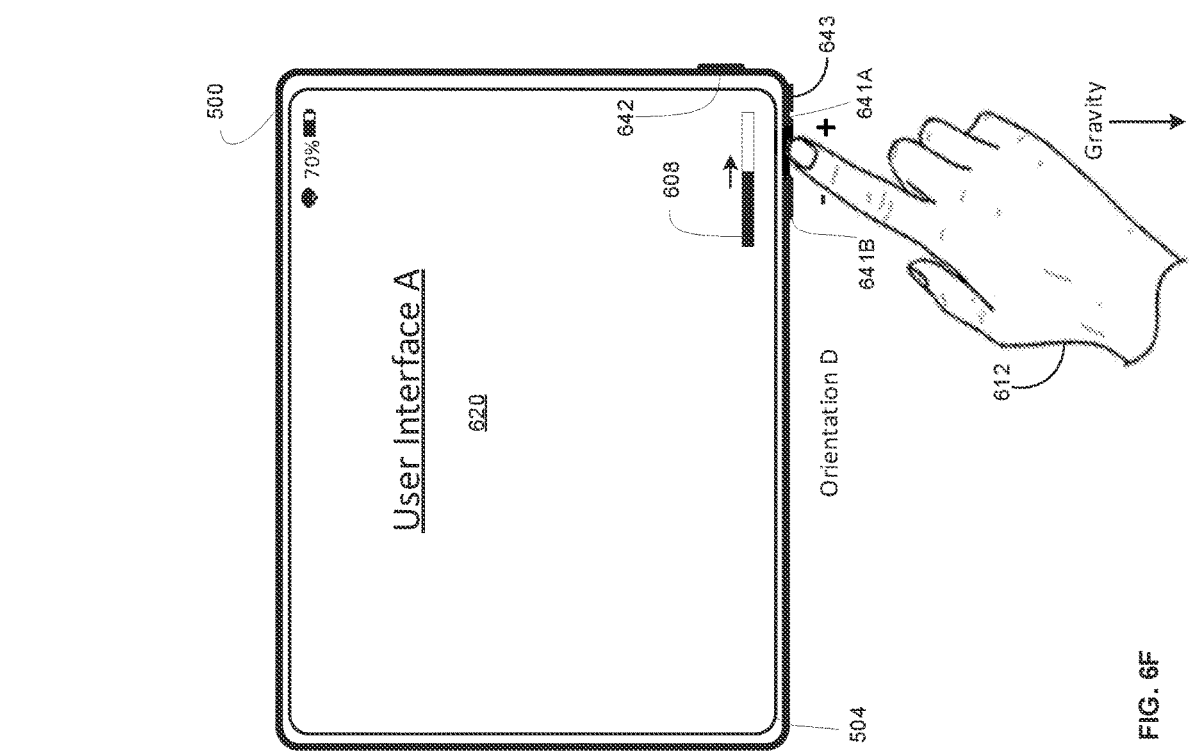
Figure 6E:
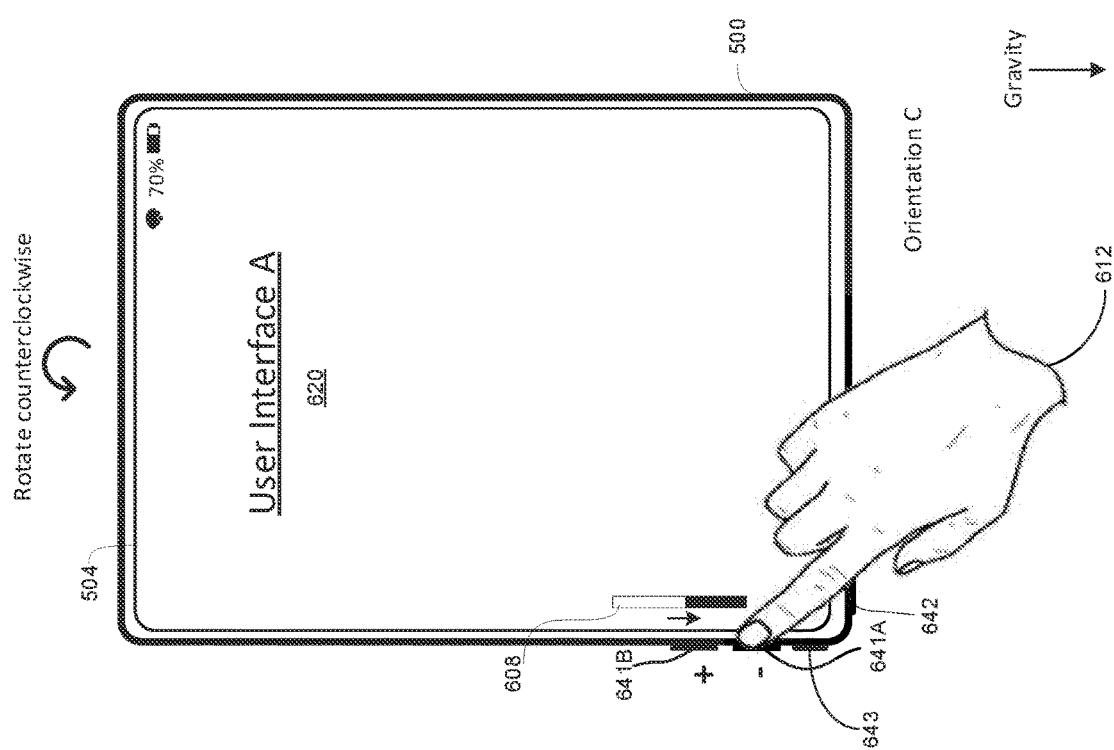
Figure 6J:
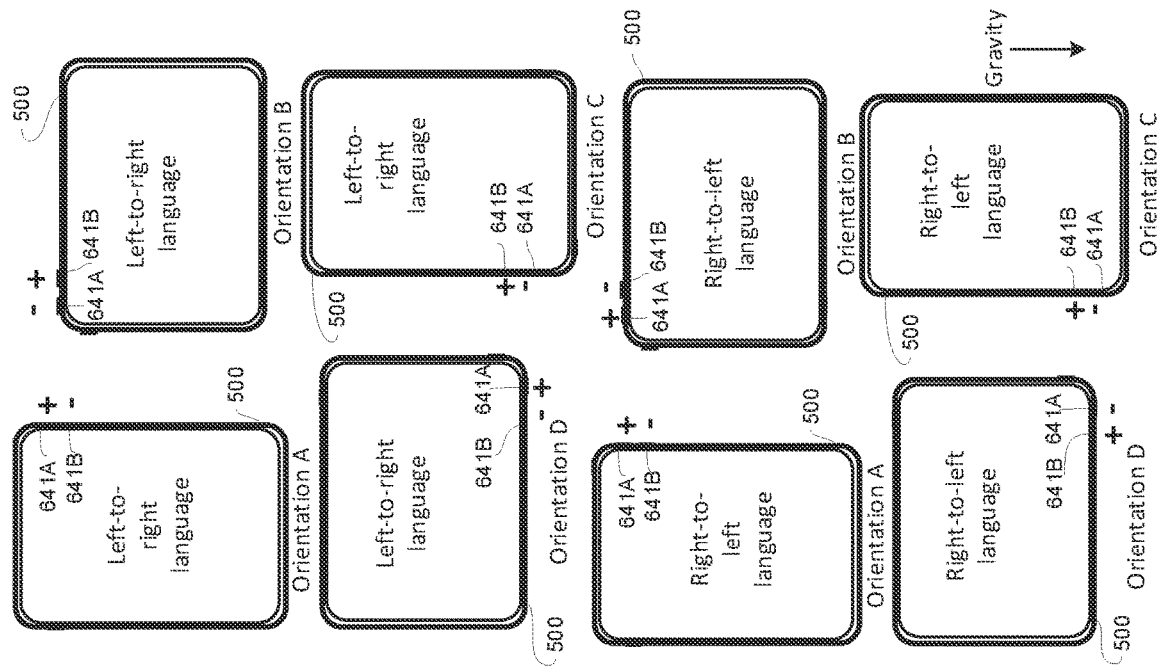
Figure 6I:
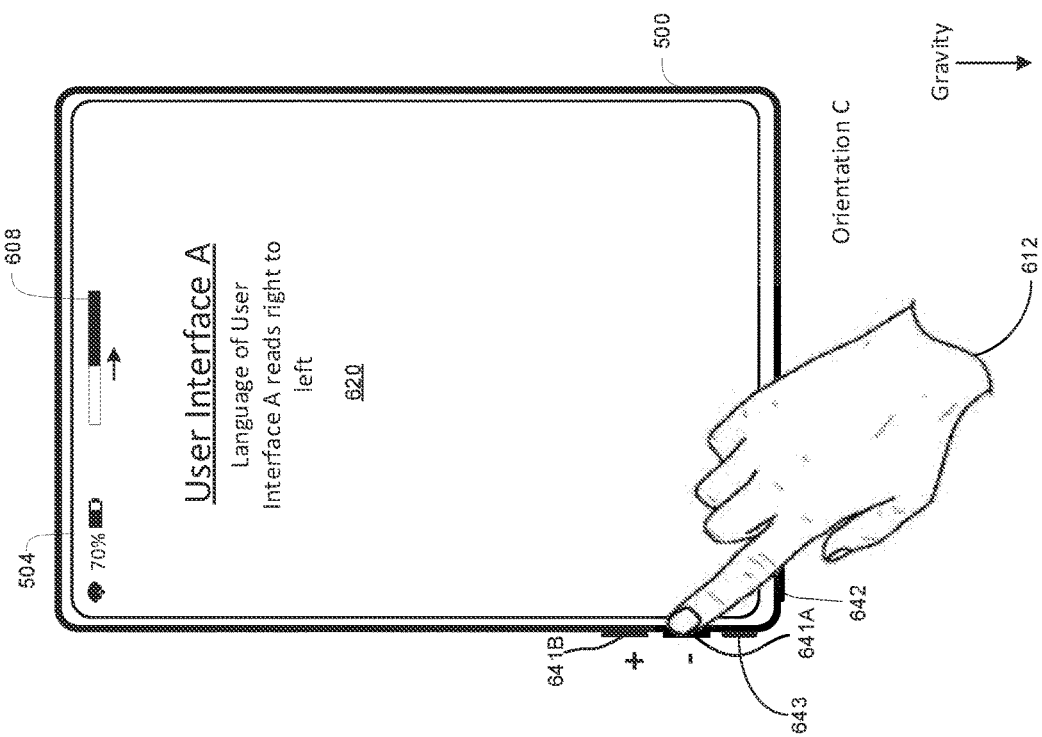
Figure 6P:
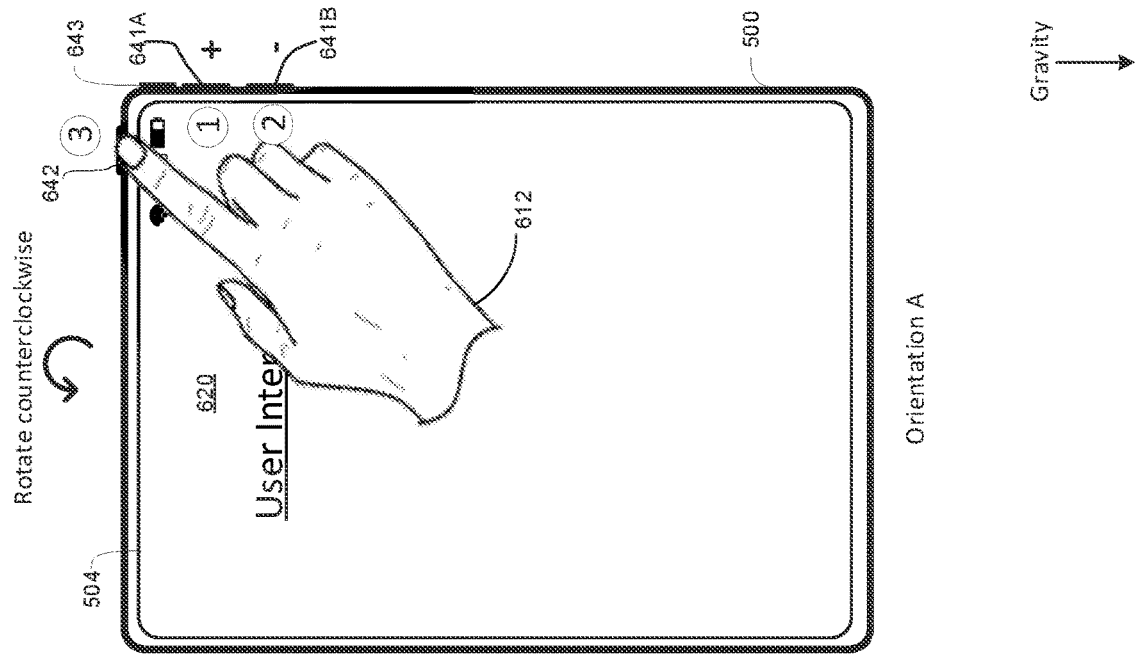
Figure 6O:
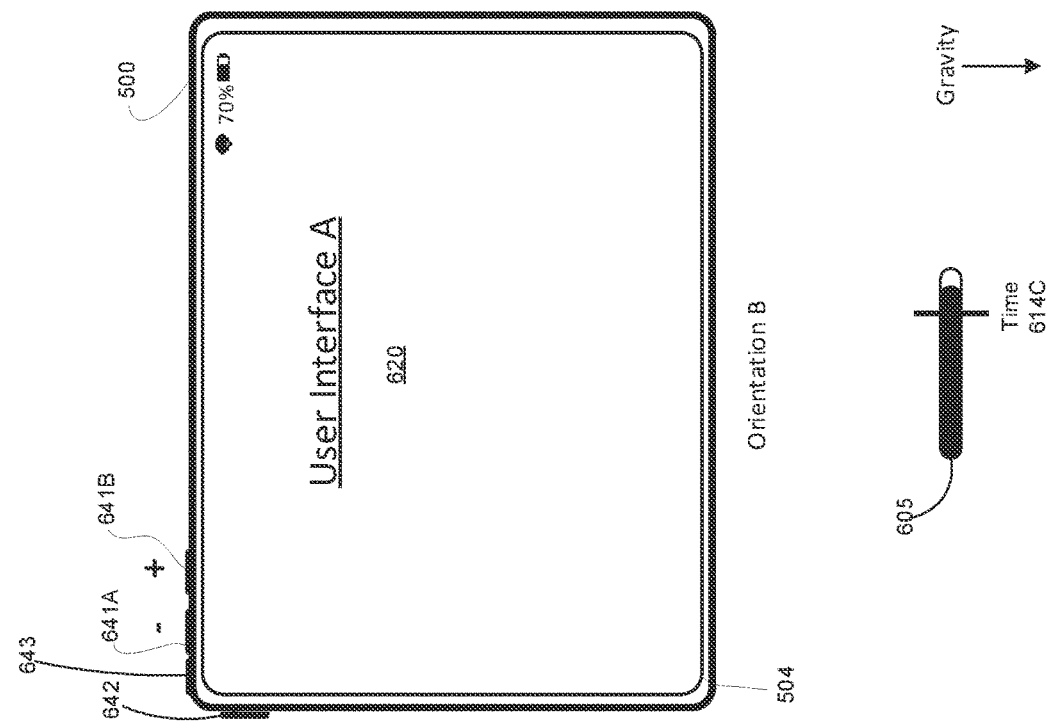
Figure 6V:
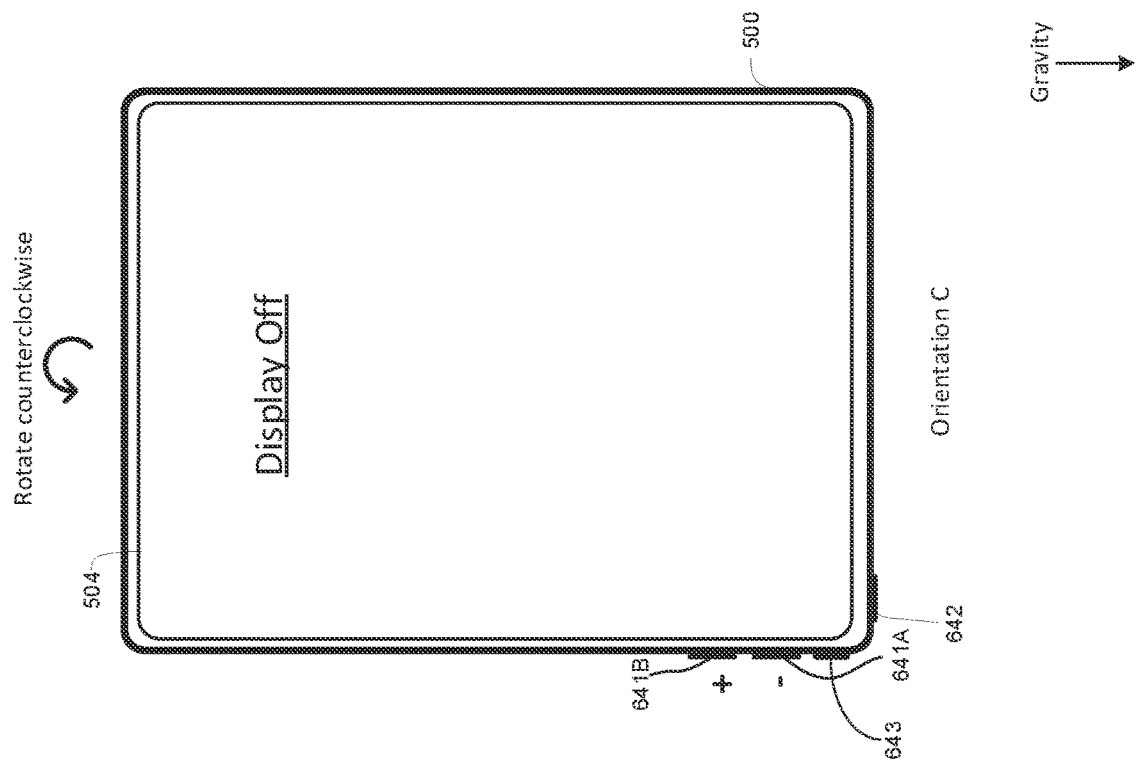
Figure 6U:
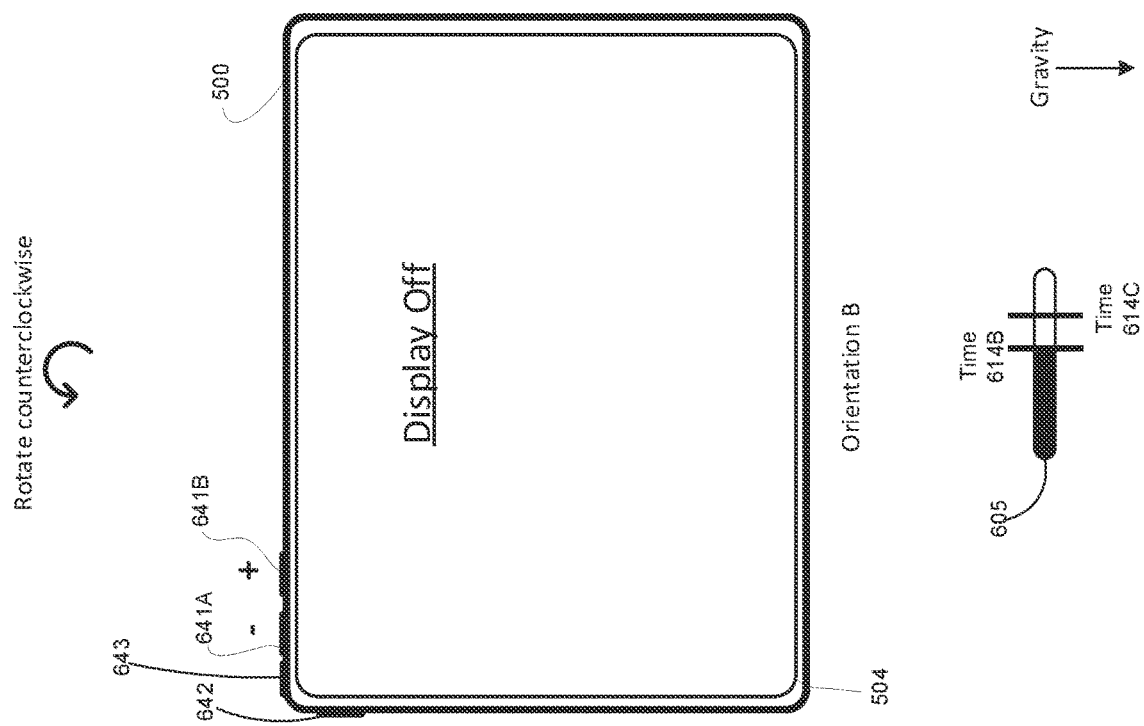
Figure 6X:
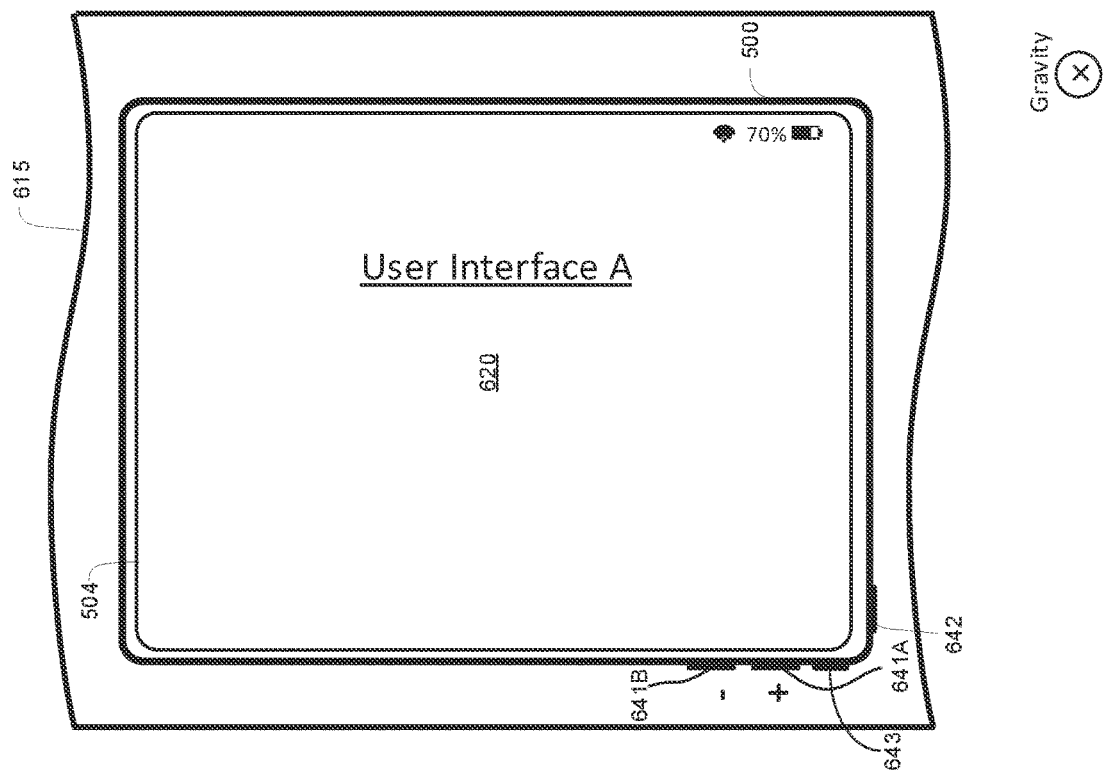
Figure 6W:
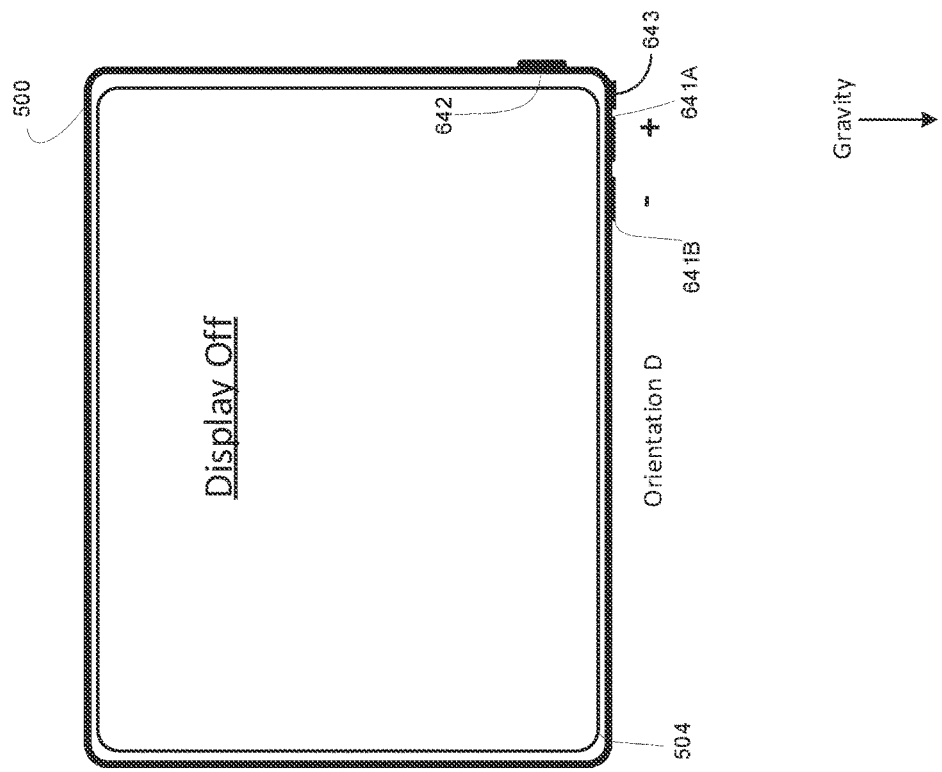
Figure 6Z:
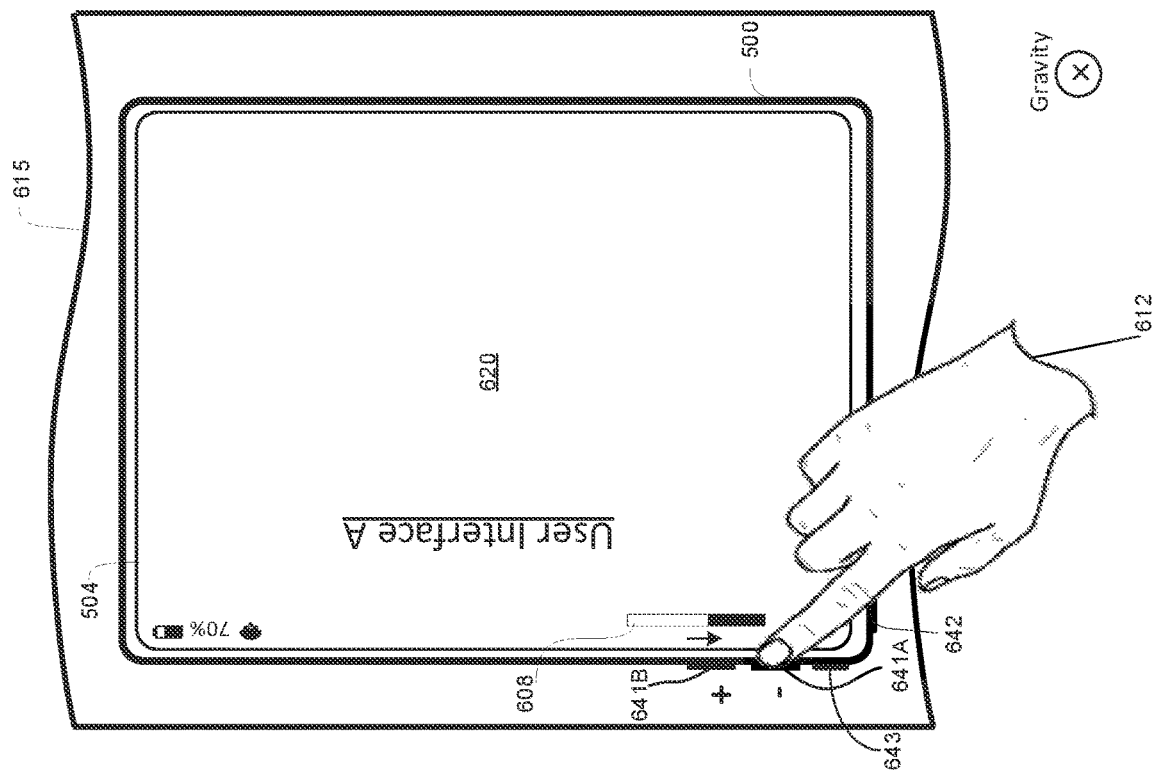

FIGS. 6A-6Z illustrate exemplary ways in which an electronic device provides for dynamic assignment of functionality to one or more buttons of the electronic device based on an orientation associated with the electronic device. The embodiments in these figures are used to illustrate the processes described below, including the processes described with reference to FIGS. 7A-7M. Although FIGS. 6A-6Z illustrate various examples of ways an electronic device is able to perform the processes described below with reference to FIGS. 7A-7M, it should be understood that these examples are not meant to be limiting, and the electronic device is able to perform one or more processes described below with reference to FIGS. 7A-7M in ways not expressly described with reference to FIGS. 6A-6Z.

FIG. 6A illustrates an exemplary device 500 displaying a user interface. In some embodiments, the user interface 620 is displayed via a display generation component (e.g., a touch screen 504). In some embodiments, the display generation component is a hardware component (e.g., including electrical components) capable of receiving display data and displaying a user interface. In some embodiments, examples of a display generation component include a touch screen display, a monitor, a television, a projector, an integrated, discrete, or external display device, or any other suitable display device. In some embodiments, user interface 620 is a home screen user interface of device 500 (e.g., such as described with reference to FIG. 4A), an application user interface of an application running on device 500 (e.g., a messaging application), or any other user interface configured to be displayed via the display generation component.

As used herein, the orientation associated with the electronic device optionally refers to the orientation of the electronic device with respect to an external reference, such as gravity. The orientation associated with the electronic device optionally refers to the orientation of a user interface displayed or configured to be displayed on a display of the electronic device. In some circumstances, as described herein, the orientation of the user interface controls over the orientation of the electronic device with respect to the external reference.

In FIG. 6A, device 500 is arranged in a first orientation (e.g., Orientation A), which is optionally a portrait (or substantially vertical) orientation with respect to a reference (e.g., gravity). For example, the side of device 500 that includes buttons 641A and 641B, which will be described below, is parallel with respect to gravity. In some embodiments, the user interface (e.g., User Interface A) is arranged in an orientation that corresponds to the orientation associated with the electronic device 500. For example, the user interface is optionally displayed in the first orientation (e.g., Orientation A) on the touch screen 504. In some embodiments, a language associated with the user interface is a left-to-right language (e.g., text displayed on the user interface reads from left to right). In some embodiments, electronic device 500 includes one or more buttons (e.g., physical buttons), which include a first button 641A and a second button 641B disposed on a same side of device 500. In some embodiments, the one or more buttons of the electronic device are assigned a functionality depending on the orientation associated with the electronic device 500. For example, the first button 641A and the second button 641B are optionally selectable to control a volume of audio emitted by the electronic device (e.g., volume of music, video, etc.). Additionally, as shown, device 500 optionally includes a power button, which, in some embodiments, is provided as power button 642 disposed on a top of device 500 in the first orientation or, in some embodiments, as power button 643 disposed on a same side of first and second buttons 641A and 641B. In FIG. 6A, while the device is oriented in the first orientation, selection of the first button 641A causes the volume of audio emitted by the device to increase, and selection of the second button 641B causes the volume of audio emitted by the device to decrease.

In FIG. 6A, hand 612 is providing selection input to first button 641A (e.g., a finger press or hold on the button). In response to detecting the selection of first button 641A, the electronic device 500 optionally increases the volume of audio. In some embodiments, the device displays a user interface element 608, which is optionally a volume element/bar/HUD displayed on a region of the user interface. For example, volume HUD 608 indicates a respective amount that the volume of audio has increased or decreased in response to selection of the one or more buttons. In FIG. 6A, user interface element 608 indicates that the device 500 increases the volume of audio in response to selection of first button 641A. In some embodiments, user interface element 608 is displayed in a fixed region of the user interface (e.g., at or near a top of the user interface) irrespective of the orientation associated with the electronic device. In some embodiments, user interface element 608 is displayed dynamically in the user interface, such that user interface element 608 is displayed in a region of the user interface that depends on the orientation associated with the device (e.g., near the one or more buttons 641A and/or 641B), as discussed below. In some embodiments, user interface element 608 is displayed on the user interface before the device detects selection of the one or more buttons (e.g., display of the volume HUD is maintained on the user interface), and selection of the one or more buttons updates the display of user interface element 608 to indicate an amount that the volume of audio increases or decreases.

In FIG. 6B, hand 612 is providing selection input to second button 641B while device 500 is associated with the first orientation (e.g., Orientation A). In response to detecting selection of second button 641B, the volume of audio emitted by device 500 optionally decreases, as reflected by the display/update of user interface element 608. In some embodiments, the device 500 can be rotated by a user of the electronic device, such that the orientation associated with device 500 changes with respect to the reference (e.g., gravity). In FIG. 6B, a counterclockwise rotation is provided to device 500 (e.g., via a hand of the user) to change the orientation associated with device 500 from the first orientation to a second orientation, different from the first orientation.

As shown in FIG. 6C, in response to the rotation rotating the device 500 counterclockwise (e.g., a top edge of the device by 90 degrees), device 500 is in the second orientation (e.g., Orientation B), which is a landscape (or substantially horizontal) orientation with respect to the reference (e.g., gravity). In some embodiments, the orientation of the user interface changes in accordance with the change in orientation of device 500. In some embodiments, a change in the orientation of the user interface is animated, such that respective intermediate changes in the user interface as the user interface transitions (e.g., rotates) from the first orientation to the second orientation are displayed on the touch screen 504, as shown in FIG. 6C. In some embodiments, in response to a change in the orientation associated with device 500, device 500 optionally initiates a dynamic reassignment of functionality of the one or more buttons based on the new orientation associated with the device. For example, reorienting device 500 from the first orientation (e.g., Orientation A) to the second orientation (e.g., Orientation B) optionally causes the volume control functionality associated with the first button 641A and the second button 641B to change. In some embodiments, a respective period of time that is required to reassign the functionality of the one or more buttons based on the new orientation of the device depends on whether the device and/or display is on (e.g., whether a respective user interface is displayed on the device). In FIG. 6C, the respective period of time that is required to reassign the functionality of the one or more buttons is represented by Time 614C in time bar 605, which indicates the elapsed time since the change in the orientation of device 500 to Orientation B. As indicated by time bar 605, because the user interface (e.g., User Interface A) is displayed on touch screen 504, device 500 optionally waits for the animation of the change in orientation of the user interface to conclude (e.g., at Time 614C) before reassigning functionality to buttons 641A and/or 641B. Specifically, in FIG. 6C, button 641A is still associated with increasing volume (e.g., indicated by "+" shown next to button 641A), and button 641B is still associated with decreasing volume (e.g., indicated by "−" shown next to button 641B).

In FIG. 6D, the animation of the user interface corresponding to the change in orientation has concluded, such that the orientation of the user interface is the second orientation (e.g., Orientation B) with respect to the reference. As shown in FIG. 6D, following the conclusion of the animation of the change in the orientation of the user interface at Time 614C, the functionality associated with the one or more buttons is dynamically reassigned by device 500. For example, the functionality associated with button 641A is now a decrease in the volume of audio emitted by the device, rather than an increase, and the functionality associated with button 641B is now an increase in the volume of audio, rather than a decrease. In FIG. 6D, hand 612 is providing a selection input to first button 641A, which causes a decrease in the volume of audio emitted by the device 500, as reflected by user interface element 608. A subsequent rotation is provided to device 500 in the counterclockwise direction to reorient the device to be associated with a third orientation, different from the second orientation.

In FIG. 6E, the orientation associated with device 500 has changed from the second orientation (e.g., Orientation B) to the third orientation (e.g., Orientation C). For example, in the third orientation, the one or more buttons of device 500 are located toward a bottom left side of the device with respect to the reference. As shown, the orientation of the user interface is also rotated to correspond to the change in orientation associated with the electronic device (e.g., the orientation of the user interface is the third orientation). In some embodiments, reorientation of device 500 from the second orientation to the third orientation does not cause the device to dynamically reassign the functionality associated with the one or more buttons. For example, in FIG. 6E, the functionality associated with first button 641A is still a decrease in volume of audio emitted by device 500, and the functionality associated with second button 641B is still an increase in the volume of audio emitted by device 500.

In FIG. 6E, hand 612 is providing a selection input of first button 641A, which causes the device to decrease the volume of audio emitted by device 500 in accordance with the selection input. As described above, in some embodiments, user interface element 608 is dynamically displayed on the user interface, such that the region in which user interface element 608 is displayed is not fixed at or near the top of the user interface, for example. For example, in FIG. 6E, user interface element 608 is displayed at a location of the user interface at or near the one or more buttons. Additionally, user interface element 608 is displayed vertically on the user interface, rather than horizontally—which corresponds to the alignment of buttons 641A and 641B with respect to one another—such that an indication of the decrease in the volume of audio is displayed top-to-bottom rather than right-to-left (e.g., as shown previously in FIG. 6D). In FIG. 6E, a subsequent rotation is provided to device 500 to rotate the device counterclockwise from the third orientation to a fourth orientation, different from the third orientation.

In FIG. 6F, in response to the rotation reorienting device 500, device 500 is associated with a fourth orientation (e.g., Orientation D) with respect to the reference. As shown, an orientation of the user interface is optionally changed to correspond to the change in orientation associated with the device (e.g., the orientation of the user interface is the fourth orientation). In FIG. 6F, the change in orientation associated with device 500 to the fourth orientation again causes the device to reassign the functionality associated with the one or more buttons. For example, the functionality associated with first button 641A is now an increase in volume of audio emitted by the device, and the functionality associated with second button 641B is now a decrease in the volume of audio emitted by the device.

In FIG. 6F, hand 612 is providing selection input to the first button 641A, which causes the device to increase the volume of audio emitted by the device in accordance with the selection input. As shown, user interface element 608 is displayed on the user interface to indicate an amount (e.g., measure of loudness or intensity) that the volume of audio increases in response to selection of first button 641A. In FIG. 6F, a position of user interface element 608 has moved on the user interface to correspond to a position of the one or more buttons. For example, user interface element 608 is displayed at a bottom right portion of the user interface with respect to the reference (e.g., corresponding to the bottom-right position of buttons 641A and 641B). Additionally, user interface element 608 is displayed horizontally in FIG. 6F, rather than vertically (e.g., as shown previously in FIG. 6E), to correspond to the orientation of the user interface (e.g., the fourth orientation) and/or to correspond to the alignment of buttons 641A and 641B relative to one another.

Attention is now directed to interactions with an electronic device in which the electronic device is optionally displaying a user interface configured with a language that reads right to left (e.g., rather than left to right). FIG. 6G illustrates an exemplary device 500 displaying a user interface. In some embodiments, a language associated with the user interface (e.g., User Interface A) is a right-to-left language (e.g., text displayed on the user interface reads from right to left). In FIG. 6G, an orientation associated with device 500 is the first orientation (e.g., Orientation A), which is a portrait (or substantially vertical) orientation, with respect to the reference, as discussed above. The user interface displayed on touch screen 504 optionally corresponds to the orientation associated with device 500, such that the orientation of the user interface is also the first orientation with respect to the reference. As shown, while device 500 is associated with the first orientation, the functionality associated with first button 641A is an increase in volume of audio emitted by device 500, and the functionality associated with second button 641B is a decrease in the volume of audio emitted by device 500.

In FIG. 6G, hand 612 is providing selection input to first button 641A, which causes device 500 to increase the volume of audio emitted by device 500 in accordance with the selection input. As shown, user interface element 608 is displayed and/or updated to indicate an amount that the volume increases in response to device 500 detecting selection of first button 641A. In FIG. 6G, volume HUD 608 increases/fills from right to left in accordance with the language setting of the user interface displayed on touch screen 504 (e.g., as opposed to the left to right fill of volume HUD 608 for the left-to-right language setting). In FIG. 6G, a rotation is provided (e.g., via a hand of the user) to device 500 rotating the device counterclockwise from the first orientation to the second orientation, as similarly described above.

In FIG. 6H, in response to detecting the rotation, the orientation associated with the device has changed from the first orientation (e.g., Orientation A) to the second orientation (e.g., Orientation B) with respect to the reference. As shown, the orientation of the user interface is also changed to correspond to the new orientation associated with device 500 (e.g., the orientation of the user interface is the second orientation with respect to gravity). In some embodiments, rotation of device 500 to the second orientation while the user interface displayed (or configured to be displayed) on touch screen 504 is set to read from right to left does not cause device 500 to dynamically reassign functionality associated with the one or more buttons (e.g., as compared with FIG. 6D). For example, in FIG. 6H, after device 500 is rotated and the orientation of the device is associated with the second orientation, the functionality associated with first button 641A is still an increase in volume of audio emitted by the device, and the functionality associated with second button 641B is still a decrease in the volume of audio emitted by the device.

In FIG. 6H, hand 612 is providing selection input to first button 641A. In response to detecting selection of first button 641A, as shown, device 500 increases the volume of audio emitted by the device in accordance with the selection input. As shown, user interface element 608 displayed on the user interface again indicates the amount that the volume is increased in response to detection of the selection of first button 641A. In FIG. 6H, a rotation is again provided rotating device 500 counterclockwise from the second orientation to the third orientation with respect to the reference, as described above.

In FIG. 6I, in response to detecting the rotation, device 500 is associated with the third orientation (e.g., Orientation C) with respect to the reference. As shown, in accordance with the change in orientation associated with the device, the orientation of the user interface is changed to correspond to the new orientation associated with device 500 (e.g., the orientation of the user interface is the third orientation with respect to the reference). In some embodiments, reorientation of device 500 from being associated with the second orientation to being associated with the third orientation with respect to the reference while the language of the user interface displayed (or configured to be displayed) via device 500 reads right to left causes device 500 to dynamically reassign the functionality associated with the one or more buttons. For example, in FIG. 6I, the functionality associated with first button 641A is a decrease in volume of audio emitted by device 500, and the functionality associated with second button 641B is an increase in the volume of audio emitted by device 500.

In FIG. 6I, hand 612 is providing selection input to first button 641A, which causes device 500 to decrease the volume of audio emitted by the device in accordance with the selection. As shown, in response to detecting selection of the first button 641A, user interface element 608 is displayed and/or updated on the user interface to indicate the amount that the volume of audio is decreased. In some embodiments, a subsequent rotation of device 500 from the third orientation to the fourth orientation (e.g., Orientation D in FIG. 6F) does not cause device 500 to reassign the functionality associated with the one or more buttons. For example, reorientation of device 500 from being associated with the third orientation to being associated with the fourth orientation while the language of the user interface reads right to left does not change the functionality associated with first button 641A and second button 641B from the third orientation to the fourth orientation.

Thus, in summary, as shown in FIG. 6J, while the user interface displayed (or configured to be displayed) via device 500 reads from left to right, reorientation of device 500 from the first orientation (e.g., Orientation A) to either of the second orientation (e.g., Orientation B) or the third orientation (e.g., Orientation C) with respect to gravity optionally causes device 500 to reassign the functionality associated with the first and second buttons (e.g., 641A and 641B), and reorientation of device 500 from the first orientation to the fourth orientation (e.g., Orientation D), for example, optionally does not cause device 500 to reassign the functionality associated with the first and second buttons. On the other hand, while the user interface displayed (or configured to be displayed) via device 500 reads from right to left, reorientation of device 500 from the first orientation to either of the third orientation or the fourth orientation with respect to gravity optionally causes device 500 to reassign the functionality associated with the first and second buttons, and reorientation of device 500 from the first orientation to the second orientation, for example, optionally does not cause device 500 to reassign the functionality associated with the first and second buttons, as shown.

Attention is now directed to interactions with an electronic device in which the electronic device is optionally displaying a user interface that is in a locked orientation. FIG. 6K illustrates an exemplary device 500 displaying a user interface. In some embodiments, an orientation of the user interface (e.g., User Interface A) is locked. For example, using a locking setting of the device, the user interface is optionally locked in the first orientation (e.g., locked in a portrait (or substantially vertical)), as shown. In FIG. 6K, an orientation associated with the device 500 with respect to the reference is the first orientation (e.g., Orientation A). In FIG. 6K, while device 500 is associated with the first orientation with respect to the reference, the functionality associated with first button 641A is an increase in volume of audio emitted by device 500, and the functionality associated with second button 641B is a decrease in volume of audio emitted by device 500.

In FIG. 6K, hand 612 is providing a selection input to first button 641A, which causes the volume of audio emitted by device 500 to increase in accordance with the selection input. As shown, in response to detecting the selection input, user interface element 608 is optionally displayed in a top region of the user interface to indicate an amount that the volume of audio is increased in response to selection of the first button. In FIG. 6K, a rotation is provided to rotate device 500 counterclockwise from the first orientation to the second orientation.

In FIG. 6L, in response to detecting the rotation, the orientation of device 500 is the second orientation (e.g., Orientation B) with respect to the reference, but the orientation associated with device for the purposes of buttons 641A and 641B optionally remains the first orientation (e.g., corresponding to the orientation of the user interface). In FIG. 6L, because the orientation of the user interface is locked, the orientation of the user interface does not change to correspond to the orientation associated with device 500 (e.g., the orientation of the user interface is still the first orientation (e.g., portrait orientation)). In some embodiments, while the orientation of the user interface is locked, such that changes to the orientation of the device do not cause the orientation of the user interface to change, device 500 forgoes dynamically reassigning the functionality associated with the one or more buttons in response to changes in orientation of the device. For example, after the orientation of device 500 is changed to be the second orientation, the functionality assigned to the one or more buttons still corresponds to the respective functionality defined by the first orientation. In FIG. 6L, while the orientation of the user interface is the first orientation, despite the orientation of the device 500 being the second orientation, the functionality associated with first button 641A is still an increase in the volume of audio, and the functionality associated with second button 641B is still a decrease in the volume of audio.

In FIG. 6L, hand 612 is providing selection input to first button 614A. Because the functionality associated with first button 614A is not dynamically reassigned in response to the device orientation being the second orientation, device 500 increases the volume of audio emitted by device 500 in accordance with the selection input. In FIG. 6L, user interface element 608 is displayed at the same region of the user interface (e.g., as shown in FIG. 6J) in response to detecting selection of first button 614A because the orientation of the user interface is locked, as described above. Thus, as described above, changes to orientation of device 500 while the user interface displayed (or configured to be displayed) via the device is in a locked orientation optionally causes device 500 to forgo dynamically reassigning functionality associated with the one or more buttons. In such embodiments, the functionality assigned to the one or more buttons is based on the locked orientation of the user interface (e.g., the orientation associated with device 500), rather than the orientation of the device 500.

Attention is now directed to interactions with an electronic device in which the one or more buttons of the electronic device are in a selected state during a change in orientation associated with the electronic device. FIG. 6M illustrates an exemplary device 500 displaying a user interface. In FIG. 6M, an orientation associated with the device 500 with respect to the reference is the first orientation (e.g., Orientation A). In some embodiments, the orientation of the user interface (e.g., User Interface A) corresponds to the orientation associated with device 500 (e.g., the orientation of the user interface is a portrait orientation). In FIG. 6M, while device 500 is associated with the first orientation with respect to the reference, the functionality associated with first button 641A is an increase in volume of audio emitted by device 500, and the functionality associated with second button 641B is a decrease in volume of audio emitted by device 500.

In FIG. 6M, hand 612 is providing a continuous selection input to first button 641A (e.g., a finger hold of first button 641A). In response to detecting the selection input, device 500 increases the volume of audio emitted by the device in accordance with a duration of the selection of first button 641A (e.g., as reflected by display and/or update of user interface element 608). In FIG. 6M, while the hand 612 is providing the continuous selection input to first button 641A, a rotation is provided (e.g., via a second hand of the user) to rotate device 500 counterclockwise from the first orientation to the second orientation.

In FIG. 6N, in response to detecting the rotation, the orientation of device 500 is changed from the first orientation to the second orientation (e.g., Orientation B) with respect to the reference. In some embodiments, in accordance with a determination that selection of the one or more buttons of the device is detected while the orientation of the device changes with respect to the reference, the device forgoes dynamically reassigning functionality associated with the one or more buttons based on the new orientation of the device until deselection of the one or more buttons is detected. In FIG. 6N, hand 612 continues to provide selection input to first button 641A after the rotation rotating device 500 from the first orientation to the second orientation ends. As described earlier, once time bar 605 reaches the time threshold Time 614C, the device 500 would optionally normally dynamically reassign the functionality of the one or more buttons based on the second orientation (e.g., as discussed previously with reference to FIG. 6D). As shown in FIG. 6N, however, because the finger hold on first button 641A has not yet been released, the functionality associated with first button 641A and second button 641B is unchanged, even as time bar 605 surpasses Time 614C. Further, because the functionality associated with first button 641A and second button 641B in unchanged, the volume of audio optionally continues to increase in accordance with the duration of the selection of first button 641A. In FIG. 6O, in response to detecting release of first button 641A some time later, as indicated by the increase in time bar 605, device 500 dynamically reassigns the functionality associated with the one or more buttons based on the second orientation (e.g., Orientation B). For example, as described above, the functionality associated with first button 641A is optionally now a decrease in the volume of audio emitted by the device, and the functionality associated with second button 641B is optionally now an increase in the volume of audio emitted by the device.

FIG. 6P illustrates an exemplary device 500 displaying a user interface. In FIG. 6P, an orientation associated with the device 500 with respect to the reference is the first orientation (e.g., Orientation A). In some embodiments, the orientation of the user interface (e.g., User Interface A) corresponds to the orientation associated with device 500 (e.g., the orientation of the user interface is a portrait orientation). In FIG. 6P, while device 500 is associated with the first orientation with respect to the reference, the functionality associated with first button 641A is an increase in volume of audio emitted by device 500, and the functionality associated with second button 641B is a decrease in volume of audio emitted by device 500. In some embodiments, device 500 includes hardware reset functionality (e.g., a factory reset powering down the device and/or display). For example, a series of selection inputs directed to the one or more buttons in a particular order optionally causes the device to perform a hardware reset. As mentioned above, device 500 optionally includes a power button (e.g., power button 642 or power button 643), separate from first button 641A and second button 641B.

In FIG. 6P, hand 612 is providing a series of selection inputs corresponding to a request that the device perform a hardware reset. As shown, providing the series of selection inputs includes (1) selecting first button 641A, followed by (2) selecting second button 641B, and followed by (3) selecting power button 642. It should be understood that, in some embodiments, the third input of the series of inputs alternatively includes selection of power button 643 disposed on the same side of first and second buttons 641A and 641B. In response to detecting the series of inputs, the device optionally performs a hardware reset. In FIG. 6P, a rotation is provided rotating device 500 from the first orientation to the second orientation.

In FIG. 6Q, in response to detecting the rotation, device 500 is now associated with the second orientation (e.g., Orientation B) with respect to the reference. As shown, the orientation of the user interface displayed on the touch screen changes to correspond to the new orientation associated with device 500 (e.g., the orientation of the user interface is the second orientation). In FIG. 6Q, in response to the change in orientation associated with device 500, the functionality associated with first button 641A and second button 641B changes based on the second orientation. For example, the functionality associated with first button 641A is a decrease in the volume of audio, and the functionality associated with second button 641B is an increase in the volume of audio. However, in some embodiments, device 500 is configured to perform the above-described hardware reset in response to the same series of inputs previously described, irrespective of changes to the orientation associated with device 500. For example, in response to device 500 changing orientation to be associated with the second orientation with respect to gravity, the functionality associated with the one or more buttons for performing the hardware reset are not dynamically reassigned by device 500. In FIG. 6Q, hand 612 is providing the same series of inputs corresponding to the request that the device perform a hardware reset as shown previously in FIG. 6P. In response to detecting the series of inputs, device 500 optionally performs the hardware reset, irrespective of the reassigned functionality associated with first button 641A and second button 641B.

FIG. 6R illustrates an exemplary device 500 displaying a user interface. In FIG. 6R, an orientation associated with the device 500 with respect to the reference is the first orientation (e.g., Orientation A). In some embodiments, the orientation of the user interface (e.g., User Interface A) optionally corresponds to the orientation associated with device 500 (e.g., the orientation of the user interface is a portrait orientation). In FIG. 6R, while device 500 is associated with the first orientation with respect to the reference, the functionality associated with first button 641A is an increase in volume of audio emitted by device 500, and the functionality associated with second button 641B is a decrease in volume of audio emitted by device 500. In some embodiments, selection of second button 641B for a threshold duration of time (e.g., represented by Time 616B) causes device 500 to perform a discrete function. For example, a long hold (e.g., finger hold) on second button 641B for the threshold duration of time optionally causes the volume of audio emitted by the device to be muted.

In FIG. 6R, hand 612 is providing selection input to second button 641B for the threshold period of time at 616B. In response to detecting selection of second button 641B for at least the threshold period of time (e.g., represented by time bar 607 reaching Time 616B), device 500 performs a mute operation, as represented by indication 609. In some embodiments, mute indication 609 is displayed on the user interface in response to device 500 performing the mute operation. In FIG. 6R, a rotation is provided rotating device 500 counterclockwise from the first orientation to the second orientation.

In FIG. 6S, in response to the rotation, device 500 is now associated with the second orientation (e.g., Orientation B) with respect to the reference. As shown, the orientation of the user interface displayed on the touch screen changes to correspond to the new orientation associated with device 500 (e.g., the orientation of the user interface is the second orientation). In FIG. 6S, in response to the change in orientation associated with device 500, the functionality associated with first button 641A and second button 641B changes based on the second orientation. For example, the functionality associated with first button 641A is a decrease in the volume of audio, and the functionality associated with second button 641B is an increase in the volume of audio. In FIG. 6S, hand 612 is providing selection input to second button 641B for the threshold period of time at 616B. Because the functionality associated with second button 641B has been dynamically reassigned based on the new orientation (e.g., Orientation B) associated with device 500, selection of second button 641B for the threshold period of time no longer causes device 500 to perform the mute operation. In FIG. 6S, in response to detecting selection of second button 641B for the threshold period of time, as shown by time bar 607, device 500 causes the volume of audio to increase according to the duration of time that second button 641B is selected (e.g., up to full volume, as indicated by user interface element 608).

Attention is now directed to interactions with an electronic device in which the display of the electronic device and/or the electronic device is in an off state. FIG. 6T illustrates an exemplary device 500 in which the display is off or in a low power state (e.g., not displaying a user interface). In FIG. 6T, device 500 is arranged in a first orientation (e.g., Orientation A), which is optionally a portrait (or substantially vertical) orientation with respect to a reference (e.g., gravity). In some embodiments, the one or more buttons of the electronic device are assigned a functionality depending on the orientation associated with the electronic device 500. For example, the first button 641A and the second button 641B are optionally selectable to control a volume of audio emitted by the electronic device (e.g., volume of music, video, etc.). In FIG. 6T, while the device is oriented in the first orientation, selection of the first button 641A causes the volume of audio emitted by the device to increase, and selection of the second button 641B causes the volume of audio emitted by the device to decrease.

In FIG. 6T, a counterclockwise rotation is provided to device 500 (e.g., via a hand of the user) to change the orientation associated with device 500 from the first orientation to the second orientation. As shown in FIG. 6U, in response to the rotation rotating the device 500 counterclockwise (e.g., a top edge of the device by 90 degrees), device 500 is associated with the second orientation (e.g., Orientation B), which is a landscape (or substantially horizontal) orientation, with respect to the reference (e.g., gravity). As described previously with reference to FIG. 6C, a respective period of time that is required to reassign the functionality of the one or more buttons based on the new orientation associated with the device optionally depends on whether the device and/or display is on (e.g., whether a respective user interface is displayed on the display). In FIG. 6U, because the display is off, a respective period of time required to reassign the functionality of the one or more buttons, represented by Time 614B, is less than the respective period of time required when the display is on, represented by Time 614C. As indicated by time bar 605, the functionality of first button 641A and second button 641B are each dynamically reassigned at Time 614B, because Time 614B is reached. Thus, the time required by device 500 to dynamically reassign the functionality associated with the one or more buttons is less when the display is off compared to when the display is on.

In FIG. 6U, a subsequent rotation is provided to device 500 in the counterclockwise direction to reorient the device to be associated with the third orientation. In FIG. 6V, the orientation associated with device 500 is changed from the second orientation (e.g., Orientation B) to the third orientation (e.g., Orientation C). In some embodiments, reorientation of device 500 from the second orientation to the third orientation does not cause the device to dynamically reassign the functionality associated with the one or more buttons. For example, in FIG. 6V, the functionality associated with first button 641A is still a decrease in volume of audio emitted by device 500, and the functionality associated with second button 641B is still an increase in the volume of audio emitted by device 500. In FIG. 6V, a subsequent rotation is provided to device 500 to rotate the device counterclockwise from the third orientation to the fourth orientation.

In FIG. 6W, in response to the rotation reorienting device 500, device 500 is associated with the fourth orientation (e.g., Orientation D) with respect to the reference. In FIG. 6W, the change in orientation associated with device 500 to the fourth orientation again causes the device to reassign the functionality associated with the one or more buttons. For example, the functionality associated with first button 641A is now an increase in volume of audio emitted by the device, and the functionality associated with second button 641B is now a decrease in the volume of audio emitted by the device.

In some embodiments, an orientation associated with device 500 upon a wake of device 500 (e.g., power on of the device, transition of the device from a sleep mode to an active mode, etc.) is the orientation the device was last associated with prior to the device being waken up if one or more criteria are satisfied. For example, the one or more criteria optionally include a criterion that is satisfied when a respective an orientation of the electronic device with respect to gravity about a second axis (e.g., a respective axis perpendicular to gravity) is greater than a threshold angle (e.g., 2, 5, 7, 10, 15, 25, 35, 45, etc. degrees) from the reference (e.g., the electronic device is not lying flat on a surface). For example, the orientation associated with device 500 upon a wake of device 500 is optionally the last orientation the device was associated with when the device was not lying flat on a surface, such as a tabletop, prior to being woken up. Continuing the example of FIG. 6W, device 500 is optionally subsequently placed on a flat surface (e.g., tabletop 615) in a portrait (or substantially vertical) orientation with the one or more buttons (e.g., first and second buttons 641A and 641B) positioned on a bottom left side of the device (e.g., relative to the user), as shown in FIG. 6X.

In FIG. 6X, an input is provided to device 500 to wake the device (e.g., selection of power button 642 or 643, selection of one of buttons 641A or 641B, tap on touch screen 504, etc.), such that a respective user interface (e.g., User Interface A) is displayed on the touch screen 504. In FIG. 6X, because device 500 is laying flat on tabletop 615, the one or more criteria are not satisfied, and the orientation associated with the device is the orientation of the device when the one or more criteria were last satisfied (e.g., in FIG. 6W). Accordingly, in FIG. 6X, the orientation associated with device 500 is the orientation of the device in FIG. 6W. As such, the functionality associated with the one or more buttons is based on the fourth orientation (when the device was not lying flat), such that selection of the first button 641A causes device 500 to increase the volume of audio, and selection of second button 641B causes device 500 to decrease the volume of audio. It should be understood that the above-described functionality associated with the one or more buttons would optionally apply even if the display were off (e.g., User Interface A were not displayed). For example, if the display in FIG. 6Y were off, selection of first button 641A would optionally cause device 500 to increase the volume of audio, and selection of second button 641B would optionally cause device 500 to decrease the volume of audio.

Figure 6Y:
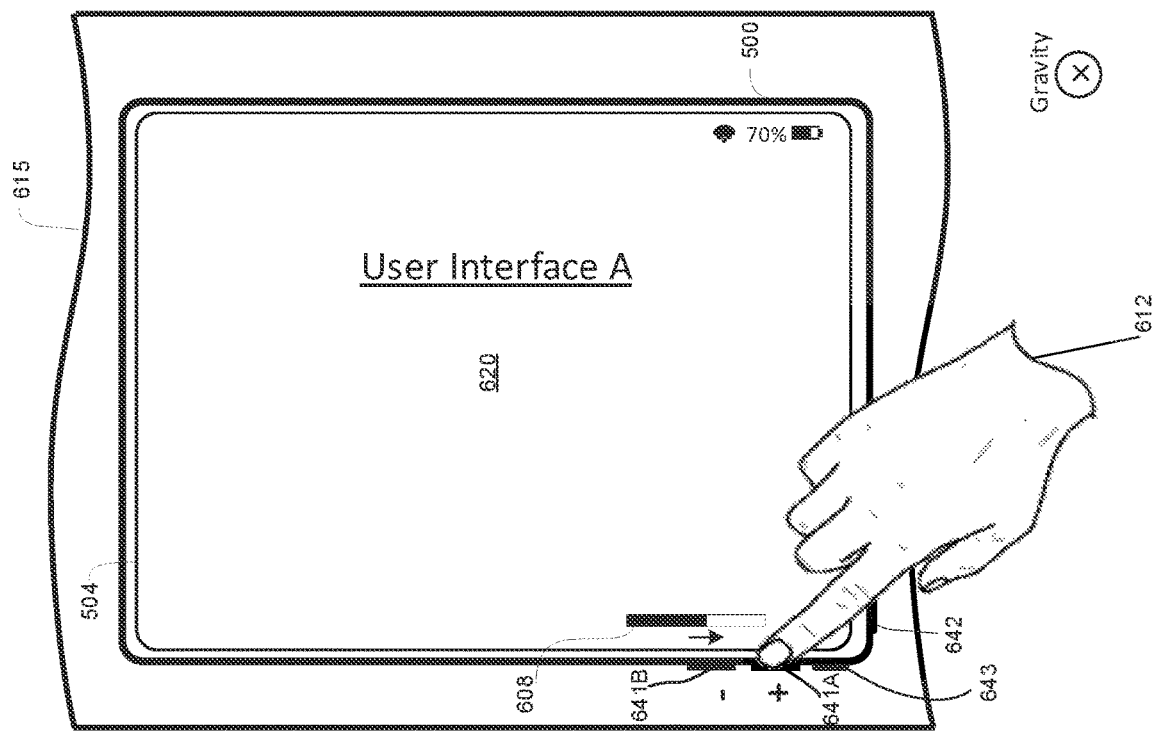
Figure 7A:
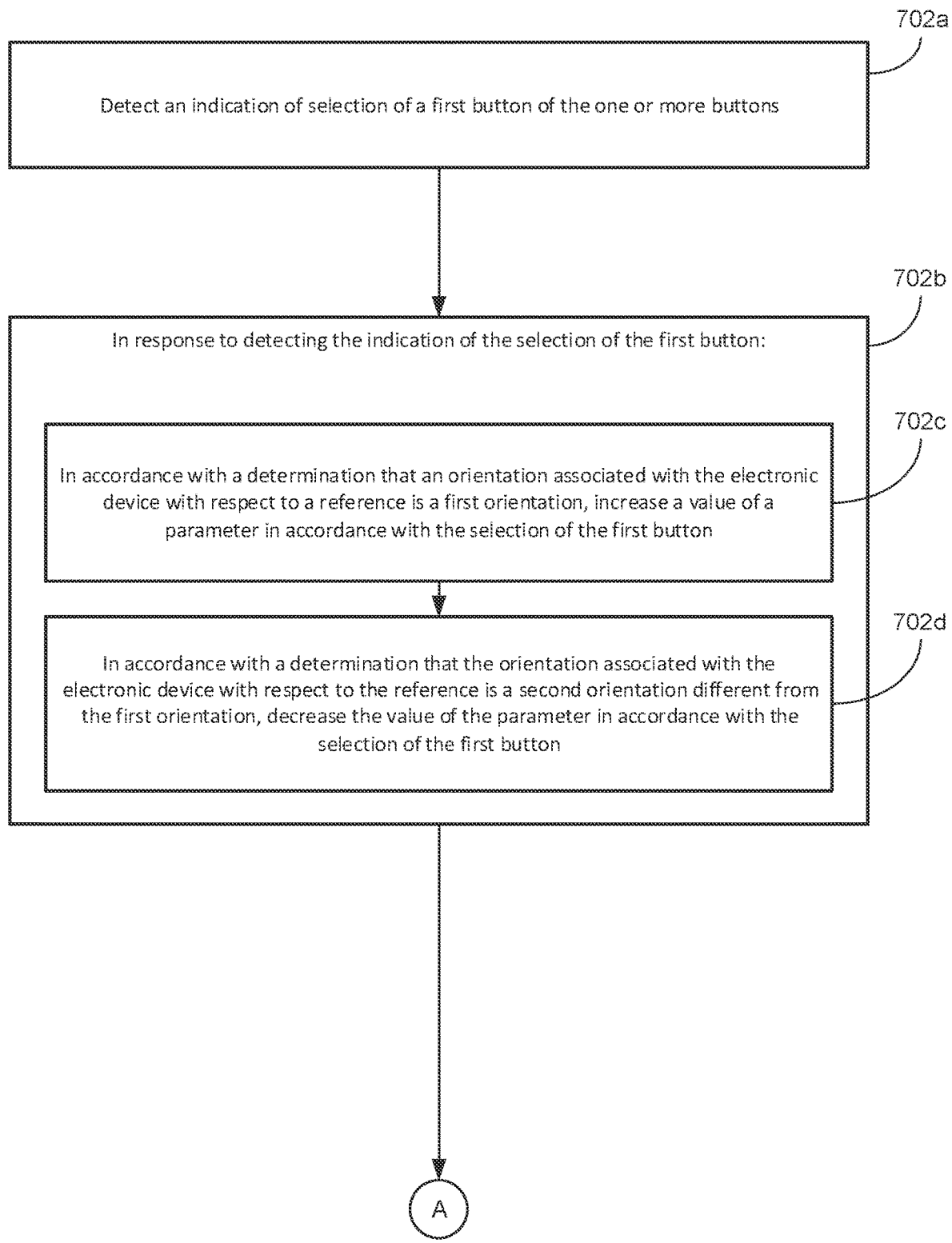
FIGS. 7A-7M show a flow diagram illustrating a method of dynamically assigning buttons functionalities based on an orientation associated with the device in accordance with some embodiments.
Figure 7B:
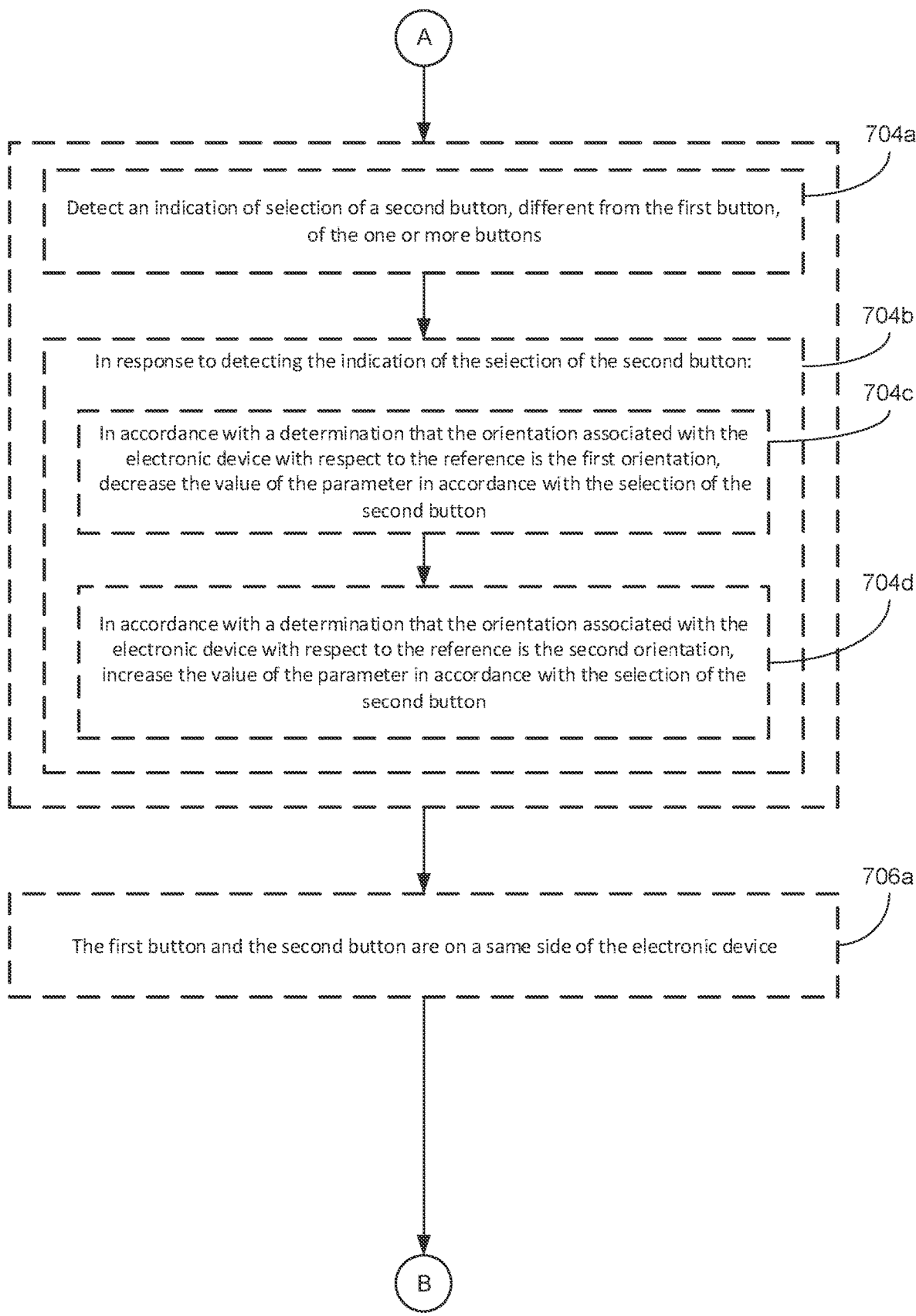
Figure 7C:
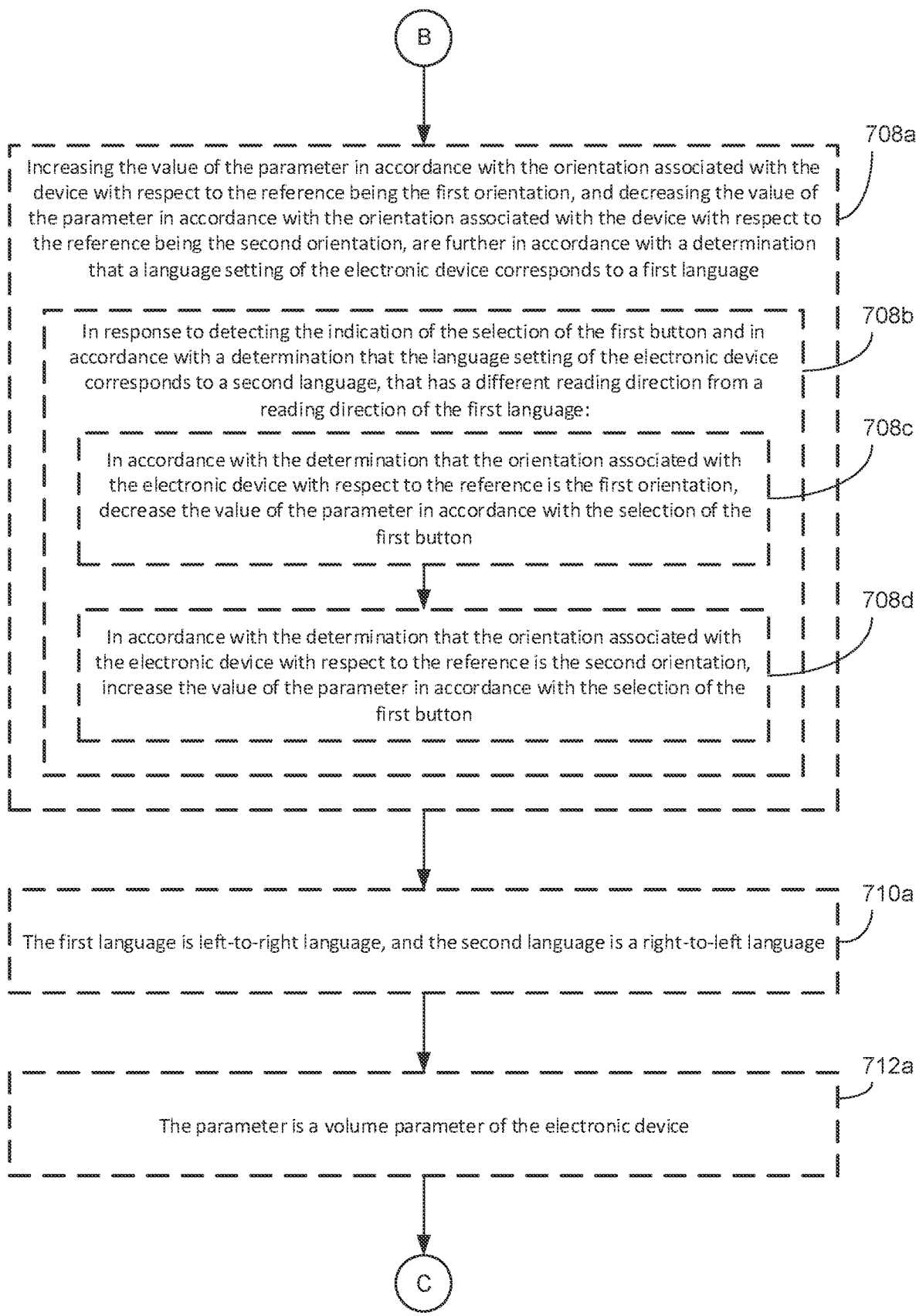
Figure 7D:
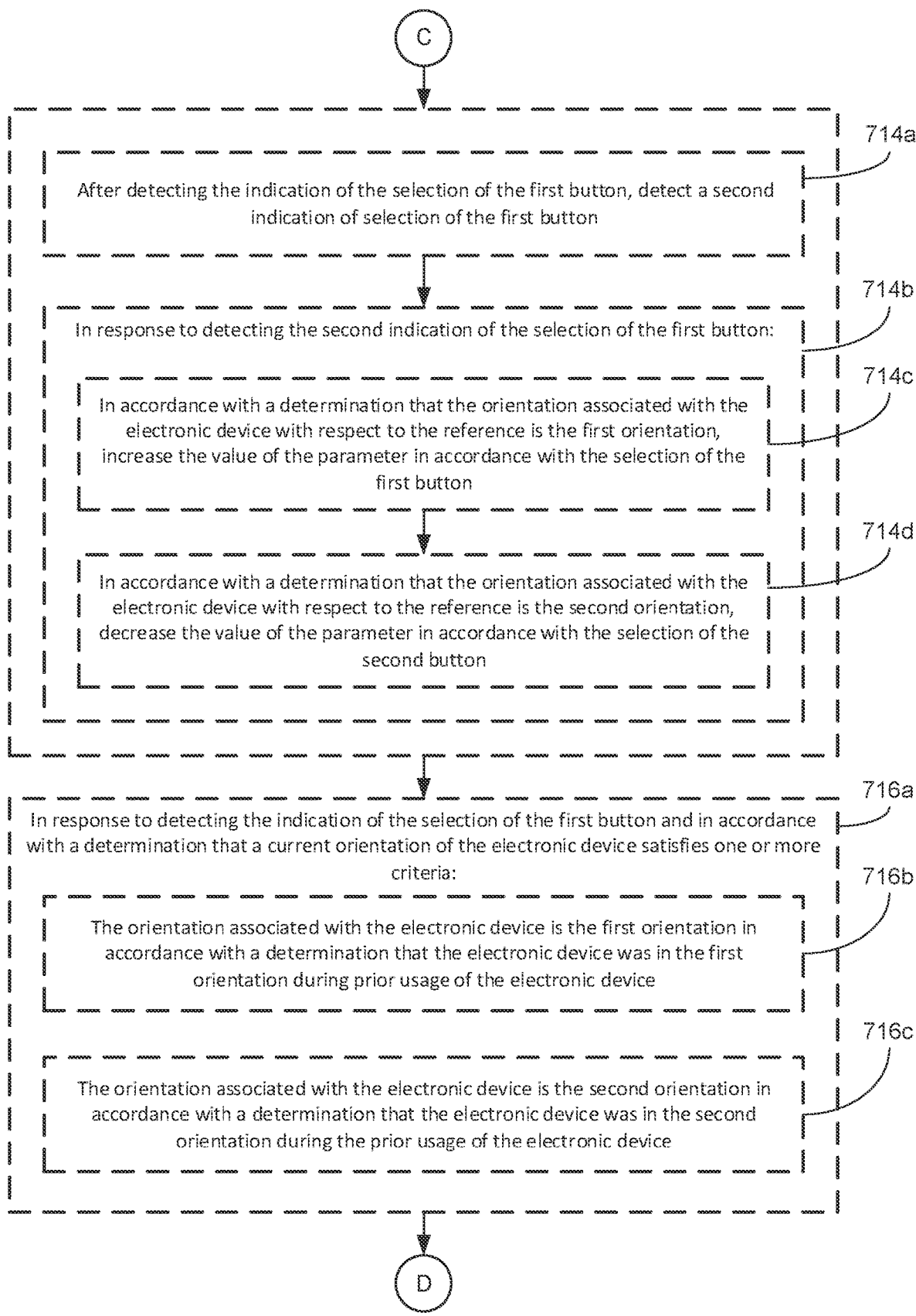
Figure 7E:
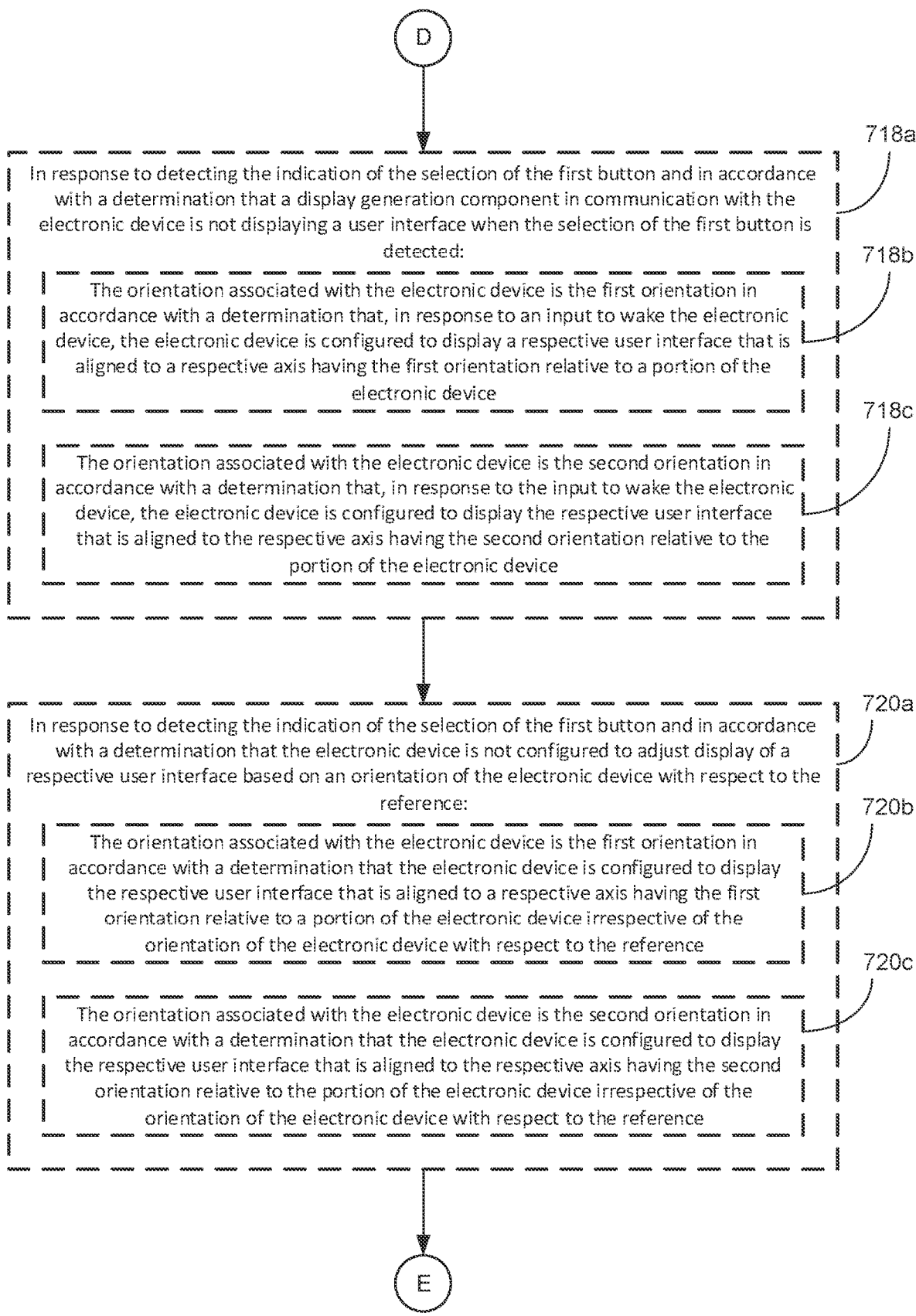
Figure 7F:
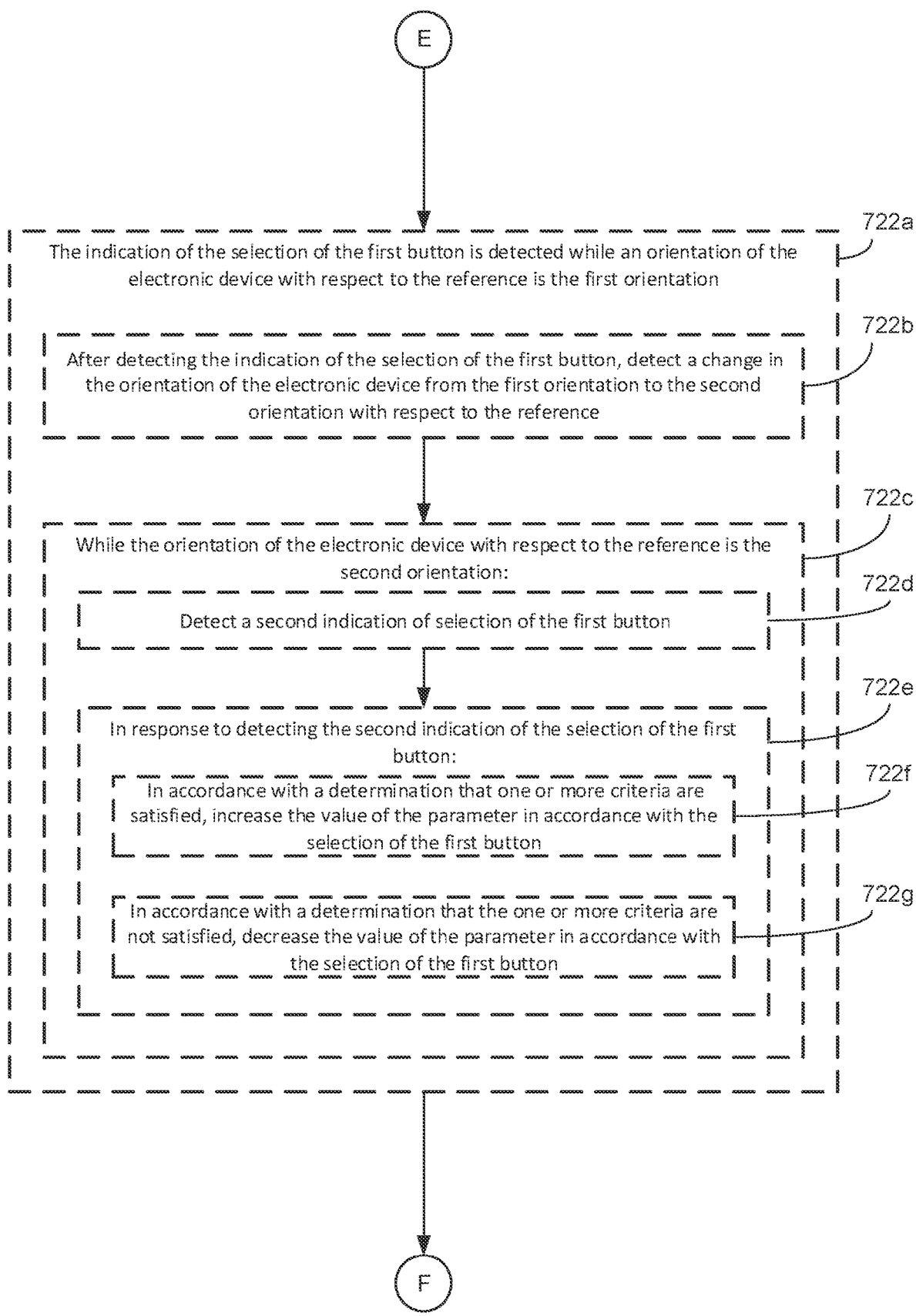
Figure 7G:
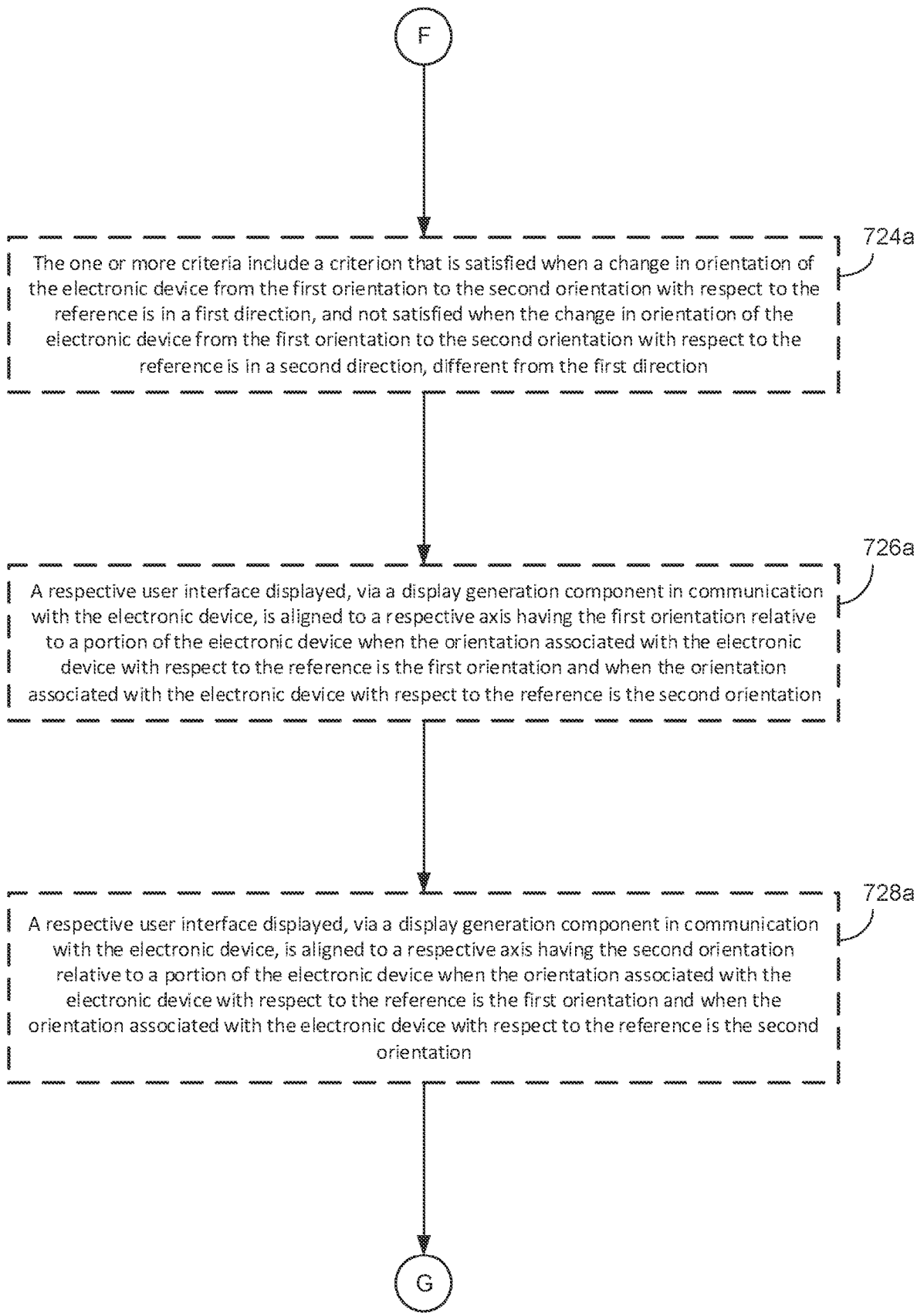
Figure 7H:
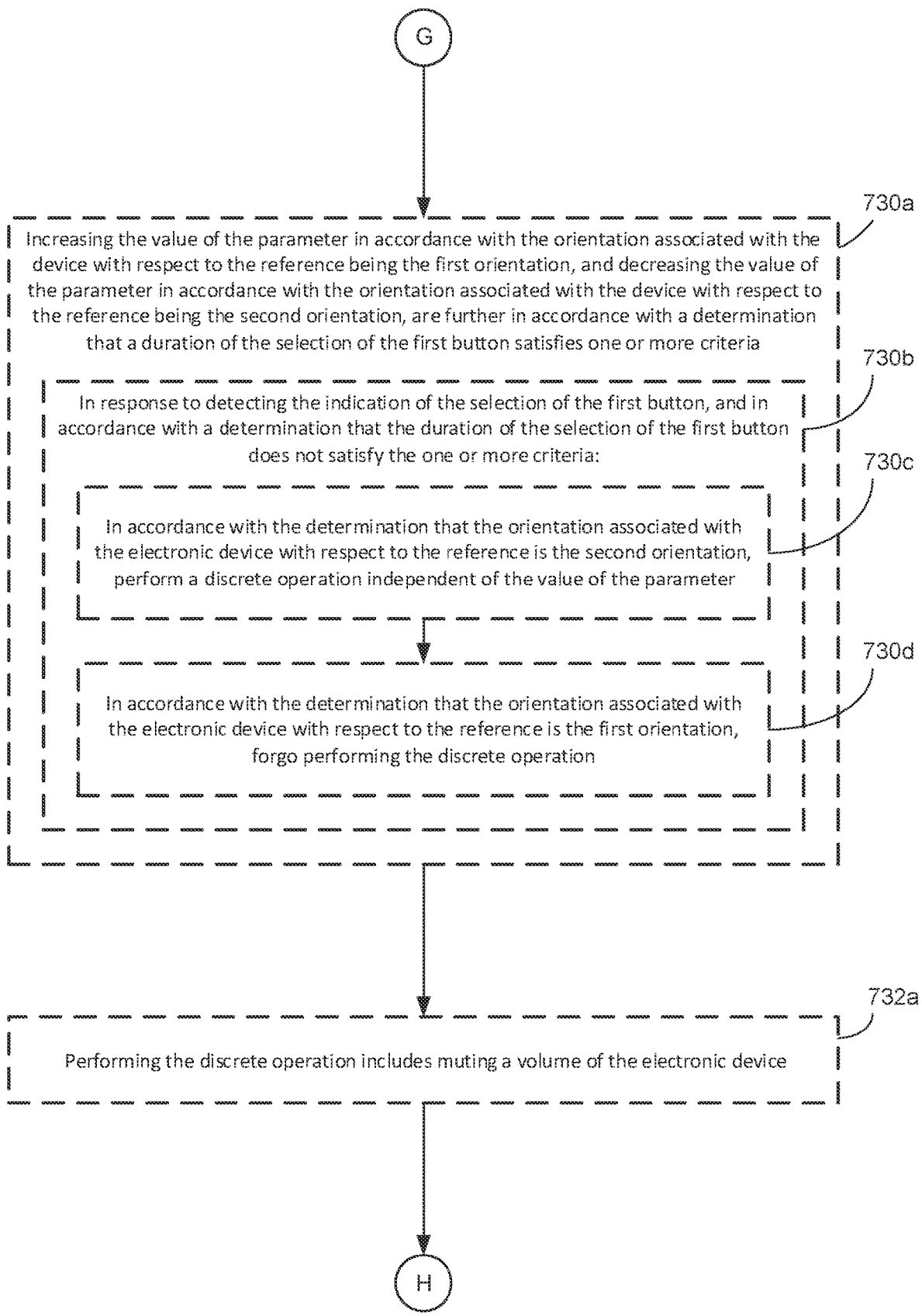
Figure 7I:
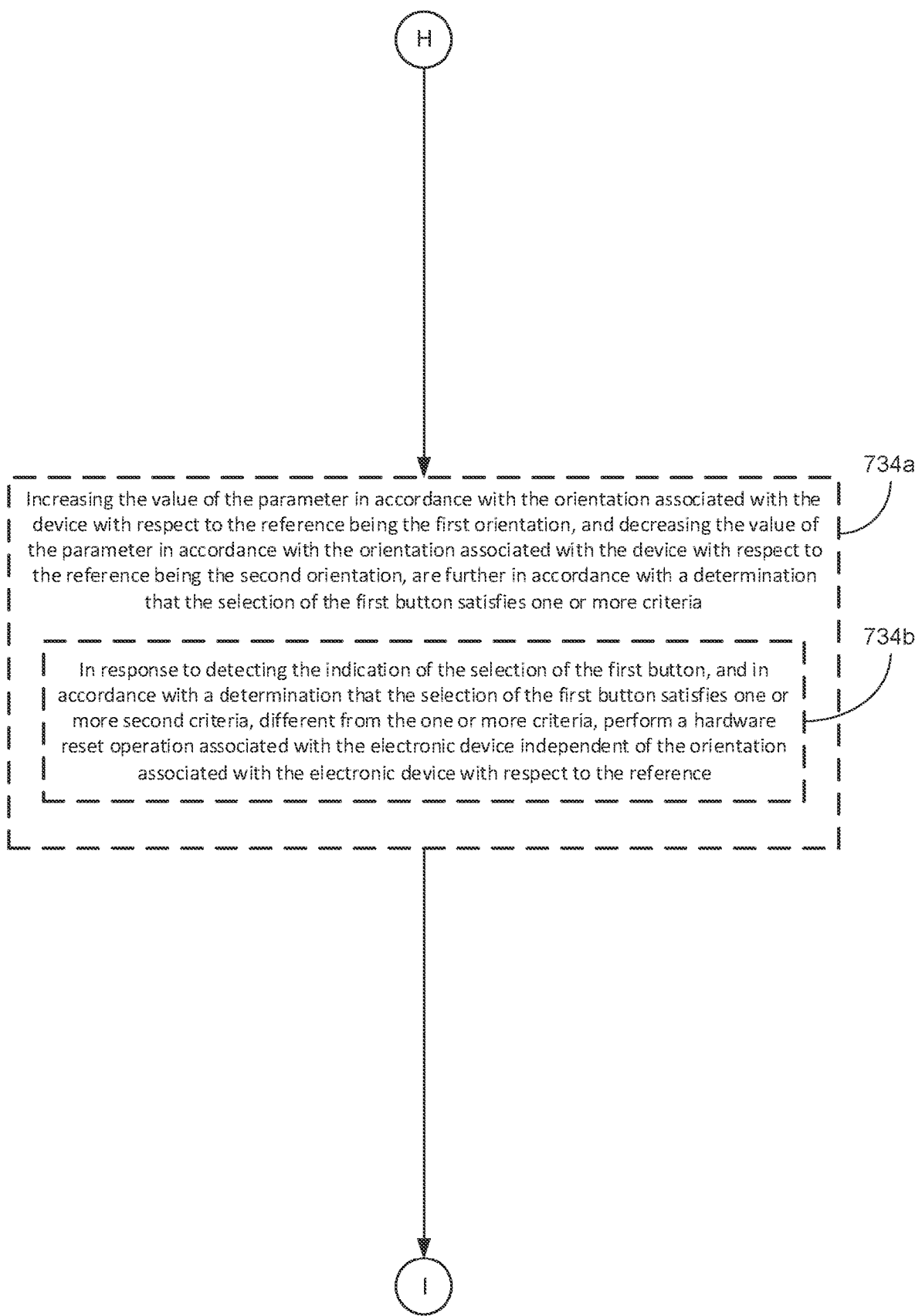
Figure 7J:
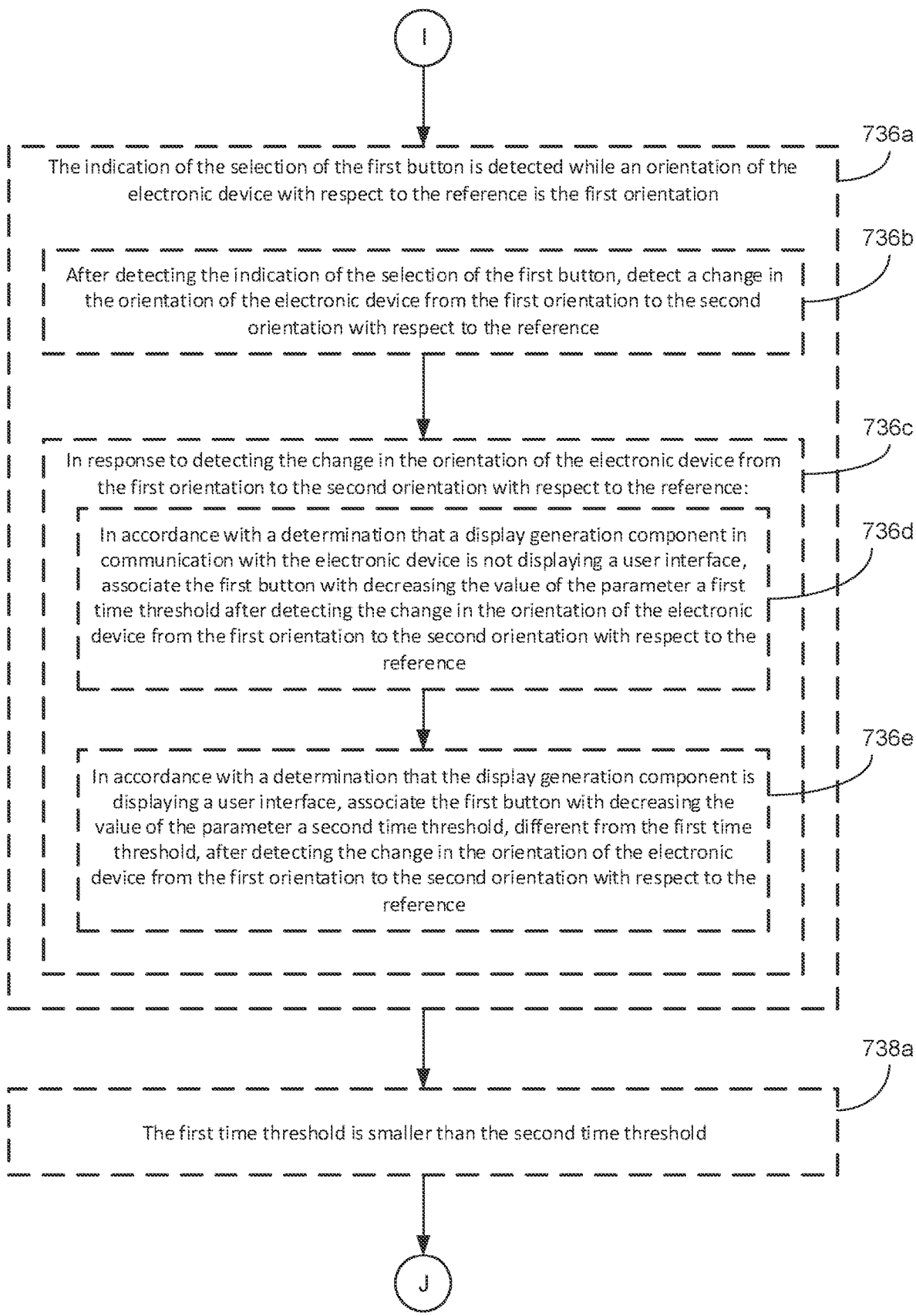
Figure 7K:
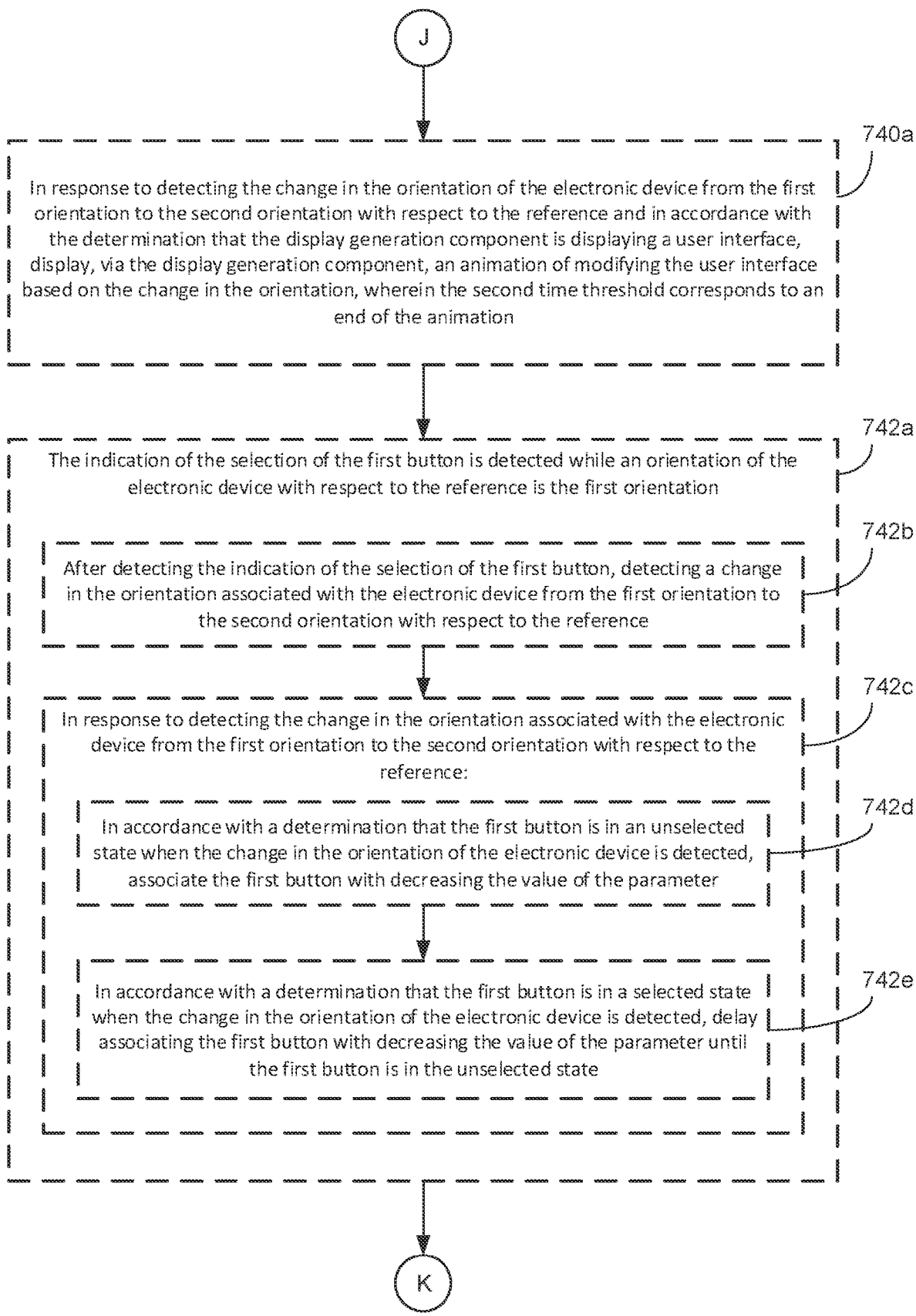
Figure 7L:
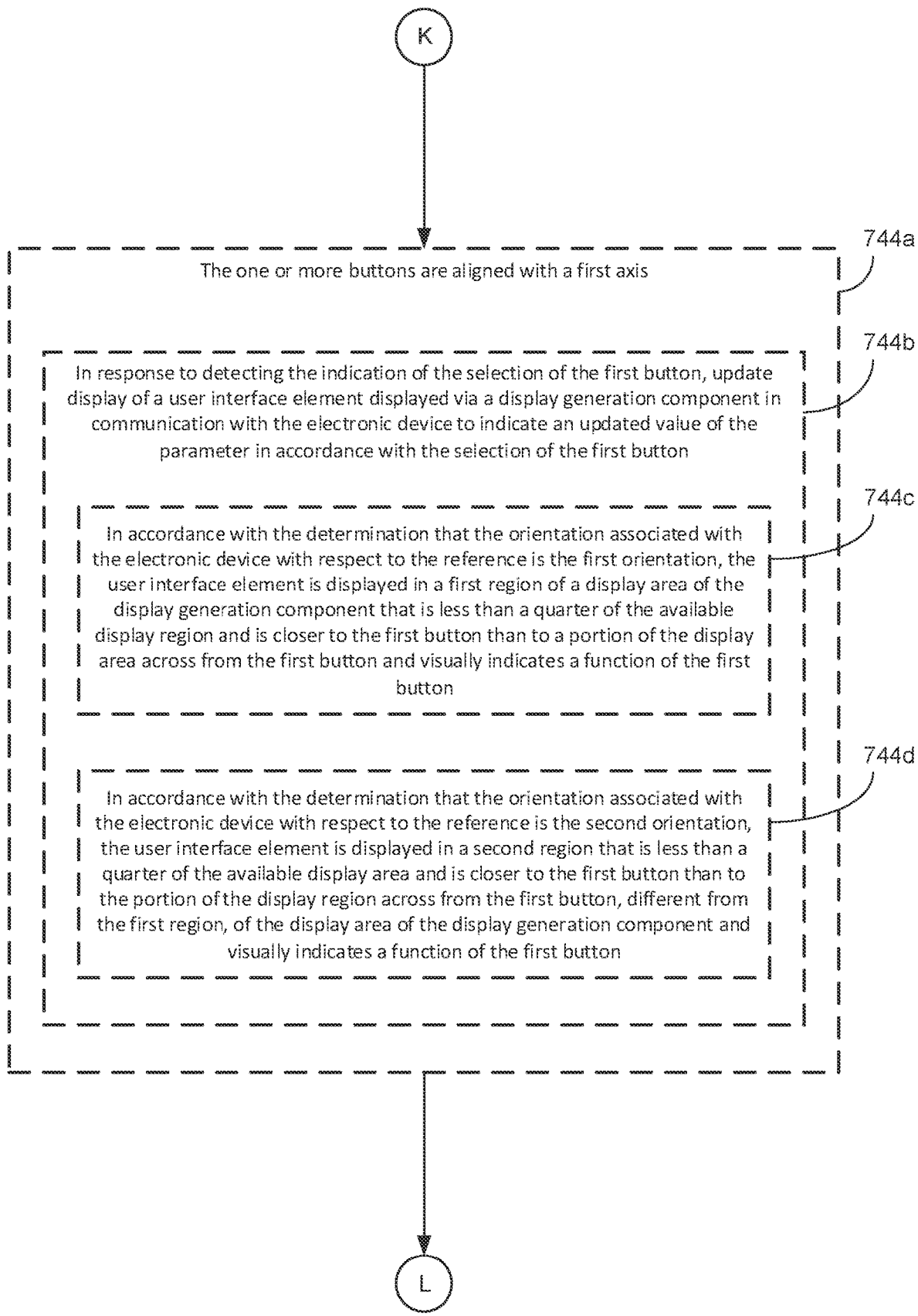
Figure 7M:
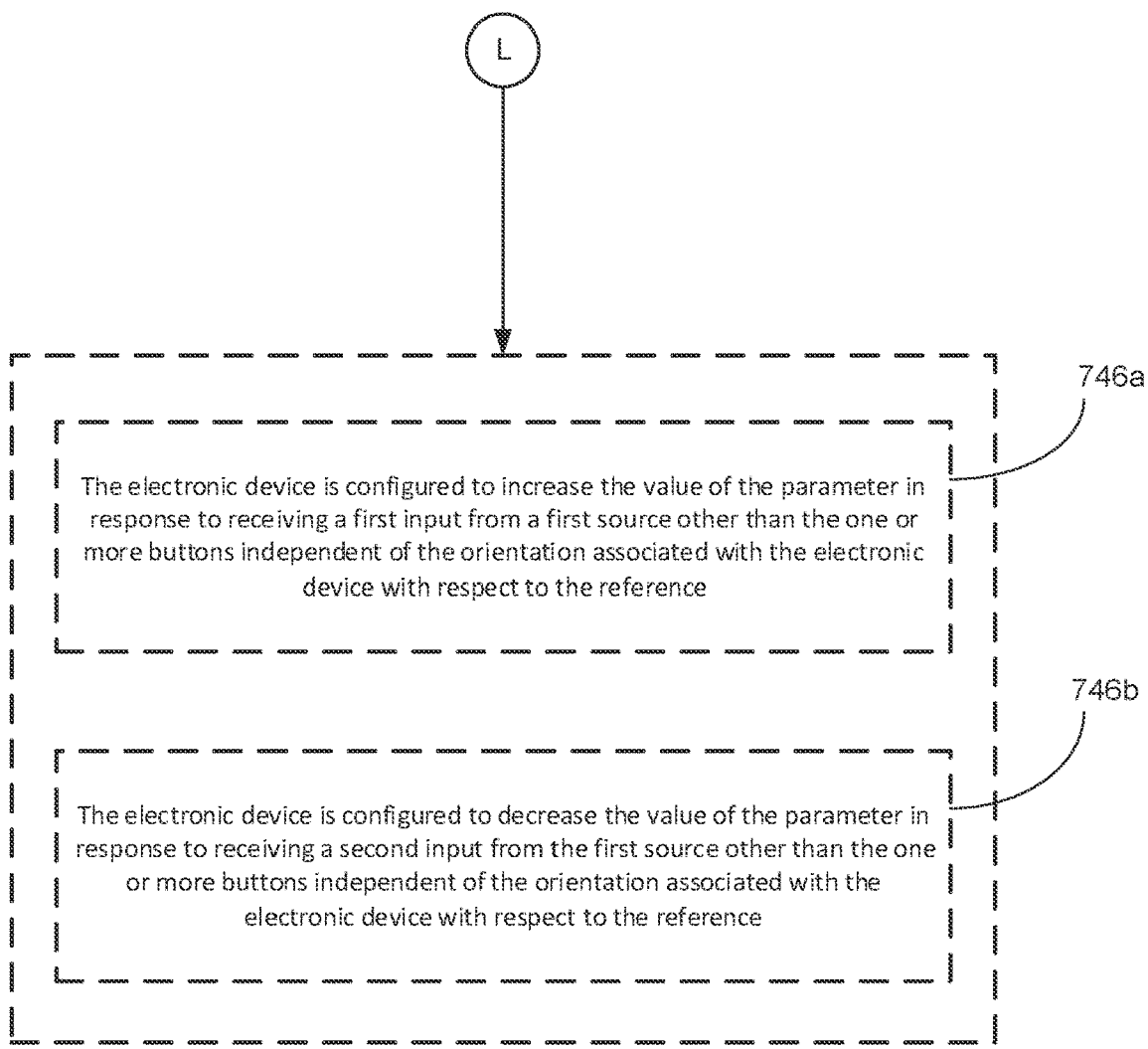

In FIG. 6Y, hand 612 is providing selection input to first button 641A, which causes device 500 to increase the volume of audio emitted by device 500, as reflected by the display and/or update of user interface element 608 displayed on the user interface. Thus, changes in orientation of the device with respect to the second axis (e.g., the axis perpendicular to gravity (e.g., an axis of the tabletop)) optionally do not cause device 500 to dynamically reassign functionality associated with the one or more buttons based on the new orientation with respect to the second axis.

In some embodiments, the orientation associated with device 500 is optionally changed to the third orientation (e.g., Orientation C) upon the device satisfying the one or more criteria (e.g., the device being lifted or at least partially tilted away from the surface of tabletop 615). In another example, rather than providing the rotation of device 500 in FIG. 6U, device 500 is alternatively subsequently placed on the flat surface (e.g., tabletop 615) in a portrait (or substantially vertical) orientation with the one or more buttons (e.g., first and second buttons 641A and 641B) positioned on a bottom left side of the device (e.g., relative to the user), as shown in FIG. 6Z.

In FIG. 6Z, an input is provided to device 500 to wake the device, as described above, such that a respective user interface (e.g., User Interface A) is displayed on the touch screen 504. In FIG. 6Z, because device 500 is lying flat on tabletop 615, the one or more criteria are not satisfied, and the orientation associated with the device is the orientation of the device when the one or more criteria were last satisfied (e.g., in FIG. 6U). Accordingly, in FIG. 6Z, the orientation associated with device 500 is the orientation of the device in FIG. 6U. As such, the functionality associated with the one or more buttons is based on the second orientation (e.g., when the device was not lying flat), such that selection of the first button 641A causes device 500 to decrease the volume of audio, and selection of second button 641B causes device 500 to increase the volume of audio. It should be understood that the above-described functionality associated with the one or more buttons would optionally apply even if the display were off (e.g., User Interface A were not displayed). For example, if the display in FIG. 6Z were off, selection of first button 641A would optionally cause device 500 to decrease the volume of audio, and selection of second button 641B would optionally cause device 500 to increase the volume of audio.

In FIG. 6Z, hand 612 is providing selection input to first button 641A, which causes device 500 to decrease the volume of audio emitted by device 500, as reflected by the display and/or update of user interface element 608 displayed on the user interface. Thus, as described above, changes in orientation of the device with respect to the second axis (e.g., the axis perpendicular to gravity (e.g., an axis of the tabletop)) optionally do not cause device 500 to dynamically reassign functionality associated with the one or more buttons based on the new orientation with respect to the second axis.

In some embodiments, device 500 is in communication with one or more input devices separate from buttons 641A and d641B, which are optionally input sources for controlling the volume of audio emitted by device 500. For example, the one or more input devices/sources optionally include headphones, keyboards, software applications running on device 500, etc. In some such embodiments, changes to the orientation associated with device 500 do not cause device 500 to dynamically reassign functionality associated with one or more respective buttons of the one or more input devices/sources. For example, changing the orientation of device 500 from being associated with the first orientation to the second orientation will not cause device 500 to reassign functionality of a first respective key of a keyboard in communication with device 500 that increases the volume of audio to instead decrease the volume of audio. In some embodiments, the one or more input devices/sources cause the user interface displayed on touch screen 504 of device 500 to be locked in a particular orientation, which thus causes the functionality associated with the one or more buttons to be dynamically assigned according to the locked orientation. For example, a keyboard in communication with device 500 optionally causes the user interface displayed on touch screen 504 to be locked (e.g., initially) in the second orientation (e.g., landscape orientation) with respect to the reference, which optionally causes the functionality of the one or more buttons to be dynamically assigned based on the second orientation (e.g., functionality assignment shown in FIG. 6D).

FIGS. 7A-7M show a flow diagram illustrating a method 700 of dynamically assigning button functionality based on an orientation associated with an electronic device. The method 700 is optionally performed at an electronic device such as device 100, device 300, and device 500 as described above with reference to FIGS. 1A-1B, 2-3, 4A-4B and 5A-5H. Some operations in method 700 are, optionally combined and/or the order of some operations is, optionally, changed.

As described below, the method 700 provides ways in which an electronic device dynamically assigns button functionality based on an orientation associated with an electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device (e.g., 500) having one or more buttons (e.g., 641A, 641B). For example, a mobile device (e.g., a tablet, a smartphone, a media player, or a wearable device (e.g., a watch, a head-mounted device, etc.)), or a computer. In some embodiments, the electronic device includes or is in communication with a display generation component, such as a display integrated with the electronic device (optionally a touch screen display), an external display such as a monitor, projector, television, or a hardware component (optionally integrated or external) for projecting a user interface or causing a user interface to be visible to one or more users, etc. In some embodiments, the one or more buttons include a pair of buttons configured to, at least in some circumstances, control the volume of the electronic device, such as an increase volume button and a decrease volume button, which are selectable to control the volume of audio emitted from the electronic device. In some embodiments, the one or more buttons are integrated with a housing of the electronic device (e.g., disposed along a side or edge of the electronic device).

In some embodiments, the electronic device detects (702a) an indication of selection of a first button of the one or more buttons (e.g., selection of button 641A in FIG. 6A). For example, a finger press or hold on one of the buttons of the electronic device. In some embodiments, selection of a first button (e.g., a physical button, such as a button that includes a spring element and has travel in response to a press from a user's finger) of the one or more buttons causes the volume of audio emitted from the electronic device to increase or decrease. In some embodiments, the one or more buttons are physical buttons, as described above. For example, depending on a respective orientation associated with the electronic device, selection of the first button causes the volume to increase or decrease. In some embodiments, the first button (and/or the one or more buttons) is optionally a solid state button (e.g., an interactive region of the display of the electronic device and/or the housing of the electronic device configured to detect an applied force and optionally provide haptic feedback in response to the applied force reaching a force threshold corresponding to selection of the button (e.g., using a haptic actuator, resonator, vibrator, etc.).

In some embodiments, in response to detecting the indication of the selection of the first button (702b), in accordance with a determination that an orientation associated with the electronic device (e.g., an orientation associated with a portion of the electronic device that includes the one or more buttons such as an edge of the device that includes volume buttons) with respect to a reference is a first orientation (e.g., orientation A in FIG. 6A) (e.g., an orientation of the portion of the electronic device (e.g., including the buttons, such as an edge of the device) relative to the reference is the first orientation. For example, the orientation associated with the electronic device (e.g., an orientation of a displayed user interface or an orientation of a respective axis of the device, such as the axis of the portion of the device) with respect to a reference (e.g., gravity, etc.) is substantially (e.g., within a threshold, such as 1, 2, 3, 5, 10, 15, 30, 45 degrees, or being) vertical or a portrait orientation (e.g., a dimension of the (e.g., display of the) electronic device substantially (e.g., within a threshold, such as 1, 2, 3, 5, 10, 15, 30, 45 degrees, or being) parallel to gravity is greater than a dimension of the electronic device substantially (e.g., within a threshold, such as 1, 2, 3, 5, 10, 15, 30, 45 degrees, or being) perpendicular to gravity). In some embodiments, the orientation associated with the electronic device is the orientation of the electronic device before the electronic device last entered a power down state, low power state, or sleep state. In some embodiments, the first orientation is based on an orientation of the device with respect to gravity about a first axis when one or more criteria that are satisfied when an orientation of the electronic device with respect to gravity about a second axis is greater than a threshold angle (e.g., 2, 5, 7, 10, 15, 25, 35, 45, etc. degrees) from the reference (e.g., the electronic device is not lying flat on a surface) and is based on one or more criteria other than the orientation of the device with respect to gravity about the first axis when an orientation of the device with respect to gravity about the second axis is less than the threshold angle. In some embodiments, the display is optionally displaying a user interface that corresponds to the orientation associated with the electronic device (e.g., the user interface is in a portrait orientation). In some embodiments, the user interface optionally does not correspond to the orientation associated with the electronic device (e.g., the user interface is in a landscape orientation, as described below).), the electronic device increases (702c) a value of a parameter in accordance with the selection of the first button, such as increasing the volume as shown in FIG. 6A (e.g., increasing the volume of audio emitted by the electronic device by one or more respective units (e.g., measurements of loudness or intensity)). In some embodiments, the electronic device optionally displays a volume element/bar/HUD on the user interface of the display of the electronic device in response to selection of the first button. For example, the volume HUD indicates an amount that the volume has increased (e.g., one respective unit). In some embodiments, the volume HUD is displayed at a fixed region of the user interface irrespective of the orientation associated with the electronic device (e.g., displayed at or near the buttons). In some embodiments, the volume HUD is displayed at a region of the user interface based on the orientation associated with the electronic device (e.g., displayed at or near a top portion of the user interface in the portrait orientation.).

In some embodiments, in accordance with a determination that the orientation associated with the electronic device (e.g., the orientation associated with a portion of the electronic device that includes the one or more buttons such as an edge of the device that includes volume buttons) with respect to the reference is a second orientation different from the first orientation, such as orientation B in FIG. 6D (e.g., an orientation of the portion of the electronic device mentioned earlier (e.g., including the buttons, such as an edge of the device) relative to the reference is the second orientation. For example, the orientation associated with the electronic device (e.g., an orientation of a displayed user interface or an orientation of a respective axis of the device, such as the axis of the portion of the device) with respect to the reference (e.g., gravity, etc.) is substantially (e.g., within a threshold, such as 1, 2, 3, 5, 10, 15, 30, 45 degrees, or being) horizontal or a landscape orientation (e.g., a dimension of the (e.g., display of the) electronic device substantially (e.g., within a threshold, such as 1, 2, 3, 5, 10, 15, 30, 45 degrees, or being) perpendicular to gravity is greater than a dimension of the electronic device substantially (e.g., within a threshold, such as 1, 2, 3, 5, 10, 15, 30, 45 degrees, or being) parallel to gravity). In some embodiments, the orientation associated with the electronic device is the orientation of the electronic device before the electronic device last entered a power down state, low power state, or sleep state. In some embodiments, the second orientation is based on an orientation of the device with respect to gravity about the first axis when one or more criteria that are satisfied when an orientation of the electronic device is greater than a threshold angle (e.g., 2, 5, 7, 10, 15, 25, 35, 45, etc. degrees) from the reference (e.g., the electronic device is not laying flat on a surface) and is based on one or more criteria other than the orientation of the device with respect to gravity about the first axis when an orientation of the device with respect to gravity about the second axis is less than the threshold angle. In some embodiments, the display is optionally displaying a user interface that corresponds to the orientation associated with the electronic device (e.g., the user interface is in a landscape orientation). In some embodiments, the user interface optionally does not correspond to the orientation associated with the electronic device (e.g., the user interface is in a portrait orientation, as described above.), the electronic device decreases (702d) the value of the parameter in accordance with the selection of the first button (e.g., decreasing the volume as shown in FIG. 6D). For example, decreasing the volume of audio emitted by the electronic device by one or more respective units (e.g., measurements of loudness or intensity). In some embodiments, the electronic device optionally displays a volume HUD on the user interface of the display of the electronic device in response to selection of the first button. For example, the volume element/bar/HUD indicates an amount that the volume has decreased (e.g., one respective unit). In some embodiments, the volume HUD is displayed at a fixed region of the user interface irrespective of the orientation associated with the electronic device (e.g., displayed at or near the buttons). In some embodiments, the volume HUD is displayed at a region of the user interface based on the orientation associated with the electronic device (e.g., displayed at or near a top portion of the user interface in the landscape orientation). Dynamically assigning functionality to a button of a device depending on an orientation associated with the device allows intuitive control of a parameter associated with the device, which can be particularly beneficial when the button (or buttons) is on a device that can be used in multiple different orientations and/or has a substantially symmetrical appearance (e.g., a housing and/or display of the device is substantially symmetrical in rotational symmetry with 90 or 180 degrees of rotation), thereby improving user-device interaction.

In some embodiments, the electronic device detects (704a) an indication of selection of a second button, different from the first button, of the one or more buttons, such as selection of button 641B in FIG. 6B (e.g., a finger press or hold on another of the buttons of the electronic device). In some embodiments, selection of a second button (e.g., a physical button, such as a button that includes a spring element and has travel in response to a press from a user's finger) of the one or more buttons causes the electronic device to perform an action opposite of that associated with the first button. For example, if selection of the first button causes the volume of audio emitted from the electronic device to increase, selection of the second button optionally causes the volume of audio emitted from the electronic device to decrease. In some embodiments, the one or more buttons are physical buttons, as described above. In some embodiments, the second button (and/or the one or more buttons) is optionally a solid state button (e.g., an interactive region of the display of the electronic device and/or the housing of the electronic device, different from that corresponding to the first button, configured to detect an applied force and optionally provide haptic feedback in response to the applied force reaching a force threshold corresponding to selection of the button (e.g., using a haptic actuator, resonator, vibrator, etc.).

In some embodiments, in response to detecting the indication of the selection of the second button (704b), in accordance with a determination that the orientation associated with the electronic device (e.g., the orientation associated with a portion of the electronic device that includes the one or more buttons such as an edge of the device that includes volume buttons) with respect to the reference is the first orientation, such as orientation A in FIG. 6B (e.g., an orientation of the portion of the electronic device (e.g., including the buttons, such as an edge of the device) relative to the reference is the first orientation. For example, the orientation associated with the electronic device (e.g., an orientation of a displayed user interface or an orientation of a respective axis of the device, such as the axis of the portion of the device) with respect to a reference (e.g., gravity, etc.) is substantially (e.g., within a threshold, such as 1, 2, 3, 5, 10, 15, 30, 45 degrees, or being) vertical or a portrait orientation (e.g., a dimension of the (e.g., display of the) electronic device substantially (e.g., within a threshold, such as 1, 2, 3, 5, 10, 15, 30, 45 degrees, or being) parallel to gravity is greater than a dimension of the electronic device substantially (e.g., within a threshold, such as 1, 2, 3, 5, 10, 15, 30, 45 degrees, or being) perpendicular to gravity). In some embodiments, the orientation associated with the electronic device is the orientation of the electronic device before the electronic device last entered a power down state, low power state, or sleep state. In some embodiments, the first orientation is based on an orientation of the device with respect to gravity about a first axis when one or more criteria that are satisfied when an orientation of the electronic device with respect to gravity about a second axis is greater than a threshold angle (e.g., 2, 5, 7, 10, 15, 25, 35, 45, etc. degrees) from the reference (e.g., the electronic device is not lying flat on a surface) and is based on one or more criteria other than the orientation of the device with respect to gravity about the first axis when an orientation of the device with respect to gravity about the second axis is less than the threshold angle. In some embodiments, the display is optionally displaying a user interface that corresponds to the orientation associated with the electronic device (e.g., the user interface is in a portrait orientation). In some embodiments, the user interface optionally does not correspond to the orientation associated with the electronic device (e.g., the user interface is in a landscape orientation, as described below).), the electronic device decreases (704c) the value of the parameter in accordance with the selection of the second button, such as decreasing the volume as shown in FIG. 6B (e.g., decreasing the volume of audio emitted by the electronic device by one or more respective units (e.g., measurements of loudness or intensity)). In some embodiments, the electronic device optionally displays a volume HUD on the user interface of the display of the electronic device in response to selection of the second button. For example, the volume element/bar/HUD indicates an amount that the volume has decreased (e.g., one respective unit). In some embodiments, the volume HUD is displayed at a fixed region of the user interface irrespective of the orientation associated with the electronic device (e.g., displayed at or near the buttons). In some embodiments, the volume HUD is displayed at a region of the user interface based on the orientation associated with the electronic device (e.g., displayed at or near a top portion of the user interface in the landscape orientation).

In some embodiments, in accordance with a determination that the orientation associated with the electronic device with respect to the reference is the second orientation, such as orientation B in FIG. 6D (e.g., an orientation of the portion of the electronic device mentioned earlier (e.g., including the buttons, such as an edge of the device) relative to the reference is the second orientation. For example, the orientation associated with the electronic device (e.g., an orientation of a displayed user interface or an orientation of a respective axis of the device, such as the axis of the portion of the device) with respect to the reference (e.g., gravity, etc.) is substantially (e.g., within a threshold, such as 1, 2, 3, 5, 10, 15, 30, 45 degrees, or being) horizontal or a landscape orientation (e.g., a dimension of the (e.g., display of the) electronic device substantially (e.g., within a threshold, such as 1, 2, 3, 5, 10, 15, 30, 45 degrees, or being) perpendicular to gravity is greater than a dimension of the electronic device substantially (e.g., within a threshold, such as 1, 2, 3, 5, 10, 15, 30, 45 degrees, or being) parallel to gravity). In some embodiments, the orientation associated with the electronic device is the orientation of the electronic device before the electronic device last entered a power down state, low power state, or sleep state. In some embodiments, the second orientation is based on an orientation of the device with respect to gravity about the first axis when one or more criteria that are satisfied when an orientation of the electronic device is greater than a threshold angle (e.g., 2, 5, 7, 10, 15, 25, 35, 45, etc. degrees) from the reference (e.g., the electronic device is not lying flat on a surface) and is based on one or more criteria other than the orientation of the device with respect to gravity about the first axis when an orientation of the device with respect to gravity about the second axis is less than the threshold angle. In some embodi-ments, the display is optionally displaying a user interface that corresponds to the orientation associated with the electronic device (e.g., the user interface is in a landscape orientation). In some embodiments, the user interface optionally does not correspond to the orientation associated with the electronic device (e.g., the user interface is in a portrait orientation, as described above).), the electronic device increases (704d) the value of the parameter in accordance with the selection of the second button (e.g., increasing the volume as shown in FIG. 6D). For example, increasing the volume of audio emitted by the electronic device by one or more respective units (e.g., measurements of loudness or intensity). In some embodiments, the electronic device optionally displays a volume element/bar/HUD on the user interface of the display of the electronic device in response to selection of the second button. For example, the volume HUD indicates an amount that the volume has increased (e.g., one respective unit). In some embodiments, the volume HUD is displayed at a fixed region of the user interface irrespective of the orientation associated with the electronic device (e.g., displayed at or near the buttons). In some embodiments, the volume HUD is displayed at a region of the user interface based on the orientation associated with the electronic device (e.g., displayed at or near a top portion of the user interface in the portrait orientation). Dynamically assigning functionality to a button of a device depending on an orientation associated with the device allows intuitive control of a parameter associated with the device, thereby improving user-device interaction.

In some embodiments, the first button and the second button are on a same side of the electronic device (706a) (e.g., buttons 641A and 641B in FIG. 6A). For example, the one or more buttons are located on a single respective side or edge of the electronic device. In some embodiments, the first button is located adjacent to the second button on the respective side of the electronic device. Dynamically assigning functionality to a pair of buttons on a same side of a device depending on an orientation associated with the device allows intuitive control of a parameter associated with the device, thereby improving user-device interaction.

In some embodiments, increasing the value of the parameter in accordance with the orientation associated with the device with respect to the reference being the first orientation, and decreasing the value of the parameter in accordance with the orientation associated with the device with respect to the reference being the second orientation, are further in accordance with a determination that a language setting of the electronic device corresponds to a first language (708a) (e.g., language of a user interface displayed via the device as shown in FIG. 6A). For example, the language displayed and/or used by one or more applications operating on the electronic device, where the language reads left-to-right (e.g., a leftmost edge of the device while in a respective orientation to a rightmost edge of the device while in the respective orientation) or right-to-left (e.g., a rightmost edge of the device while in the respective orientation to a leftmost edge of the device while in the respective orientation). In some embodiments, selection of the one or more buttons of the electronic device optionally causes the volume of audio emitted from the electronic device to increase or decrease depending on the orientation of the electronic device and the language displayed and/or used by the one or more applications operating on the electronic device.

In some embodiments, in response to detecting the indication of the selection of the first button and in accordance with a determination that the language setting of the electronic device corresponds to a second language, that has a different reading direction from a reading direction of the first language (708b), such as the language of the user interface displayed via the device as shown in FIG. 6G (e.g., the first language is a right-to-left language (or a left-to-right language) and the second language is a left-to-right language (or a right-to-left language).), in accordance with the determination that the orientation associated with the electronic device with respect to the reference is the first orientation (e.g., an orientation of the portion of the electronic device (e.g., including the buttons, such as an edge of the device) relative to the reference is the first orientation, as described above.), the electronic device decreases (708c) the value of the parameter in accordance with the selection of the first button, such as decreasing the volume as shown in FIG. 6I (e.g., decreasing the volume of audio emitted by the electronic device by one or more respective units (e.g., measurements of loudness or intensity)). In some embodiments, the electronic device optionally displays a volume HUD on the user interface of the display of the electronic device in response to selection of the first button, as described above.

In some embodiments, in accordance with the determination that the orientation associated with the electronic device with respect to the reference is the second orientation (e.g., an orientation of the portion of the electronic device mentioned earlier (e.g., including the buttons, such as an edge of the device) relative to the reference is the second orientation, as described above.), the electronic device increases (708d) the value of the parameter in accordance with the selection of the first button (e.g., increasing the volume as shown in FIG. 6H). For example, increasing the volume of audio emitted by the electronic device by one or more respective units (e.g., measurements of loudness or intensity). In some embodiments, the electronic device optionally displays a volume element/bar/HUD on the user interface of the display of the electronic device in response to selection of the second button, as described above. Dynamically assigning functionality to a button of a device depending on an orientation associated with the device and a language setting of the device allows intuitive control of a parameter associated with the device in accordance with the language selected by a user of the device, thereby improving user-device interaction.

In some embodiments, the first language is left-to-right language, such as the language of the user interface shown in FIG. 6A (e.g., English, Spanish, French, etc.), and the second language is a right-to-left language (710a), such as the language of the user interface shown in FIG. 6G (e.g., Arabic, Hebrew, etc.). For example, the language displayed and/or used by one or more applications running on the device is left-to-right or right-to-left, depending on the language selected by the user of the electronic device. Dynamically assigning functionality to a button of a device depending on an orientation associated with the device and a language setting of the device allows intuitive control of a parameter associated with the device in accordance with the language selected by a user of the device, thereby improving user-device interaction.

In some embodiments, the parameter is a volume parameter of the electronic device (712a) (e.g., volume of audio shown in FIG. 6A). For example, selection of the one or more buttons causes the volume of audio emitted from the electronic device to increase or decrease by one or more respective units (e.g., measurements of loudness or intensity). Dynamically assigning functionality to a volume button of a device depending on an orientation associated with the device allows intuitive control of the audio associated with the device, thereby improving user-device interaction.

In some embodiments, after detecting the indication of the selection of the first button, the electronic device detects (714a) a second indication of selection of the first button, such as selection of button 641A in FIG. 6A. (e.g., a subsequent finger press or hold on the one of the buttons of the electronic device). In some embodiments, subsequent selection of the first button (e.g., a physical button, such as a button that includes a spring element and has travel in response to a press from a user's finger) of the one or more buttons causes the volume of audio emitted from the electronic device to increase or decrease again. In some embodiments, the one or more buttons are physical buttons, as described above. In some embodiments, the first button (and/or the one or more buttons) is optionally a solid-state button, as described above. In some embodiments, in response to detecting the second indication of the selection of the first button (714b), in accordance with a determination that the orientation associated with the electronic device with respect to the reference is the first orientation, such as orientation A in FIG. 6A (e.g., an orientation of the portion of the electronic device (e.g., including the buttons, such as an edge of the device) relative to the reference (e.g., gravity) is the first orientation, as described above.), the electronic device increases (714c) the value of the parameter in accordance with the selection of the first button, such as increasing the volume as shown in FIG. 6A (e.g., increasing the volume of audio emitted by the electronic device by one or more respective units (e.g., measurements of loudness or intensity)). In some embodiments, the electronic device optionally displays a volume element/bar/HUD on the user interface of the display of the electronic device in response to selection of the second button, as described above.

In some embodiments, in accordance with a determination that the orientation associated with the electronic device with respect to the reference is the second orientation, such as orientation B in FIG. 6D (e.g., an orientation of the portion of the electronic device mentioned earlier (e.g., including the buttons, such as an edge of the device) relative to the reference (e.g., gravity) is the second orientation, as described above.), the electronic device decreases (714d) the value of the parameter in accordance with the selection of the second button (e.g., decreasing the volume as shown in FIG. 6D). For example, decreasing the volume of audio emitted by the electronic device by one or more respective units (e.g., measurements of loudness or intensity). In some embodiments, the electronic device optionally displays a volume HUD on the user interface of the display of the electronic device in response to selection of the first button, as described above. Dynamically assigning functionality to a button of a device depending on an orientation associated with the device allows intuitive control of a parameter associated with the device, thereby improving user-device interaction.

In some embodiments, in response to detecting the indication of the selection of the first button and in accordance with a determination that a current orientation of the electronic device satisfies one or more criteria (716a), such as orientation A in FIG. 6T or orientation B in FIG. 6U (e.g., the one or more criteria are satisfied when an orientation of the electronic device with respect to gravity about a second axis is less than a threshold angle (e.g., 2, 5, 7, 10, 15, 25, 35, 45, etc. degrees) from the reference (e.g., the electronic device is lying flat on a surface).), the orientation associated with the electronic device is the first orientation in accordance with a determination that the electronic device was in the first orientation during prior usage (e.g., immediately prior usage of the electronic device, prior to being laid flat on the surface) of the electronic device (716b) (e.g., orientation B prior to device 500 being laid flat on tabletop 615 in FIG. 6X). For example, the orientation associated with the electronic device (e.g., an orientation of a displayed user interface or an orientation of a respective axis of the device, such as the axis of the portion of the device) with respect to a reference (e.g., gravity, etc.) was substantially (e.g., within a threshold, such as 1, 2, 3, 5, 10, 15, 30, 45 degrees, or being) parallel and/or vertical or a portrait orientation (e.g., a dimension of the (e.g., display of the) electronic device substantially (e.g., within a threshold, such as 1, 2, 3, 5, 10, 15, 30, 45 degrees, or being) parallel to gravity was greater than a dimension of the electronic device substantially (e.g., within a threshold, such as 1, 2, 3, 5, 10, 15, 30, 45 degrees, or being) perpendicular to gravity) before the electronic device last entered a power down state, low power state, or sleep state and/or if the orientation of the user interface displayed by the electronic device in the last prior usage of the electronic device corresponded to the first orientation. The electronic device is optionally lying flat on a surface (e.g., a tabletop) and is not currently in the first orientation, but the orientation associated with the electronic device is optionally the orientation the device was in the last time the one or more criteria (described above) were not satisfied (e.g., the orientation of the electronic device with respect to gravity about the second axis was greater than the threshold angle (e.g., 2, 5, 7, 10, 15, 25, 35, 45, etc. degrees) from the reference).

In some embodiments, the orientation associated with the electronic device is the second orientation in accordance with a determination that the electronic device was in the second orientation during the prior usage (e.g., immediately prior usage of the electronic device, prior to being laid flat on the surface) of the electronic device (716c) (e.g., orientation D prior to device 500 being laid flat on tabletop 615 as shown in FIG. 6Z). For example, the orientation associated with the electronic device (e.g., an orientation of a displayed user interface or an orientation of a respective axis of the device, such as the axis of the portion of the device) with respect to the reference (e.g., gravity, etc.) was substantially (e.g., within a threshold, such as 1, 2, 3, 5, 10, 15, 30, 45 degrees, or being) perpendicular and/or horizontal or a landscape orientation (e.g., a dimension of the (e.g., display of the) electronic device substantially (e.g., within a threshold, such as 1, 2, 3, 5, 10, 15, 30, 45 degrees, or being) perpendicular to gravity is greater than a dimension of the electronic device substantially (e.g., within a threshold, such as 1, 2, 3, 5, 10, 15, 30, 45 degrees, or being) parallel to gravity) before the electronic device last entered a power down state, low power state, or sleep state and/or if the orientation of the user interface displayed by the electronic device in the last prior usage of the electronic device corresponded to the second orientation. The electronic device is optionally lying flat on a surface (e.g., a tabletop) and is not currently in the second orientation, but the orientation associated with the electronic device is optionally the orientation the device was in the last time the one or more criteria (described above) were not satisfied (e.g., the orientation of the electronic device with respect to gravity about the second axis was greater than the threshold angle (e.g., 2, 5, 7, 10, 15, 25, 35, 45, etc. degrees) from the reference). Dynamically assigning functionality to a button of a device depending on a previous orientation associated with the device allows intuitive control of a parameter associated with the device when the device is laying flat on a surface, thereby improving user-device interaction.

In some embodiments, in response to detecting the indication of the selection of the first button and in accordance with a determination that a display generation component in communication with the electronic device (e.g., a display integrated with the electronic device (optionally a touch screen display), an external display such as a monitor, projector, television, or a hardware component (optionally integrated or external) for projecting a user interface or causing a user interface to be visible to one or more users, etc.) is not displaying a user interface when the selection of the first button is detected (718a), such as display 504 being off in FIG. 6T (e.g., the display is off (e.g., the device is in a shut off state, or a low power state, or a sleep state) when a press or hold is detected on the one of the buttons of the electronic device.), the orientation associated with the electronic device is the first orientation in accordance with a determination that, in response to an input to wake the electronic device, the electronic device is configured to display a respective user interface that is aligned to a respective axis having the first orientation relative to a portion of the electronic device (718b), such as User Interface A in FIG. 6A (e.g., the user interface displayed on the display is aligned to an axis that has the first orientation relative to the portion of the electronic device (including the buttons, such as an edge of the device)). In some embodiments, the axis is optionally running parallel to a respective edge (e.g., top edge) of the respective user interface that is configured to be displayed on the electronic device. In some embodiments, the respective edge of the respective user interface corresponds to a top edge (e.g., a different edge of the electronic device than the one that includes the one or more buttons) of the electronic device (e.g., the user interface is in a portrait (or substantially vertical, such as within 1, 2, 3, 5, 10, 15, 30, 45 degrees of such an) orientation). In some embodiments, an effective orientation of the electronic device is the first orientation, as described above, if a user interface that will be displayed on the display of the electronic device will have the first orientation relative to the portion of the electronic device (e.g., a portrait (or substantially vertical, such as within 1, 2, 3, 5, 10, 15, 30, 45 degrees of such an) orientation) when the display and/or device is turned on (e.g., activated, awakened, etc. in response to a selection of a power button of the electronic device, a home button of the electronic device, a tap on the display of the electronic device, selection of a button corresponding to control of the parameter of the device, such as volume (e.g., the first button), etc.). In some embodiments, the orientation of the user interface, and thus the effective orientation associated with the electronic device, is determined based on an orientation that the electronic device was associated with prior to the display being turned off (e.g., shut-off, sleep, or low power), and thus prior to detecting the selection of the first button. In some embodiments, the orientation of the user interface, and thus the effective orientation associated with the electronic device, is determined based on orientation of a user interface of an application displayed on the electronic device prior to the display and/or device being off. For example, a user interface of an application was displayed in a portrait (or substantially vertical, such as within 1, 2, 3, 5, 10, 15, 30, 45 degrees of such an) orientation prior to the display and/or device being turned off. In some embodiments, the orientation of the user interface is determined based on one or more devices in communication with the electronic device (e.g., input devices) prior to the display and/or device being off and/or when the first button is selected. For example, a respective input device (e.g., a keyboard or keyboard case, mouse, headphones, etc. connected to the electronic device when the first button is selected) causes (e.g., biases, forces, etc.) the orientation of the user interface to be displayed in a portrait orientation (e.g., to effectively/properly use the respective input device), and thus causes the effective orientation of the electronic device to correspond to the orientation of the user interface to be displayed.

In some embodiments, the orientation associated with the electronic device is the second orientation in accordance with a determination that, in response to the input to wake the electronic device, the electronic device is configured to display the respective user interface that is aligned to the respective axis having the second orientation relative to the portion of the electronic device (718c), such as User Interface A in FIG. 6D. For example, the user interface displayed on the display is aligned to an axis that has the second orientation relative to the portion of the electronic device (including the buttons, such as an edge of the device). In some embodiments, the axis is optionally running parallel to a respective edge (e.g., top edge) of the respective user interface that is configured to be displayed on the electronic device. In some embodiments, the respective edge of the respective user interface corresponds to a side edge (e.g., the same edge of the electronic device that includes the one or more buttons) of the electronic device (e.g., the user interface is in a landscape (or substantially horizontal, such as within 1, 2, 3, 5, 10, 15, 30, 45 degrees of such an) orientation). In some embodiments, an effective orientation of the electronic device is the second orientation, as described above, if a user interface that will be displayed on the display of the electronic device will have the second orientation (e.g., a landscape (or substantially horizontal, such as within 1, 2, 3, 5, 10, 15, 30, 45 degrees of such an) orientation) relative to the portion of the electronic device when the display and/or device is turned on (e.g., activated, awakened, etc. in response to a selection of a power button of the electronic device, a selection of a home button of the electronic device, a tap on the display of the electronic device, etc.). In some embodiments, the orientation of the user interface, and thus the effective orientation associated with the electronic device, is determined based on an orientation that the electronic device was associated with prior to the display being turned off (e.g., shut-off, sleep, or low power), and thus prior to detecting the selection of the first button. In some embodiments, the orientation of the user interface, and thus the effective orientation associated with the electronic device, is determined based on orientation of a user interface of an application displayed on the electronic device prior to the display and/or device being off. For example, a user interface of an application was displayed in a landscape (or substantially horizontal, such as within 1, 2, 3, 5, 10, 15, 30, 45 degrees of such an) orientation prior to the display and/or device being turned off. In some embodiments, the orientation of the user interface is determined based on one or more devices in communication with the electronic device (e.g., input devices) prior to the display and/or device being off and/or when the first button is selected. For example, a respective input device (e.g., a keyboard or keyboard case, mouse, headphones, etc. connected to the electronic device when the first button is selected) causes (e.g., biases, forces, etc.) the orientation of the user interface to be displayed in a landscape orientation (e.g., to effectively/properly use the respective input device), and thus causes the effective orientation of the electronic device to correspond to the orientation of the user interface to be displayed. Dynamically assigning functionality to a button of a device depending the orientation in which the device would display a user interface if awoken allows intuitive control of a parameter associated with the device after and/or leading up to a wake of the display of the device, thereby improving user-device interaction.

In some embodiments, in response to detecting the indication of the selection of the first button and in accordance with a determination that the electronic device is not configured to adjust display of a respective user interface based on an orientation of the electronic device with respect to the reference (720a), such as User Interface A having a locked orientation as shown in FIG. 6K) (e.g., an orientation of the user interface displayed on the electronic device is locked (e.g., locked user interface setting). In some embodiments, a change to an orientation associated with the electronic device optionally does not correspondingly change the orientation of the user interface (e.g., the user interface does not rotate on the display of the device as the device orientation changes).), the orientation associated with the electronic device is the first orientation in accordance with a determination that the electronic device is configured to display the respective user interface that is aligned to a respective axis (e.g., an axis running parallel to a respective edge (e.g., top edge) of the respective user interface that is configured to be displayed on the electronic device. In some embodiments, the respective edge of the respective user interface corresponds to a top edge of the electronic device (e.g., the user interface is in a portrait (or substantially vertical, such as within 1, 2, 3, 5, 10, 15, 30, 45 degrees of such an) orientation.) having the first orientation relative to a portion of the electronic device irrespective of the orientation of the electronic device with respect to the reference (720b) (e.g., User Interface A in FIG. 6L). For example, an effective orientation of the electronic device is the first orientation, as described above, if the user interface configured to be displayed on a display of the electronic device is locked (e.g., via the locked user interface setting) in the first orientation (e.g., a portrait (or substantially vertical, such as within 1, 2, 3, 5, 10, 15, 30, 45 degrees of such an) orientation) relative to the portion of the electronic device. In some embodiments, a change in the orientation associated with the electronic device optionally does not change the orientation of the user interface, and thus the orientation associated with the electronic device continues to correspond to the orientation of the user interface (e.g., the first orientation).

In some embodiments, the orientation associated with the electronic device is the second orientation in accordance with a determination that the electronic device is configured to display the respective user interface that is aligned to the respective axis (e.g., an axis running parallel to a respective edge (e.g., top edge) of the respective user interface that is configured to be displayed on the electronic device. In some embodiments, the respective edge of the respective user interface corresponds to a side edge of the electronic device (e.g., the user interface is in a landscape (or substantially horizontal, such as within 1, 2, 3, 5, 10, 15, 30, 45 degrees of such an) orientation) having the second orientation relative to the portion of the electronic device irrespective of the orientation of the electronic device with respect to the reference (720c) (e.g., User Interface A in FIG. 6Z). For example, an effective orientation of the electronic device is the second orientation, as described above, if the user interface configured to be displayed on a display of the electronic device is locked (e.g., via the locked user interface setting) in the second orientation (e.g., a landscape (or substantially horizontal, such as within 1, 2, 3, 5, 10, 15, 30, 45 degrees of such an) orientation) relative to the portion of the electronic device. In some embodiments, a change in the orientation associated with the electronic device optionally does not change the orientation of the user interface, and thus the orientation associated with the electronic device continues to correspond to the orientation of the user interface (e.g., the second orientation). Maintaining functionality assigned to a button of a device depending on a locked orientation of a user interface displayed on a display of the device allows intuitive control of a parameter associated with the device while the user interface is displayed in the locked orientation, thereby improving user-device interaction.

In some embodiments, the indication of the selection of the first button is detected while an orientation of the electronic device with respect to the reference is the first orientation (722a) (e.g., an orientation of the portion of the electronic device (e.g., including the buttons, such as an edge of the device) relative to the reference is the first orientation, as described above.). In some embodiments, after detecting the indication of the selection of the first button, the electronic device detects a change in the orientation of the electronic device from the first orientation to the second orientation with respect to the reference (722b), such as counterclockwise rotation of device 500 as shown in FIG. 6E (e.g., an orientation of the portion of the electronic device (e.g., including the buttons, such as an edge of the device) relative to the reference after selection of the one of the buttons of the electronic device is adjusted (e.g., rotated, moved, etc.) to be the second orientation (described above).). In some embodiments, while the orientation of the electronic device with respect to the reference is the second orientation (722c), the electronic device detects (722d) a second indication of selection of the first button, such as selection of button 641A in FIG. 6D (e.g., a subsequent finger press or hold on the one of the buttons of the electronic device. In some embodiments, subsequent selection of the first button (e.g., a physical button, such as a button that includes a spring element and has travel in response to a press from a user's finger) of the one or more buttons causes the volume of audio emitted from the electronic device to increase or decrease again). In some embodiments, the one or more buttons are physical buttons, as described above. In some embodiments, the first button (and/or the one or more buttons) is optionally a solid-state button, as described above.

In some embodiments, in response to detecting the second indication of the selection of the first button (722e), in accordance with a determination that one or more criteria are satisfied (e.g., the one or more criteria are satisfied when the change in the orientation associated with the electronic device is in a respective direction (e.g., is in a clockwise direction). In some embodiments, the new orientation associated with the electronic device optionally causes the electronic device to forgo remapping the functionality of the one or more buttons, as will be described in more detail below. In some embodiments, the one or more criteria are satisfied when an orientation of the user interface displayed on the electronic device is locked (e.g., locked user interface setting).), the electronic device increases (722f) the value of the parameter in accordance with the selection of the first button, such as increasing the volume as shown in FIG. 6F (e.g., increasing the volume of audio emitted by the electronic device by one or more respective units (e.g., measurements of loudness or intensity)). Thus, in some embodiments, when the one or more criteria are satisfied, the electronic device does not change the functionality of the first button even in response to a change in orientation of the electronic device. In some embodiments, the electronic device optionally displays a volume element/bar/HUD on the user interface of the display of the electronic device in response to the second selection of the first button, as described above.

In some embodiments, in accordance with a determination that the one or more criteria are not satisfied (e.g., the one or more criteria are not satisfied because the change in the orientation associated with the electronic device is not in the respective direction (e.g., is in a counterclockwise direction). In some embodiments, the new orientation associated with the electronic device optionally causes the electronic device to remap the functionality of the one or more buttons, as will be described in more detail below. In some embodiments, the one or more criteria are not satisfied because an orientation of the user interface displayed on the electronic device is not locked (e.g., unlocked user interface setting).), the electronic device decreases (722g) the value of the parameter in accordance with the selection of the first button, such as decreasing the volume as shown in FIG. 6D. For example, decreasing the volume of audio emitted by the electronic device by one or more respective units (e.g., measurements of loudness or intensity). Thus, in some embodiments, when the one or more criteria are not satisfied, the electronic device does change the functionality of the first button in response to a change in orientation of the electronic device. In some embodiments, the electronic device optionally displays a volume HUD on the user interface of the display of the electronic device in response to the second selection of the first button, as described above. Selectively adjusting functionality of a button of a device depending on a detected change in orientation associated with the device avoids functionality changes when those changes do not correspond to the updated orientation of the electronic device, thereby improving user-device interaction and avoiding errors in usage.

In some embodiments, the one or more criteria include a criterion that is satisfied when a change in orientation of the electronic device from the first orientation to the second orientation with respect to the reference is in a first direction (724a), such as a clockwise rotation as shown from FIGS. 6W to 6X (e.g., rotation of the electronic device is in a clockwise direction (e.g., from a portrait (or substantially vertical, such as within 1, 2, 3, 5, 10, 15, 30, 45 degrees of such an) orientation to a landscape orientation (or substantially (e.g., within a threshold, such as 1, 2, 3, 5, 10, 15, 30, 45 degrees, or being) horizontal orientation), with the one or more buttons falling on a respective side of the electronic device (e.g., on a bottom side of the electronic device in the landscape orientation), with respect to the reference). For example, the one or more criteria are satisfied when, starting with the one or more buttons on a right side of the electronic device (e.g., the first button is above the second button, and the buttons are aligned along the axis of the reference), a clockwise rotation of the orientation causes the one or more buttons to be disposed on a bottom side of the electronic device (e.g., the first button is adjacently to the right of the second button relative to the axis of the reference), which results in the remapping functionality of the one or more buttons not occurring (e.g., selection of the first button continues to cause the volume to increase and selection of the second button continues to cause the volume to decrease).

In some embodiments, the criterion is not satisfied when the change in orientation of the electronic device from the first orientation to the second orientation with respect to the reference is in a second direction, different from the first direction (724*a*), such as a counterclockwise rotation as shown from FIGS. 6E to 6F. For example, rotation of the electronic device is in a counterclockwise direction (e.g., from a portrait (or substantially vertical, such as within 1, 2, 3, 5, 10, 15, 30, 45 degrees of such an) orientation to a landscape orientation (or substantially (e.g., within a threshold, such as 1, 2, 3, 5, 10, 15, 30, 45 degrees, or being) horizontal orientation), with the one or more buttons falling on a second respective side of the electronic device (e.g., on a top side of the electronic device in the landscape orientation), with respect to the reference.). For example, the one or more criteria are not satisfied when, starting with the one or more buttons on a right side of the electronic device (e.g., the first button is above the second button, and the buttons are aligned along the axis of the reference), a counterclockwise rotation of the orientation causes the one or more buttons to be disposed on a top side of the electronic device (e.g., the first button is adjacently to the left of the second button relative to the axis of the reference), which causes the electronic device to remap functionality of the one or more buttons (e.g., selection of the first button causes the volume to decrease and selection of the second button causes the button to increase). Selectively adjusting functionality of a button of a device depending on a direction of a detected change in orientation associated with the device avoids functionality changes when those changes do not correspond to the updated orientation of the electronic device, thereby improving user-device interaction and avoiding errors in usage.

In some embodiments, a respective user interface displayed, via a display generation component in communication with the electronic device (e.g., a display integrated with the electronic device (optionally a touch screen display), an external display such as a monitor, projector, television, or a hardware component (optionally integrated or external) for projecting a user interface or causing a user interface to be visible to one or more users, etc.), is aligned to a respective axis having the first orientation relative to a portion of the electronic device (e.g., the user interface displayed on the display is aligned to an axis that has the first orientation relative to the portion of the electronic device (including the buttons, such as an edge of the device). In some embodiments, the user interface displayed on the device is in a portrait (or substantially vertical, such as within 1, 2, 3, 5, 10, 15, 30, 45 degrees of such an) orientation with respect to the portion of the electronic device.) when the orientation associated with the electronic device with respect to the reference is the first orientation, such as the orientation of User Interface A in FIG. 6K (e.g., an orientation of the portion of the electronic device (e.g., including the buttons, such as an edge of the device) relative to the reference (e.g., gravity) is the first orientation, as described above.) and when the orientation associated with the electronic device with respect to the reference is the second orientation (726*a*), such as the orientation of User Interface A in FIG. 6L (e.g., an orientation of the portion of the electronic device (e.g., including the buttons, such as an edge of the device) relative to the reference (e.g., gravity) is the second orientation, as described above.). In some embodiments, the user interface displayed on the device is in a portrait (or substantially vertical, such as within 1, 2, 3, 5, 10, 15, 30, 45 degrees of such an) orientation with respect to the portion of the electronic device. Thus, in some embodiments, the first orientation and the second orientation of the electronic device both include displaying the user interface in a portrait (or substantially vertical, such as within 1, 2, 3, 5, 10, 15, 30, 45 degrees of such an) orientation with respect to the portion of the electronic device. Dynamically assigning functionality to a button of a device for the same user interface orientation allows intuitive control of a parameter associated with the device while the user interface is active, thereby improving user-device interaction.

In some embodiments, a respective user interface displayed, via a display generation component in communication with the electronic device (e.g., a display integrated with the electronic device (optionally a touch screen display), an external display such as a monitor, projector, television, or a hardware component (optionally integrated or external) for projecting a user interface or causing a user interface to be visible to one or more users, etc.), is aligned to a respective axis having the second orientation relative to a portion of the electronic device (e.g., the user interface displayed on the display is aligned to an axis that has the second orientation relative to the portion of the electronic device (including the buttons, such as an edge of the device). In some embodiments, the user interface displayed on the device is in a landscape (or substantially horizontal, such as within 1, 2, 3, 5, 10, 15, 30, 45 degrees of such an) orientation with respect to the portion of the electronic device.) when the orientation associated with the electronic device with respect to the reference is the first orientation, such as the orientation of User Interface A in FIG. 6Z (e.g., an orientation of the portion of the electronic device (e.g., including the buttons, such as an edge of the device) relative to the reference (e.g., gravity) is the first orientation, as described above.) and when the orientation associated with the electronic device with respect to the reference is the second orientation (728*a*), such as the orientation of User Interface A in FIG. 6D (e.g., an orientation of the portion of the electronic device (e.g., including the buttons, such as an edge of the device) relative to the reference (e.g., gravity) is the second orientation, as described above.). In some embodiments, the user interface displayed on the device is in a landscape (or substantially horizontal, such as within 1, 2, 3, 5, 10, 15, 30, 45 degrees of such an) orientation with respect to the portion of the electronic device. Thus, in some embodiments, the first orientation and the second orientation of the electronic device both include displaying the user interface in a landscape (or substantially horizontal, such as within 1, 2, 3, 5, 10, 15, 30, 45 degrees of such an) orientation with respect to the reference. Dynamically assigning functionality to a button of a device for the same user interface orientation allows intuitive control of a parameter associated with the device while the user interface is active, thereby improving user-device interaction.

In some embodiments, increasing the value of the parameter in accordance with the orientation associated with the device with respect to the reference being the first orientation (e.g., increasing the volume of audio emitted by the electronic device by one or more respective units (e.g., measurements of loudness or intensity).), and decreasing the value of the parameter in accordance with the orientation associated with the device with respect to the reference being the second orientation (e.g., decreasing the volume of audio emitted by the electronic device by one or more respective units (e.g., measurements of loudness or intensity).), are further in accordance with a determination that a duration of the selection of the first button satisfies one or more criteria (730*a*), such as selection of button 641A in FIG. 6A (e.g., the finger press or hold on the one of the buttons of the electronic device is maintained for less than a threshold period of time, such as 0.5, 0.7, 0.9, 1, 1.5, 2, 2.5, etc. seconds.). In some embodiments, in response to detecting the indication of the selection of the first button, and in accordance with a determination that the duration of the selection of the first button does not satisfy the one or more criteria (730b), such as selection of button 641B in FIG. 6R (e.g., because the finger press or hold on the one of the buttons of the electronic device is maintained for the threshold period of time (e.g., 0.5, 0.7, 0.9, 1, 1.5, 2, 2.5, etc. seconds) or greater than the threshold period of time.), in accordance with the determination that the orientation associated with the electronic device with respect to the reference is the second orientation (e.g., an orientation of the portion of the electronic device (e.g., including the buttons, such as an edge of the device) relative to the reference (e.g., gravity) is the second orientation, as described above.), the electronic device performs (730c) a discrete operation independent of the value of the parameter, such as muting the volume as shown in FIG. 6R (e.g., performing a mute operation that silences the audio emitted by the electronic device, independent of the current volume setting of the electronic device). In some embodiments, selection of the first button performs the discrete operation only when the orientation of the electronic device is in the second orientation (e.g., landscape (or substantially horizontal, such as within 1, 2, 3, 5, 10, 15, 30, 45 degrees of such an) orientation with respect to gravity). In some embodiments, if the electronic device is in the first orientation (e.g., portrait (or substantially vertical, such as within 1, 2, 3, 5, 10, 15, 30, 45 degrees of such an) orientation with respect to gravity), selection of the first button for the (and/or beyond the) threshold period of time (e.g., 0.5, 0.7, 0.9, 1, 1.5, 2, 2.5, etc. seconds) does not cause the electronic device to perform the discrete operation.

In some embodiments, in accordance with the determination that the orientation associated with the electronic device with respect to the reference is the first orientation (e.g., an orientation of the portion of the electronic device (e.g., including the buttons, such as an edge of the device) relative to the reference (e.g., gravity) is the first orientation, as described above.), the electronic device forgoes performing (730d) the discrete operation, such as not performing the muting operation but rather increasing the volume as shown in FIG. 6S. For example, forgoing performing the mute operation silencing the audio emitted by the electronic device. In some embodiments, selection of the first button performs the discrete operation only when the orientation of the electronic device is in the second orientation (e.g., landscape (or substantially horizontal, such as within 1, 2, 3, 5, 10, 15, 30, 45 degrees of such an) orientation with respect to gravity). In some embodiments, if the electronic device is in the first orientation (e.g., portrait (or substantially vertical, such as within 1, 2, 3, 5, 10, 15, 30, 45 degrees of such an) orientation with respect to gravity), selection of the first button for the (and/or beyond the) threshold period of time (e.g., 0.5, 0.7, 0.9, 1, 1.5, 2, 2.5, etc. seconds) does not cause the electronic device to perform the discrete operation. For example, the electronic device optionally continually increases (or decreases, depending on the orientation associated with the device) the volume of the audio emitted by the electronic device in accordance with the duration of the selection of the first button (e.g., navigates up or down through the parameter based on a duration of the input). Maintaining discrete functionality of a button of a device depending on an orientation associated with the device allows intuitive control of a discrete operation associated with the device, thereby improving user-device interaction.

In some embodiments, performing the discrete operation includes muting a volume of the electronic device (732a), such as muting the volume as shown in FIG. 6R. For example, the measurement of loudness or intensity of the volume of audio emitted by the electronic device is zero (or substantially zero). Maintaining discrete functionality of a button of a device depending on an orientation associated with the device allows intuitive control of a mute operation associated with the device, thereby improving user-device interaction.

In some embodiments, increasing the value of the parameter in accordance with the orientation associated with the device with respect to the reference being the first orientation (e.g., increasing the volume of audio emitted by the electronic device by one or more respective units (e.g., measurements of loudness or intensity).), and decreasing the value of the parameter in accordance with the orientation associated with the device with respect to the reference being the second orientation (e.g., decreasing the volume of audio emitted by the electronic device by one or more respective units (e.g., measurements of loudness or intensity).), are further in accordance with a determination that the selection of the first button satisfies one or more criteria (734a), such as selection of button 641A in FIG. 6A and/or selection of button 641B in FIG. 6B (e.g., including a criterion that is satisfied when the finger press or hold on the one of the buttons of the electronic device is performed in a particular fashion (e.g., a single press or hold of the first button)). In some embodiments, the one or more criteria are not satisfied if a plurality of the buttons of the electronic device are selected at the same time (or substantially at the same time), or are selected in a particular order within a threshold period of time after selection of the previous button, such as 0.4, 0.5, 0.7, 0.9, 1, 1.25, etc. seconds.

In some embodiments, in response to detecting the indication of the selection of the first button, and in accordance with a determination that the selection of the first button satisfies one or more second criteria, different from the one or more criteria, such as selections of buttons 641A, 641B and 642 in FIG. 6P (e.g., including a criterion that is satisfied when the finger press or hold on the first button of the electronic device is performed concurrently with a finger press or hold of another button of the electronic device (e.g., the second button, a power button of the electronic device, a home button of the electronic device, etc.). In some embodiments, the one or more second criteria include a criterion that is satisfied when the selection of the plurality of buttons is performed in a particular order (e.g., selection of the first button, followed by selection of the second button, followed by a hold of the power button for a threshold period of time, such as 0.5, 0.7, 0.9, 1, 1.5, 2, 2.5, etc. seconds). In some embodiments, the one or more second criteria are not satisfied if the selection of the plurality of buttons is not performed in the particular order within a threshold period of time after selection of the previous button (e.g., selection of the second button is not performed within 0.4, 0.5, 0.7, 0.9, 1, 1.25, etc. seconds after the selection of the first button).), the electronic device performs (734b) a hardware reset operation associated with the electronic device independent of the orientation associated with the electronic device with respect to the reference, such as hardware reset shown in FIG. 6Q. For example, causing a power shut down or inducing sleep or low power of the electronic device. In some embodiments, performing the hardware reset operation using the first button is performed the same way in the first orientation (e.g., portrait (or substantially vertical, such as within 1, 2, 3, 5, 10, 15, 30, 45 degrees of such an) orientation with respect to gravity) and the second orientation (e.g., landscape (or substantially horizontal, such as within 1, 2, 3, 5, 10, 15, 30, 45 degrees of such an) orientation with respect to gravity). For example, changing the orientation associated with the electronic device from the first orientation to the second orientation (and/or vice versa) does not affect or alter the hardware reset functionality associated with the one or more buttons of the electronic device. Maintaining hardware reset functionality of a button of a device irrespective of an orientation associated with the device allows intuitive control of the hardware reset operation associated with the device, thereby improving user-device interaction.

In some embodiments, the indication of the selection of the first button is detected while an orientation of the electronic device with respect to the reference is the first orientation (736a), such as orientation A in FIG. 6T (e.g., an orientation of the portion of the electronic device (e.g., including the buttons, such as an edge of the device) relative to the reference (e.g., gravity) is the first orientation, as described above.). In some embodiments, after detecting the indication of the selection of the first button, the electronic device detects (736b) a change in the orientation of the electronic device from the first orientation to the second orientation with respect to the reference, such as orientation B in FIG. 6U (e.g., an orientation of the portion of the electronic device (e.g., including the buttons, such as an edge of the device) relative to the reference after selection of the one of the buttons of the electronic device is adjusted (e.g., rotated, moved, etc.) to be the second orientation (described above).). In some embodiments, in response to detecting the change in the orientation of the electronic device from the first orientation to the second orientation with respect to the reference (736c), in accordance with a determination that a display generation component in communication with the electronic device (e.g., a display integrated with the electronic device (optionally a touch screen display), an external display such as a monitor, projector, television, or a hardware component (optionally integrated or external) for projecting a user interface or causing a user interface to be visible to one or more users, etc.) is not displaying a user interface (e.g., the display is off (e.g., the device is in a shut off state, or a low power state, or a sleep state).), such as display 504 being off in FIG. 6T, the electronic device associates (736d) the first button with decreasing the value of the parameter a first time threshold (e.g., Time 614B in FIG. 6U) after detecting the change in the orientation of the electronic device from the first orientation to the second orientation with respect to the reference (e.g., reassigned functionality of button 641A in FIG. 6U). For example, a finger press or hold on the first button a threshold period of time (e.g., 0.4, 0.5, 1, 1.5, 2, etc. seconds) after the orientation associated with the electronic device is rotated/moved from the first orientation (e.g., portrait (or substantially vertical, such as within 1, 2, 3, 5, 10, 15, 30, 45 degrees of such an) orientation) to the second orientation (e.g., landscape (or substantially horizontal, such as within 1, 2, 3, 5, 10, 15, 30, 45 degrees of such an) orientation) with respect to gravity optionally causes the volume of audio emitted from the electronic device to decrease one or more respective units (e.g., measurements of loudness or intensity). In some embodiments, a finger press or hold on the first button before the first threshold period of time elapses after the orientation associated with the electronic device is rotated/moved from the first orientation to the second orientation (e.g., during the change in rotation) optionally causes the volume of audio emitted from the electronic device to increase by the one or more respective units.

In some embodiments, in accordance with a determination that the display generation component is displaying a user interface (e.g., the display is on (e.g., the device is in an active state).), such as User Interface A in FIG. 6B, the electronic device associates (736e) the first button with decreasing the value of the parameter a second time threshold (e.g., Time 614C in FIG. 6D), different from the first time threshold, after detecting the change in the orientation of the electronic device from the first orientation to the second orientation with respect to the reference. For example, a finger press or hold on the first button a second threshold period of time (e.g., 0.5, 1, 1.5, 1.75, 2, 2.5, etc. seconds) after the orientation associated with the electronic device is rotated/moved from the first orientation (e.g., portrait (or substantially vertical, such as within 1, 2, 3, 5, 10, 15, 30, 45 degrees of such an) orientation) to the second orientation (e.g., landscape (or substantially horizontal, such as within 1, 2, 3, 5, 10, 15, 30, 45 degrees of such an) orientation) with respect to gravity optionally causes the volume of audio emitted from the electronic device to decrease one or more respective units (e.g., measurements of loudness or intensity). In some embodiments, a finger press or hold on the first button before the second threshold period of time elapses after the orientation associated with the electronic device is rotated/moved from the first orientation to the second orientation (e.g., during the change in rotation) optionally causes the volume of audio emitted from the electronic device to increase by the one or more respective units. Dynamically assigning functionality to a button at different times depending on whether a user interface is displayed on the device allows for responses by the device that are better-suited to the current user-device interaction, thereby improving user-device interaction.

In some embodiments, the first time threshold is smaller than the second time threshold (738a) (e.g., Time 614B is smaller than Time 614C as shown in FIG. 6U). For example, dynamically adjusting functionality of the buttons of the electronic device in response to a change in an orientation associated with the electronic device is performed faster (e.g., in a shorter amount of time, such as 0.2, 0.3, 0.4, 0.5, 1, etc. seconds) if the display of the electronic device is off (e.g., is not displaying a user interface), compared to if the display of the electronic device is on (e.g., is displaying a user interface). Dynamically assigning functionality to a button of a device depending on an orientation associated with the device faster when a user interface is not displayed on the device allows intuitive control of a parameter associated with the device after a change in orientation of the device without having to consider a displayed user interface, thereby improving user-device interaction.

In some embodiments, in response to detecting the change in the orientation of the electronic device from the first orientation to the second orientation with respect to the reference (e.g., the orientation associated with the electronic device is rotated/moved from the first orientation (e.g., portrait (or substantially vertical, such as within 1, 2, 3, 5, 10, 15, 30, 45 degrees of such an) orientation) to the second orientation (e.g., landscape (or substantially horizontal, such as within 1, 2, 3, 5, 10, 15, 30, 45 degrees of such an) orientation) with respect to gravity) and in accordance with the determination that the display generation component is displaying a user interface (e.g., the display is on (e.g., the device is in an active state)), the electronic device displays (740a), via the display generation component, an animation of modifying the user interface based on the change in the orientation (e.g., amination of movement of User Interface A shown in FIG. 6C), wherein the second time threshold corresponds to an end of the animation, such as Time 614C in FIG. 6D (e.g., the user interface displayed on the electronic device adjusts (e.g., rotates, moves, etc.) in an animated fashion (e.g., the device displays an animation of the user interface rotating) in accordance with the change in orientation associated with the electronic device (e.g., including the buttons, such as an edge of the device) relative to the reference). In some embodiments, the length of the animation, in time, is the second threshold period of time (e.g., 0.5, 1, 1.5, 1.75, 2, 2.5, etc. seconds), and thus the animation completes the second threshold period of time after the change in orientation is detected. Therefore, in some embodiments, the remapping of functionalities to the buttons is synchronized with the animation of the user interface. In some embodiments, the change in the orientation of the user interface is animated (e.g., one or more respective orientations of the user interface between the transition from the portrait (or substantially vertical, such as within 1, 2, 3, 5, 10, 15, 30, 45 degrees of such an) orientation to the landscape (or substantially horizontal, such as within 1, 2, 3, 5, 10, 15, 30, 45 degrees of such an) orientation are displayed on the display of the electronic device in response to the change in orientation associated with the electronic device). Dynamically assigning functionality to a button of a device based on a timing of a change in orientation of a user interface displayed on the device aligns the dynamic assignment with the user interface interaction with the user, thereby improving user-device interaction.

In some embodiments, the indication of the selection of the first button is detected while an orientation of the electronic device with respect to the reference is the first orientation (742*a*), such as orientation A in FIG. 6M (e.g., an orientation of the portion of the electronic device (e.g., including the buttons, such as an edge of the device) relative to the reference (e.g., gravity) is the first orientation, as described above.). In some embodiments, after detecting the indication of the selection of the first button, the electronic device detects (742*b*) a change in the orientation associated with the electronic device from the first orientation to the second orientation with respect to the reference, such as clockwise rotation of device 500 as shown in FIG. 6M (e.g., the orientation associated with the electronic device is rotated/moved from the first orientation (e.g., portrait (or substantially vertical, such as within 1, 2, 3, 5, 10, 15, 30, 45 degrees of such an) orientation) to the second orientation (e.g., landscape (or substantially horizontal, such as within 1, 2, 3, 5, 10, 15, 30, 45 degrees of such an) orientation) with respect to gravity.). In some embodiments, in response to detecting the change in the orientation associated with the electronic device from the first orientation to the second orientation with respect to the reference (742*c*), in accordance with a determination that the first button is in an unselected state when the change in the orientation of the electronic device is detected (e.g., no finger press or hold is detected on the one or more buttons of the electronic device.), the electronic device associates (742*d*) the first button with decreasing the value of the parameter, such as reassignment of functionality of button 641A as shown in FIG. 6O (e.g., the remapping of functionality to the first button is not delayed, and a finger press or hold on the first button after the orientation associated with the electronic device is rotated/moved from the first orientation (e.g., portrait (or substantially vertical, such as within 1, 2, 3, 5, 10, 15, 30, 45 degrees of such an) orientation) to the second orientation (e.g., landscape (or substantially horizontal, such as within 1, 2, 3, 5, 10, 15, 30, 45 degrees of such an) orientation) with respect to gravity optionally causes the volume of audio emitted from the electronic device to decrease one or more respective units (e.g., measurements of loudness or intensity).

In some embodiments, in accordance with a determination that the first button is in a selected state when the change in the orientation of the electronic device is detected, such as selection of button 641A in FIG. 6M (e.g., a finger press or hold is being detected on the one or more buttons of the electronic device.), the electronic device delays associating (742*e*) the first button with decreasing the value of the parameter until the first button is in the unselected state, such as delay of reassignment of functionality of button 641A as shown in FIG. 6N (e.g., and maintaining the association of the first button with increasing the value of the parameter until then). For example, a subsequent finger press or hold on the first button after deselection of the first button after the orientation associated with the electronic device is rotated/moved from the first orientation (e.g., portrait (or substantially vertical, such as within 1, 2, 3, 5, 10, 15, 30, 45 degrees of such an) orientation) to the second orientation (e.g., landscape (or substantially horizontal, such as within 1, 2, 3, 5, 10, 15, 30, 45 degrees of such an) orientation) with respect to gravity optionally causes the volume of audio emitted from the electronic device to decrease one or more additional respective units (e.g., measurements of loudness or intensity). In some embodiments, after the orientation associated with the electronic device is rotated/moved from the first orientation to the second orientation, the continued finger press or hold detected on the first button optionally causes the volume of audio emitted from the electronic device to continue to increase in accordance with the detected duration of the selection of the first button until the first button is released. Waiting until a button of a device is unselected to dynamically assign functionality to the button avoids accidental adjustment of a parameter associated with the device and allows intuitive control of a parameter associated with the device after the deselection of the button of the device, thereby improving user-device interaction.

In some embodiments, the one or more buttons are aligned with a first axis (744*a*), such as buttons 641A and 641B in FIG. 6A (e.g., the first button and the second button are aligned on a same side/edge of the electronic device.). In some embodiments, in response to detecting the indication of the selection of the first button (e.g., a finger press or hold on the one of the buttons of the electronic device.), the electronic device updates (744*b*) display of a user interface element displayed via a display generation component in communication with the electronic device (e.g., a display integrated with the electronic device (optionally a touch screen display), an external display such as a monitor, projector, television, or a hardware component (optionally integrated or external) for projecting a user interface or causing a user interface to be visible to one or more users, etc.) to indicate an updated value of the parameter in accordance with the selection of the first button, such as update of user interface element 608 as shown in FIG. 6A (e.g., a volume element/bar/HUD on the user interface of the display of the electronic device is displayed in response to selection of the first button). For example, the volume HUD indicates an amount that the volume has increased or decreased (e.g., one respective unit (e.g., measurement of loudness or intensity). In some embodiments, the volume HUD was optionally displayed on the user interface of the display of the electronic device before the selection of the first button was detected. For example, the volume HUD was displayed in response to a prior selection of the first or second buttons, and in response to detecting the current selection of the first button, the electronic device updates the display of the volume HUD to indicate an amount that the volume has increased or decreased.

In some embodiments, in accordance with the determination that the orientation associated with the electronic device with respect to the reference is the first orientation, such as orientation C in FIG. 6E (e.g., an orientation of the portion of the electronic device (e.g., including the buttons, such as an edge of the device) relative to the reference (e.g., gravity) is the first orientation, as described above.), the user interface element is displayed in a first region of a display area of the display generation component that is less than a quarter of the available display region and is closer to the first button than to a portion of the display area across from the first button and visually indicates a function of the first button (744c), such as display of user interface element 608 vertically near buttons 641A and 641B as shown in FIG. 6E (and/or functions of multiple buttons). For example, the volume HUD is aligned with the first axis and/or displayed along the same axis as the buttons of the electronic device (e.g., vertical axis in the portrait orientation) and/or in a region of the display that is near/proximate to the buttons of the electronic device in the current orientation of the electronic device. In some embodiments, the volume HUD is displayed at a region of the user interface based on the orientation associated with the electronic device (e.g., displayed at or near a top portion of the user interface in the portrait orientation). In some embodiments, the volume HUD is displayed at a fixed region of the user interface irrespective of the current orientation (e.g., portrait (or substantially vertical, such as within 1, 2, 3, 5, 10, 15, 30, 45 degrees of such an) orientation) associated with the electronic device.).

In some embodiments, in accordance with the determination that the orientation associated with the electronic device with respect to the reference is the second orientation, such as orientation D in FIG. 6F (e.g., an orientation of the portion of the electronic device (e.g., including the buttons, such as an edge of the device) relative to the reference (e.g., gravity) is the second orientation, as described above.), the user interface element is displayed in a second region that is less than a quarter of the available display area and is closer to the first button than to the portion of the display region across from the first button, different from the first region, of the display area of the display generation component and visually indicates a function of the first button (744d), such as display of user interface element horizontally above buttons 641A and 641B in FIG. 6F (and/or functions of multiple buttons). For example, the volume HUD is aligned with the first axis and/or displayed along the same axis as the buttons of the electronic device (e.g., horizontal axis in the landscape orientation) and/or in a region of the display that is near/proximate to the buttons of the electronic device in the current orientation of the electronic device. In some embodiments, the volume HUD is displayed at a region of the user interface based on the orientation associated with the electronic device (e.g., displayed at or near a top portion of the user interface in the landscape orientation). In some embodiments, the volume HUD is displayed at a fixed region of the user interface irrespective of the current orientation (e.g., portrait (or substantially vertical, such as within 1, 2, 3, 5, 10, 15, 30, 45 degrees of such an) orientation) associated with the electronic device. Dynamically displaying a user interface element corresponding to functionality assigned with a button of a device depending on the orientation associated with the device facilitates discovery of that fact that and/or the manner in which the functionality has been dynamically assigned to the button, thereby improving user-device interaction.

In some embodiments, the electronic device is configured to increase the value of the parameter in response to receiving a first input from a first source other than the one or more buttons independent of the orientation associated with the electronic device with respect to the reference (746a) (e.g., the volume of audio emitted by the electronic device is optionally controllable by one or more input devices in communication with the electronic device, different from (e.g., separate from) the one or more buttons of the electronic device). In some embodiments, the one or more input devices are controllable to increase the volume of audio emitted by the electronic device irrespective of changes to the orientation associated with the electronic device (e.g., irrespective of whether the orientation is a portrait (or substantially vertical, such as within 1, 2, 3, 5, 10, 15, 30, 45 degrees of such an) orientation or a landscape (or substantially horizontal, such as within 1, 2, 3, 5, 10, 15, 30, 45 degrees of such an) orientation with respect to gravity. For example, the one or more input devices optionally includes headphones in communication with the electronic device, and selection of a first button of the headphones causes the volume of audio emitted by the electronic device to increase irrespective of the orientation of the electronic device. As another example, the one or more input devices optionally includes a keyboard in communication with the electronic device, and selection of a first respective key on the keyboard causes the volume of audio emitted by the electronic device to increase irrespective of the orientation of the electronic device. In another example, the one or more input devices optionally includes an on-device software program displayed on the display of the electronic device, and selection or manipulation of a first user interface element causes the volume of audio emitted by the electronic device to increase irrespective of the orientation of the electronic device.

In some embodiments, the electronic device is configured to decrease the value of the parameter in response to receiving a second input from the first source other than the one or more buttons independent of the orientation associated with the electronic device with respect to the reference (746b). In some embodiments, the one or more input devices are controllable to decrease the volume of audio emitted by the electronic device irrespective of changes to the orientation associated with the electronic device (e.g., irrespective of whether the orientation is a portrait (or substantially vertical, such as within 1, 2, 3, 5, 10, 15, 30, 45 degrees of such an) orientation or a landscape (or substantially horizontal, such as within 1, 2, 3, 5, 10, 15, 30, 45 degrees of such an) orientation with respect to gravity. For example, the one or more input devices optionally includes headphones in communication with the electronic device, and selection of a second button of the headphones causes the volume of audio emitted by the electronic device to decrease irrespective of the orientation of the electronic device. As another example, the one or more input devices optionally includes a keyboard in communication with the electronic device, and selection of a second respective key on the keyboard causes the volume of audio emitted by the electronic device to decrease irrespective of the orientation of the electronic device. In another example, the one or more input devices optionally includes an on-device software program displayed on the display of the electronic device, and selection or manipulation of a second user interface element causes the volume of audio emitted by the electronic device to decrease irrespective of the orientation of the electronic device. Forgoing dynamically assigning functionality to one or more input sources, separate from a button of a device, when an orientation associated with the device changes avoids erroneous or unexpected responses from the device to those inputs, thereby improving user-device interaction.

It should be understood that the particular order in which the operations in method 700 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 7A-7M are, optionally, implemented by components depicted in FIGS. 1A-1B. For example, detecting operation 702*a*, increasing operation 702*c* and decreasing operation 702*d* are optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology potentially involves the gathering and use of data available from specific and legitimate sources to facilitate the assigning of button functionalities based on orientation. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information, usage history, handwriting styles, etc.

The present disclosure recognizes that the use of such personal information data, in the present technology, can be used to the benefit of users. For example, the personal information data can be used to automatically determine an orientation associated with an electronic device based on prior usage of the electronic device. Accordingly, use of such personal information data enables determining effective device orientation—and thus button assignments—that can be more accurate.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change the discovery or privacy settings of the electronic device. For example, the user can select a setting that only allows an electronic device to access certain of the user's prior device usage information when determining an effective orientation for the electronic device.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, device orientation can be determined based on current data only or a bare minimum amount of personal information, or other non-personal information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
   at an electronic device having one or more buttons:
      detecting an indication of selection of a first button of the one or more buttons; and
      in response to detecting the indication of the selection of the first button:
         in accordance with a determination that an orientation associated with the electronic device with respect to a reference is a first orientation, increasing a value of a parameter in accordance with the selection of the first button; and
         in accordance with a determination that the orientation associated with the electronic device with respect to the reference is a second orientation different from the first orientation, decreasing the value of the parameter in accordance with the selection of the first button.

2. The method of claim 1, further comprising:
   detecting an indication of selection of a second button, different from the first button, of the one or more buttons; and
   in response to detecting the indication of the selection of the second button:
      in accordance with a determination that the orientation associated with the electronic device with respect to the reference is the first orientation, decreasing the value of the parameter in accordance with the selection of the second button; and
      in accordance with a determination that the orientation associated with the electronic device with respect to the reference is the second orientation, increasing the value of the parameter in accordance with the selection of the second button.

3. The method of claim 2, wherein the first button and the second button are on a same side of the electronic device.

4. The method of claim 1, wherein increasing the value of the parameter in accordance with the orientation associated with the device with respect to the reference being the first orientation, and decreasing the value of the parameter in accordance with the orientation associated with the device with respect to the reference being the second orientation, are further in accordance with a determination that a language setting of the electronic device corresponds to a first language, the method further comprising:
   in response to detecting the indication of the selection of the first button and in accordance with a determination that the language setting of the electronic device corresponds to a second language, that has a different reading direction from a reading direction of the first language:
      in accordance with the determination that the orientation associated with the electronic device with respect to the reference is the first orientation, decreasing the value of the parameter in accordance with the selection of the first button; and
      in accordance with the determination that the orientation associated with the electronic device with respect to the reference is the second orientation, increasing the value of the parameter in accordance with the selection of the first button.

5. The method of claim 4, wherein the first language is left-to-right language, and the second language is a right-to-left language.

6. The method of claim 1, wherein the parameter is a volume parameter of the electronic device.

7. The method of claim 1, further comprising:
   after detecting the indication of the selection of the first button, detecting a second indication of selection of the first button; and
   in response to detecting the second indication of the selection of the first button:
      in accordance with a determination that the orientation associated with the electronic device with respect to the reference is the first orientation, increasing the value of the parameter in accordance with the selection of the first button; and
      in accordance with a determination that the orientation associated with the electronic device with respect to the reference is the second orientation, decreasing the value of the parameter in accordance with the selection of the first button.

8. The method of claim 1, wherein in response to detecting the indication of the selection of the first button and in accordance with a determination that a current orientation of the electronic device satisfies one or more criteria:
   the orientation associated with the electronic device is the first orientation in accordance with a determination that the electronic device was in the first orientation during prior usage of the electronic device, and
   the orientation associated with the electronic device is the second orientation in accordance with a determination that the electronic device was in the second orientation during the prior usage of the electronic device.

9. The method of claim 1, wherein in response to detecting the indication of the selection of the first button and in accordance with a determination that a display generation component in communication with the electronic device is not displaying a user interface when the selection of the first button is detected:
   the orientation associated with the electronic device is the first orientation in accordance with a determination that, in response to an input to wake the electronic device, the electronic device is configured to display a respective user interface that is aligned to a respective axis having the first orientation relative to a portion of the electronic device, and
   the orientation associated with the electronic device is the second orientation in accordance with a determination that, in response to the input to wake the electronic device, the electronic device is configured to display the respective user interface that is aligned to the respective axis having the second orientation relative to the portion of the electronic device.

10. The method of claim 1, wherein in response to detecting the indication of the selection of the first button and in accordance with a determination that the electronic device is not configured to adjust display of a respective user interface based on an orientation of the electronic device with respect to the reference:
   the orientation associated with the electronic device is the first orientation in accordance with a determination that the electronic device is configured to display the respective user interface that is aligned to a respective axis having the first orientation relative to a portion of the electronic device irrespective of the orientation of the electronic device with respect to the reference, and the orientation associated with the electronic device is the second orientation in accordance with a determination that the electronic device is configured to display the respective user interface that is aligned to the respective axis having the second orientation relative to the portion of the electronic device irrespective of the orientation of the electronic device with respect to the reference.

11. The method of claim 1, wherein the indication of the selection of the first button is detected while an orientation of the electronic device with respect to the reference is the first orientation, the method further comprising:
after detecting the indication of the selection of the first button, detecting a change in the orientation of the electronic device from the first orientation to the second orientation with respect to the reference; and
while the orientation of the electronic device with respect to the reference is the second orientation:
detecting a second indication of selection of the first button; and
in response to detecting the second indication of the selection of the first button:
in accordance with a determination that one or more criteria are satisfied, increasing the value of the parameter in accordance with the selection of the first button; and
in accordance with a determination that the one or more criteria are not satisfied, decreasing the value of the parameter in accordance with the selection of the first button.

12. The method of claim 11, wherein the one or more criteria include a criterion that is satisfied when a change in orientation of the electronic device from the first orientation to the second orientation with respect to the reference is in a first direction, and not satisfied when the change in orientation of the electronic device from the first orientation to the second orientation with respect to the reference is in a second direction, different from the first direction.

13. The method of claim 1, wherein a respective user interface displayed, via a display generation component in communication with the electronic device, is aligned to a respective axis having the first orientation relative to a portion of the electronic device when the orientation associated with the electronic device with respect to the reference is the first orientation and when the orientation associated with the electronic device with respect to the reference is the second orientation.

14. The method of claim 1, wherein a respective user interface displayed, via a display generation component in communication with the electronic device, is aligned to a respective axis having the second orientation relative to a portion of the electronic device when the orientation associated with the electronic device with respect to the reference is the first orientation and when the orientation associated with the electronic device with respect to the reference is the second orientation.

15. The method of claim 1, wherein increasing the value of the parameter in accordance with the orientation associated with the device with respect to the reference being the first orientation, and decreasing the value of the parameter in accordance with the orientation associated with the device with respect to the reference being the second orientation, are further in accordance with a determination that a duration of the selection of the first button satisfies one or more criteria, the method further comprising:
in response to detecting the indication of the selection of the first button, and in accordance with a determination that the duration of the selection of the first button does not satisfy the one or more criteria:
in accordance with the determination that the orientation associated with the electronic device with respect to the reference is the second orientation, performing a discrete operation independent of the value of the parameter; and
in accordance with the determination that the orientation associated with the electronic device with respect to the reference is the first orientation, forgoing performing the discrete operation.

16. The method of claim 15, wherein performing the discrete operation includes muting a volume of the electronic device.

17. The method of claim 1, wherein increasing the value of the parameter in accordance with the orientation associated with the device with respect to the reference being the first orientation, and decreasing the value of the parameter in accordance with the orientation associated with the device with respect to the reference being the second orientation, are further in accordance with a determination that the selection of the first button satisfies one or more criteria, the method further comprising:
in response to detecting the indication of the selection of the first button, and in accordance with a determination that the selection of the first button satisfies one or more second criteria, different from the one or more criteria, performing a hardware reset operation associated with the electronic device independent of the orientation associated with the electronic device with respect to the reference.

18. The method of claim 1, wherein the indication of the selection of the first button is detected while an orientation of the electronic device with respect to the reference is the first orientation, the method further comprising:
after detecting the indication of the selection of the first button, detecting a change in the orientation of the electronic device from the first orientation to the second orientation with respect to the reference; and
in response to detecting the change in the orientation of the electronic device from the first orientation to the second orientation with respect to the reference:
in accordance with a determination that a display generation component in communication with the electronic device is not displaying a user interface, associating the first button with decreasing the value of the parameter a first time threshold after detecting the change in the orientation of the electronic device from the first orientation to the second orientation with respect to the reference; and
in accordance with a determination that the display generation component is displaying a user interface, associating the first button with decreasing the value of the parameter a second time threshold, different from the first time threshold, after detecting the change in the orientation of the electronic device from the first orientation to the second orientation with respect to the reference.

19. The method of claim 18, wherein the first time threshold is smaller than the second time threshold.

20. The method of claim 18, further comprising:
in response to detecting the change in the orientation of the electronic device from the first orientation to the second orientation with respect to the reference and in accordance with the determination that the display generation component is displaying a user interface, displaying, via the display generation component, an animation of modifying the user interface based on the change in the orientation, wherein the second time threshold corresponds to an end of the animation.

21. The method of claim 1, wherein the indication of the selection of the first button is detected while an orientation of the electronic device with respect to the reference is the first orientation, the method further comprising:

after detecting the indication of the selection of the first button, detecting a change in the orientation associated with the electronic device from the first orientation to the second orientation with respect to the reference; and in response to detecting the change in the orientation associated with the electronic device from the first orientation to the second orientation with respect to the reference:

in accordance with a determination that the first button is in an unselected state when the change in the orientation of the electronic device is detected, associating the first button with decreasing the value of the parameter; and in accordance with a determination that the first button is in a selected state when the change in the orientation of the electronic device is detected, delaying associating the first button with decreasing the value of the parameter until the first button is in the unselected state.

22. The method of claim 1, wherein the one or more buttons are aligned with a first axis, the method further comprising:

in response to detecting the indication of the selection of the first button, updating display of a user interface element displayed via a display generation component in communication with the electronic device to indicate an updated value of the parameter in accordance with the selection of the first button, wherein:

in accordance with the determination that the orientation associated with the electronic device with respect to the reference is the first orientation, the user interface element is displayed in a first region of an available display area of the display generation component that is less than a quarter of the available display area and is closer to the first button than to a portion of the available display area across from the first button and visually indicates a function of the first button, and in accordance with the determination that the orientation associated with the electronic device with respect to the reference is the second orientation, the user interface element is displayed in a second region that is less than a quarter of the available display area and is closer to the first button than to the portion of the available display area across from the first button, different from the first region, of the available display area of the display generation component and visually indicates a function of the first button.

23. The method of claim 1, wherein:

the electronic device is configured to increase the value of the parameter in response to receiving a first input from a first source other than the one or more buttons independent of the orientation associated with the electronic device with respect to the reference, and the electronic device is configured to decrease the value of the parameter in response to receiving a second input from the first source other than the one or more buttons independent of the orientation associated with the electronic device with respect to the reference.

24. An electronic device, comprising:
one or more processors;
memory; and
one or more programs, wherein the one or more programs are stored in the memory and configured to be executed by the one or more processors, the one or more programs including instructions for:

detecting an indication of selection of a first button of one or more buttons of the electronic device; and in response to detecting the indication of the selection of the first button:

in accordance with a determination that an orientation associated with the electronic device with respect to a reference is a first orientation, increasing a value of a parameter in accordance with the selection of the first button; and in accordance with a determination that the orientation associated with the electronic device with respect to the reference is a second orientation different from the first orientation, decreasing the value of the parameter in accordance with the selection of the first button.

25. A non-transitory computer readable storage medium storing one or more programs, the one or more programs comprising instructions, which when executed by one or more processors of an electronic device, cause the electronic device to perform a method comprising:

detecting an indication of selection of a first button of one or more buttons of the electronic device; and in response to detecting the indication of the selection of the first button:

in accordance with a determination that an orientation associated with the electronic device with respect to a reference is a first orientation, increasing a value of a parameter in accordance with the selection of the first button; and in accordance with a determination that the orientation associated with the electronic device with respect to the reference is a second orientation different from the first orientation, decreasing the value of the parameter in accordance with the selection of the first button.

26. The electronic device of claim 24, wherein the one or more programs further include instructions for:

detecting an indication of selection of a second button, different from the first button, of the one or more buttons; and in response to detecting the indication of the selection of the second button:

in accordance with a determination that the orientation associated with the electronic device with respect to the reference is the first orientation, decreasing the value of the parameter in accordance with the selection of the second button; and in accordance with a determination that the orientation associated with the electronic device with respect to the reference is the second orientation, increasing the value of the parameter in accordance with the selection of the second button.

27. The electronic device of claim 26, wherein the first button and the second button are on a same side of the electronic device.

28. The electronic device of claim 24, wherein increasing the value of the parameter in accordance with the orientation associated with the device with respect to the reference being the first orientation, and decreasing the value of the parameter in accordance with the orientation associated with the device with respect to the reference being the second orientation, are further in accordance with a determination that a language setting of the electronic device corresponds to a first language, the one or more programs further including instructions for:
- in response to detecting the indication of the selection of the first button and in accordance with a determination that the language setting of the electronic device corresponds to a second language, that has a different reading direction from a reading direction of the first language:
  - in accordance with the determination that the orientation associated with the electronic device with respect to the reference is the first orientation, decreasing the value of the parameter in accordance with the selection of the first button; and
  - in accordance with the determination that the orientation associated with the electronic device with respect to the reference is the second orientation, increasing the value of the parameter in accordance with the selection of the first button.

29. The electronic device of claim 28, wherein the first language is left-to-right language, and the second language is a right-to-left language.

30. The electronic device of claim 24, wherein the parameter is a volume parameter of the electronic device.

31. The electronic device of claim 24, wherein the one or more programs further include instructions for:
- after detecting the indication of the selection of the first button, detecting a second indication of selection of the first button; and
- in response to detecting the second indication of the selection of the first button:
  - in accordance with a determination that the orientation associated with the electronic device with respect to the reference is the first orientation, increasing the value of the parameter in accordance with the selection of the first button; and
  - in accordance with a determination that the orientation associated with the electronic device with respect to the reference is the second orientation, decreasing the value of the parameter in accordance with the selection of the first button.

32. The electronic device of claim 24, wherein in response to detecting the indication of the selection of the first button and in accordance with a determination that a current orientation of the electronic device satisfies one or more criteria:
- the orientation associated with the electronic device is the first orientation in accordance with a determination that the electronic device was in the first orientation during prior usage of the electronic device, and
- the orientation associated with the electronic device is the second orientation in accordance with a determination that the electronic device was in the second orientation during the prior usage of the electronic device.

33. The electronic device of claim 24, wherein in response to detecting the indication of the selection of the first button and in accordance with a determination that a display generation component in communication with the electronic device is not displaying a user interface when the selection of the first button is detected:
- the orientation associated with the electronic device is the first orientation in accordance with a determination that, in response to an input to wake the electronic device, the electronic device is configured to display a respective user interface that is aligned to a respective axis having the first orientation relative to a portion of the electronic device, and
- the orientation associated with the electronic device is the second orientation in accordance with a determination that, in response to the input to wake the electronic device, the electronic device is configured to display the respective user interface that is aligned to the respective axis having the second orientation relative to the portion of the electronic device.

34. The electronic device of claim 24, wherein in response to detecting the indication of the selection of the first button and in accordance with a determination that the electronic device is not configured to adjust display of a respective user interface based on an orientation of the electronic device with respect to the reference:
- the orientation associated with the electronic device is the first orientation in accordance with a determination that the electronic device is configured to display the respective user interface that is aligned to a respective axis having the first orientation relative to a portion of the electronic device irrespective of the orientation of the electronic device with respect to the reference, and
- the orientation associated with the electronic device is the second orientation in accordance with a determination that the electronic device is configured to display the respective user interface that is aligned to the respective axis having the second orientation relative to the portion of the electronic device irrespective of the orientation of the electronic device with respect to the reference.

35. The electronic device of claim 24, wherein the indication of the selection of the first button is detected while an orientation of the electronic device with respect to the reference is the first orientation, the one or more programs further including instructions for:
- after detecting the indication of the selection of the first button, detecting a change in the orientation of the electronic device from the first orientation to the second orientation with respect to the reference; and
- while the orientation of the electronic device with respect to the reference is the second orientation:
  - detecting a second indication of selection of the first button; and
  - in response to detecting the second indication of the selection of the first button:
    - in accordance with a determination that one or more criteria are satisfied, increasing the value of the parameter in accordance with the selection of the first button; and
    - in accordance with a determination that the one or more criteria are not satisfied, decreasing the value of the parameter in accordance with the selection of the first button.

36. The electronic device of claim 35, wherein the one or more criteria include a criterion that is satisfied when a change in orientation of the electronic device from the first orientation to the second orientation with respect to the reference is in a first direction, and not satisfied when the change in orientation of the electronic device from the first orientation to the second orientation with respect to the reference is in a second direction, different from the first direction.

37. The electronic device of claim 24, wherein a respective user interface displayed, via a display generation component in communication with the electronic device, is aligned to a respective axis having the first orientation relative to a portion of the electronic device when the orientation associated with the electronic device with respect to the reference is the first orientation and when the orientation associated with the electronic device with respect to the reference is the second orientation.

38. The electronic device of claim 24, wherein a respective user interface displayed, via a display generation component in communication with the electronic device, is aligned to a respective axis having the second orientation relative to a portion of the electronic device when the orientation associated with the electronic device with respect to the reference is the first orientation and when the orientation associated with the electronic device with respect to the reference is the second orientation.

39. The electronic device of claim 24, wherein increasing the value of the parameter in accordance with the orientation associated with the device with respect to the reference being the first orientation, and decreasing the value of the parameter in accordance with the orientation associated with the device with respect to the reference being the second orientation, are further in accordance with a determination that a duration of the selection of the first button satisfies one or more criteria, the one or more programs further including instructions for:
  in response to detecting the indication of the selection of the first button, and in accordance with a determination that the duration of the selection of the first button does not satisfy the one or more criteria:
    in accordance with the determination that the orientation associated with the electronic device with respect to the reference is the second orientation, performing a discrete operation independent of the value of the parameter; and
    in accordance with the determination that the orientation associated with the electronic device with respect to the reference is the first orientation, forgoing performing the discrete operation.

40. The electronic device of claim 39, wherein performing the discrete operation includes muting a volume of the electronic device.

41. The electronic device of claim 24, wherein increasing the value of the parameter in accordance with the orientation associated with the device with respect to the reference being the first orientation, and decreasing the value of the parameter in accordance with the orientation associated with the device with respect to the reference being the second orientation, are further in accordance with a determination that the selection of the first button satisfies one or more criteria, the one or more programs further including instructions for:
  in response to detecting the indication of the selection of the first button, and in accordance with a determination that the selection of the first button satisfies one or more second criteria, different from the one or more criteria, performing a hardware reset operation associated with the electronic device independent of the orientation associated with the electronic device with respect to the reference.

42. The electronic device of claim 24, wherein the indication of the selection of the first button is detected while an orientation of the electronic device with respect to the reference is the first orientation, the one or more programs further including instructions for:
  after detecting the indication of the selection of the first button, detecting a change in the orientation of the electronic device from the first orientation to the second orientation with respect to the reference; and
  in response to detecting the change in the orientation of the electronic device from the first orientation to the second orientation with respect to the reference:
    in accordance with a determination that a display generation component in communication with the electronic device is not displaying a user interface, associating the first button with decreasing the value of the parameter a first time threshold after detecting the change in the orientation of the electronic device from the first orientation to the second orientation with respect to the reference; and
    in accordance with a determination that the display generation component is displaying a user interface, associating the first button with decreasing the value of the parameter a second time threshold, different from the first time threshold, after detecting the change in the orientation of the electronic device from the first orientation to the second orientation with respect to the reference.

43. The electronic device of claim 42, wherein the first time threshold is smaller than the second time threshold.

44. The electronic device of claim 42, wherein the one or more programs further include instructions for:
  in response to detecting the change in the orientation of the electronic device from the first orientation to the second orientation with respect to the reference and in accordance with the determination that the display generation component is displaying a user interface, displaying, via the display generation component, an animation of modifying the user interface based on the change in the orientation, wherein the second time threshold corresponds to an end of the animation.

45. The electronic device of claim 24, wherein the indication of the selection of the first button is detected while an orientation of the electronic device with respect to the reference is the first orientation, the one or more programs further including instructions for:
  after detecting the indication of the selection of the first button, detecting a change in the orientation associated with the electronic device from the first orientation to the second orientation with respect to the reference; and
  in response to detecting the change in the orientation associated with the electronic device from the first orientation to the second orientation with respect to the reference:
    in accordance with a determination that the first button is in an unselected state when the change in the orientation of the electronic device is detected, associating the first button with decreasing the value of the parameter; and
    in accordance with a determination that the first button is in a selected state when the change in the orientation of the electronic device is detected, delaying associating the first button with decreasing the value of the parameter until the first button is in the unselected state.

46. The electronic device of claim 24, wherein the one or more buttons are aligned with a first axis, the one or more programs further including instructions for:
  in response to detecting the indication of the selection of the first button, updating display of a user interface element displayed via a display generation component in communication with the electronic device to indicate an updated value of the parameter in accordance with the selection of the first button, wherein:
    in accordance with the determination that the orientation associated with the electronic device with respect to the reference is the first orientation, the user interface element is displayed in a first region of an available display area of the display generation component that is less than a quarter of the available display area and is closer to the first button than to a portion of the available display area across from the first button and visually indicates a function of the first button, and in accordance with the determination that the orientation associated with the electronic device with respect to the reference is the second orientation, the user interface element is displayed in a second region that is less than a quarter of the available display area and is closer to the first button than to the portion of the available display area across from the first button, different from the first region, of the available display area of the display generation component and visually indicates a function of the first button.

47. The electronic device of claim 24, wherein:
the electronic device is configured to increase the value of the parameter in response to receiving a first input from a first source other than the one or more buttons independent of the orientation associated with the electronic device with respect to the reference, and
the electronic device is configured to decrease the value of the parameter in response to receiving a second input from the first source other than the one or more buttons independent of the orientation associated with the electronic device with respect to the reference.

48. The non-transitory computer readable storage medium of claim 25, wherein the method further comprises:
detecting an indication of selection of a second button, different from the first button, of the one or more buttons; and
in response to detecting the indication of the selection of the second button:
in accordance with a determination that the orientation associated with the electronic device with respect to the reference is the first orientation, decreasing the value of the parameter in accordance with the selection of the second button; and
in accordance with a determination that the orientation associated with the electronic device with respect to the reference is the second orientation, increasing the value of the parameter in accordance with the selection of the second button.

49. The non-transitory computer readable storage medium of claim 48, wherein the first button and the second button are on a same side of the electronic device.

50. The non-transitory computer readable storage medium of claim 25, wherein increasing the value of the parameter in accordance with the orientation associated with the device with respect to the reference being the first orientation, and decreasing the value of the parameter in accordance with the orientation associated with the device with respect to the reference being the second orientation, are further in accordance with a determination that a language setting of the electronic device corresponds to a first language, the method further comprising:
in response to detecting the indication of the selection of the first button and in accordance with a determination that the language setting of the electronic device corresponds to a second language, that has a different reading direction from a reading direction of the first language:
in accordance with the determination that the orientation associated with the electronic device with respect to the reference is the first orientation, decreasing the value of the parameter in accordance with the selection of the first button; and
in accordance with the determination that the orientation associated with the electronic device with respect to the reference is the second orientation, increasing the value of the parameter in accordance with the selection of the first button.

51. The non-transitory computer readable storage medium of claim 50, wherein the first language is left-to-right language, and the second language is a right-to-left language.

52. The non-transitory computer readable storage medium of claim 25, wherein the parameter is a volume parameter of the electronic device.

53. The non-transitory computer readable storage medium of claim 25, wherein the method further comprises:
after detecting the indication of the selection of the first button, detecting a second indication of selection of the first button; and
in response to detecting the second indication of the selection of the first button:
in accordance with a determination that the orientation associated with the electronic device with respect to the reference is the first orientation, increasing the value of the parameter in accordance with the selection of the first button; and
in accordance with a determination that the orientation associated with the electronic device with respect to the reference is the second orientation, decreasing the value of the parameter in accordance with the selection of the first button.

54. The non-transitory computer readable storage medium of claim 25, wherein in response to detecting the indication of the selection of the first button and in accordance with a determination that a current orientation of the electronic device satisfies one or more criteria:
the orientation associated with the electronic device is the first orientation in accordance with a determination that the electronic device was in the first orientation during prior usage of the electronic device, and
the orientation associated with the electronic device is the second orientation in accordance with a determination that the electronic device was in the second orientation during the prior usage of the electronic device.

55. The non-transitory computer readable storage medium of claim 25, wherein in response to detecting the indication of the selection of the first button and in accordance with a determination that a display generation component in communication with the electronic device is not displaying a user interface when the selection of the first button is detected:
the orientation associated with the electronic device is the first orientation in accordance with a determination that, in response to an input to wake the electronic device, the electronic device is configured to display a respective user interface that is aligned to a respective axis having the first orientation relative to a portion of the electronic device, and
the orientation associated with the electronic device is the second orientation in accordance with a determination that, in response to the input to wake the electronic device, the electronic device is configured to display the respective user interface that is aligned to the respective axis having the second orientation relative to the portion of the electronic device.

56. The non-transitory computer readable storage medium of claim 25, wherein in response to detecting the indication of the selection of the first button and in accordance with a determination that the electronic device is not configured to adjust display of a respective user interface based on an orientation of the electronic device with respect to the reference:
  the orientation associated with the electronic device is the first orientation in accordance with a determination that the electronic device is configured to display the respective user interface that is aligned to a respective axis having the first orientation relative to a portion of the electronic device irrespective of the orientation of the electronic device with respect to the reference, and
  the orientation associated with the electronic device is the second orientation in accordance with a determination that the electronic device is configured to display the respective user interface that is aligned to the respective axis having the second orientation relative to the portion of the electronic device irrespective of the orientation of the electronic device with respect to the reference.

57. The non-transitory computer readable storage medium of claim 25, wherein the indication of the selection of the first button is detected while an orientation of the electronic device with respect to the reference is the first orientation, the method further comprising:
  after detecting the indication of the selection of the first button, detecting a change in the orientation of the electronic device from the first orientation to the second orientation with respect to the reference; and
  while the orientation of the electronic device with respect to the reference is the second orientation:
    detecting a second indication of selection of the first button; and
    in response to detecting the second indication of the selection of the first button:
      in accordance with a determination that one or more criteria are satisfied, increasing the value of the parameter in accordance with the selection of the first button; and
      in accordance with a determination that the one or more criteria are not satisfied, decreasing the value of the parameter in accordance with the selection of the first button.

58. The non-transitory computer readable storage medium of claim 57, wherein the one or more criteria include a criterion that is satisfied when a change in orientation of the electronic device from the first orientation to the second orientation with respect to the reference is in a first direction, and not satisfied when the change in orientation of the electronic device from the first orientation to the second orientation with respect to the reference is in a second direction, different from the first direction.

59. The non-transitory computer readable storage medium of claim 25, wherein a respective user interface displayed, via a display generation component in communication with the electronic device, is aligned to a respective axis having the first orientation relative to a portion of the electronic device when the orientation associated with the electronic device with respect to the reference is the first orientation and when the orientation associated with the electronic device with respect to the reference is the second orientation.

60. The non-transitory computer readable storage medium of claim 25, wherein a respective user interface displayed, via a display generation component in communication with the electronic device, is aligned to a respective axis having the second orientation relative to a portion of the electronic device when the orientation associated with the electronic device with respect to the reference is the first orientation and when the orientation associated with the electronic device with respect to the reference is the second orientation.

61. The non-transitory computer readable storage medium of claim 25, wherein increasing the value of the parameter in accordance with the orientation associated with the device with respect to the reference being the first orientation, and decreasing the value of the parameter in accordance with the orientation associated with the device with respect to the reference being the second orientation, are further in accordance with a determination that a duration of the selection of the first button satisfies one or more criteria, the method further comprising:
  in response to detecting the indication of the selection of the first button, and in accordance with a determination that the duration of the selection of the first button does not satisfy the one or more criteria:
    in accordance with the determination that the orientation associated with the electronic device with respect to the reference is the second orientation, performing a discrete operation independent of the value of the parameter; and
    in accordance with the determination that the orientation associated with the electronic device with respect to the reference is the first orientation, forgoing performing the discrete operation.

62. The non-transitory computer readable storage medium of claim 61, wherein performing the discrete operation includes muting a volume of the electronic device.

63. The non-transitory computer readable storage medium of claim 25, wherein increasing the value of the parameter in accordance with the orientation associated with the device with respect to the reference being the first orientation, and decreasing the value of the parameter in accordance with the orientation associated with the device with respect to the reference being the second orientation, are further in accordance with a determination that the selection of the first button satisfies one or more criteria, the method further comprising:
  in response to detecting the indication of the selection of the first button, and in accordance with a determination that the selection of the first button satisfies one or more second criteria, different from the one or more criteria, performing a hardware reset operation associated with the electronic device independent of the orientation associated with the electronic device with respect to the reference.

64. The non-transitory computer readable storage medium of claim 25, wherein the indication of the selection of the first button is detected while an orientation of the electronic device with respect to the reference is the first orientation, the method further comprising:
  after detecting the indication of the selection of the first button, detecting a change in the orientation of the electronic device from the first orientation to the second orientation with respect to the reference; and
  in response to detecting the change in the orientation of the electronic device from the first orientation to the second orientation with respect to the reference:
    in accordance with a determination that a display generation component in communication with the electronic device is not displaying a user interface, associating the first button with decreasing the value of the parameter a first time threshold after detecting the change in the orientation of the electronic device from the first orientation to the second orientation with respect to the reference; and in accordance with a determination that the display generation component is displaying a user interface, associating the first button with decreasing the value of the parameter a second time threshold, different from the first time threshold, after detecting the change in the orientation of the electronic device from the first orientation to the second orientation with respect to the reference.

65. The non-transitory computer readable storage medium of claim 64, wherein the first time threshold is smaller than the second time threshold.

66. The non-transitory computer readable storage medium of claim 64, wherein the method further comprises:

in response to detecting the change in the orientation of the electronic device from the first orientation to the second orientation with respect to the reference and in accordance with the determination that the display generation component is displaying a user interface, displaying, via the display generation component, an animation of modifying the user interface based on the change in the orientation, wherein the second time threshold corresponds to an end of the animation.

67. The non-transitory computer readable storage medium of claim 25, wherein the indication of the selection of the first button is detected while an orientation of the electronic device with respect to the reference is the first orientation, the method further comprising:

after detecting the indication of the selection of the first button, detecting a change in the orientation associated with the electronic device from the first orientation to the second orientation with respect to the reference; and in response to detecting the change in the orientation associated with the electronic device from the first orientation to the second orientation with respect to the reference:

in accordance with a determination that the first button is in an unselected state when the change in the orientation of the electronic device is detected, associating the first button with decreasing the value of the parameter; and in accordance with a determination that the first button is in a selected state when the change in the orientation of the electronic device is detected, delaying associating the first button with decreasing the value of the parameter until the first button is in the unselected state.

68. The non-transitory computer readable storage medium of claim 25, wherein the one or more buttons are aligned with a first axis, the method further comprising:

in response to detecting the indication of the selection of the first button, updating display of a user interface element displayed via a display generation component in communication with the electronic device to indicate an updated value of the parameter in accordance with the selection of the first button, wherein:

in accordance with the determination that the orientation associated with the electronic device with respect to the reference is the first orientation, the user interface element is displayed in a first region of an available display area of the display generation component that is less than a quarter of the available display area and is closer to the first button than to a portion of the available display area across from the first button and visually indicates a function of the first button, and in accordance with the determination that the orientation associated with the electronic device with respect to the reference is the second orientation, the user interface element is displayed in a second region that is less than a quarter of the available display area and is closer to the first button than to the portion of the available display area across from the first button, different from the first region, of the available display area of the display generation component and visually indicates a function of the first button.

69. The non-transitory computer readable storage medium of claim 25, wherein:

the electronic device is configured to increase the value of the parameter in response to receiving a first input from a first source other than the one or more buttons independent of the orientation associated with the electronic device with respect to the reference, and the electronic device is configured to decrease the value of the parameter in response to receiving a second input from the first source other than the one or more buttons independent of the orientation associated with the electronic device with respect to the reference.

\* \* \* \* \*